(12) United States Patent
Tomigashi

(10) Patent No.: US 7,728,537 B2
(45) Date of Patent: Jun. 1, 2010

(54) MOTOR CONTROL DEVICE AND CURRENT DETECTING UNIT

(75) Inventor: Yoshio Tomigashi, Hirakata (JP)

(73) Assignee: Sanyo Electric Co., Ltd., Osaka (JP)

( * ) Notice: Subject to any disclaimer, the term of this patent is extended or adjusted under 35 U.S.C. 154(b) by 129 days.

(21) Appl. No.: 11/853,643

(22) Filed: Sep. 11, 2007

(65) Prior Publication Data
US 2008/0061728 A1 Mar. 13, 2008

(30) Foreign Application Priority Data

| Sep. 11, 2006 | (JP) | ............................. 2006-245101 |
| Jul. 4, 2007 | (JP) | ............................. 2007-175762 |

(51) Int. Cl.
*H02P 21/00* (2006.01)
(52) U.S. Cl. .................................. 318/400.02; 318/432
(58) Field of Classification Search ............ 318/400.02, 318/801, 805, 812, 432
See application file for complete search history.

(56) References Cited

U.S. PATENT DOCUMENTS

| 4,459,534 | A | * | 7/1984 | Nagase et al. | ............... 318/808 |
| 6,014,006 | A | * | 1/2000 | Stuntz et al. | ............... 318/804 |
| 6,166,514 | A | * | 12/2000 | Ando et al. | ............... 318/811 |
| 6,642,689 | B2 | * | 11/2003 | Ishida et al. | ............... 318/807 |
| 6,995,540 | B2 | * | 2/2006 | Maruyama et al. | .......... 318/808 |

| 2004/0189243 | A1 | 9/2004 | Tobari et al. |
| 2005/0206341 | A1 | 9/2005 | Yin Ho |

FOREIGN PATENT DOCUMENTS

| JP | 01-107662 A | 4/1989 |
| JP | 2712470 | 10/1997 |
| JP | 2003-189670 | 7/2003 |
| JP | 2003-219699 A | 7/2003 |
| JP | 2003-264988 A | 9/2003 |
| JP | 2004-64903 | 2/2004 |
| JP | 2004-72856 A | 3/2004 |
| JP | 2005-143278 A | 6/2005 |
| JP | 2005-168195 A | 6/2005 |
| JP | 2005-269768 A | 9/2005 |
| JP | 2006-238637 A | 9/2006 |

OTHER PUBLICATIONS

European Search Report for corresponding EP Application No. 07 11 5994, Jul. 22, 2009.
Naoji Yamada, et al., "Current Controlled Type Sinusoidal Interconnecting Three-Phase Inverter," Institute of Electrical Engineers, National Conference Lecture Papers, Mar. 2006, p. 115, vol. 4.

* cited by examiner

*Primary Examiner*—Rina I Duda
(74) *Attorney, Agent, or Firm*—Ditthavong, Mori & Steiner, P.C.

(57) ABSTRACT

A current detecting unit detects three phase current of a three-phase inverter from current flowing between the inverter and a DC power supply. The current detecting unit includes a specified voltage vector generating portion that generates a specified voltage vector indicating a voltage vector that three-phase voltage of the inverter should follow, and a specified voltage vector correcting portion that corrects the generated specified voltage vector. The inverter is controlled in accordance with the specified voltage vector after the correction.

16 Claims, 34 Drawing Sheets

| U | V | W | BUS CURRENT |
|---|---|---|---|
| L | L | L | - |
| L | L | H | w |
| L | H | L | v |
| L | H | H | -u |
| H | L | L | u |
| H | L | H | -v |
| H | H | L | -w |
| H | H | H | - |

FIG.6

DETECTED PHASE CURRENT

| | T1 | T2 | T3 | MODE | T1-T2 | T2-T3 |
|---|---|---|---|---|---|---|
| $v_u > v_v > v_w$ | CntW | CntV | CntU | 1 | -w | u |
| $v_v > v_u > v_w$ | CntW | CntU | CntV | 2 | -w | v |
| $v_v > v_w > v_u$ | CntU | CntW | CntV | 3 | -u | v |
| $v_w > v_v > v_u$ | CntU | CntV | CntW | 4 | -u | w |
| $v_w > v_u > v_v$ | CntV | CntU | CntW | 5 | -v | w |
| $v_u > v_w > v_v$ | CntV | CntW | CntU | 6 | -v | u |

SAMPLING TIMING
 ST1:T1-T2
 ST2:T2-T3

BEFORE CORRECTION

AFTER CORRECTION

AFTER CORRECTION

AFTER CORRECTION

AFTER CORRECTION

FIG.25

| | | | | | DETECTED PHASE CURRENT | |
|---|---|---|---|---|---|---|
| $\theta + \varepsilon + \pi/2$ | T1 | T2 | T3 | MODE | T1-T2 | T2-T3 |
| $0 - \pi/3$ | CntW | CntV | CntU | 1 | -w | u |
| $\pi/3 - 2\pi/3$ | CntW | CntU | CntV | 2 | -w | v |
| $2\pi/3 - \pi$ | CntU | CntW | CntV | 3 | -u | v |
| $\pi - 4\pi/3$ | CntU | CntV | CntW | 4 | -u | w |
| $4\pi/3 - 5\pi/3$ | CntV | CntU | CntW | 5 | -v | w |
| $5\pi/3 - 2\pi$ | CntV | CntW | CntU | 6 | -v | u |

SAMPLING TIMING
　　ST1:T1-T2
　　ST2:T2-T3

FIG.28

|  |  |  |  |  |  |  | DETECTED PHASE CURRENT ||
|---|---|---|---|---|---|---|---|---|
| θ+ε | n | $v_b$ | T1 | T2 | T3 | MODE | T1-T2 | T2-T3 |
| 0 – π/6 | 0 | – | CntW | CntU | CntV | 2 | -w | v |
| π/6 – π/3 | 0 | + | CntU | CntW | CntV | 3 | -u | v |
| π/3 – π/2 | 1 | – | CntU | CntW | CntV | 3 | -u | v |
| π/2 – 2π/3 | 1 | + | CntU | CntV | CntW | 4 | -u | w |
| 2π/3 – 5π/6 | 2 | – | CntU | CntV | CntW | 4 | -u | w |
| 5π/6 – π | 2 | + | CntV | CntU | CntW | 5 | -v | w |
| π – 7π/6 | 3 | – | CntV | CntU | CntW | 5 | -v | w |
| 7π/6 – 4π/3 | 3 | + | CntV | CntW | CntU | 6 | -v | u |
| 4π/3 – 3π/2 | 4 | – | CntV | CntW | CntU | 6 | -v | u |
| 3π/2 – 5π/3 | 4 | + | CntW | CntV | CntU | 1 | -w | u |
| 5π/3 – 11π/6 | 5 | – | CntW | CntV | CntU | 1 | -w | u |
| 11π/6 – 2π | 5 | + | CntW | CntU | CntV | 2 | -w | v |

SAMPLING TIMING
ST1:T1-T2
ST2:T2-T3

_MOTOR CONTROL DEVICE AND CURRENT DETECTING UNIT_

This nonprovisional application claims priority under 35 U.S.C. §119(a) on Patent Application No. 2006-245101 filed in Japan on Sep. 11, 2006 and Patent Application No. 2007-175762 filed in Japan on Jul. 4, 2007, the entire contents of which are hereby incorporated by reference.

BACKGROUND OF THE INVENTION

1. Field of the Invention

The present invention relates to a motor control device that drives and controls a motor. In addition, the present invention relates to a current detecting unit, an inverter controlling device and a system interconnecting device.

2. Description of Related Art

In order to perform a vector control of a motor by supplying three-phase AC power to the motor, it is necessary to detect current values of two phases (e.g., U-phase current and V-phase current) among three phases including U-phase, V-phase and W-phase. Although two current sensors (current transformers or the like) are usually used for detecting current values of two phases, the use of two current sensors causes an increase of cost of the entire system equipped with the motor.

For this reason, there is provided a conventional method in which bus current (DC current) between an inverter and a DC power supply is sensed by a single current sensor, and current values of two phases are detected from the sensed bus current. This method is also called a single shunt current detecting method.

FIG. 37 shows a general block diagram of a conventional motor driving system in which the single shunt current detecting method is adopted. An inverter (PWM inverter) 202 is equipped with half bridge circuits for three phases, each of which includes an upper arm and a lower arm, and it converts a DC voltage from a DC power supply 204 into a three-phase AC voltage by switching the individual arms in accordance with a specified three-phase voltage value given by a controller 203. The three-phase AC voltage is supplied to a three-phase permanent-magnet synchronous motor 201, so that the motor 201 is driven and controlled.

A line connecting the individual lower arms in the inverter 202 with the DC power supply 204 is called a bus line 213. A current sensor 205 transmits a signal indicating bus current that flows in the bus line 213 to the controller 203. The controller 203 does sampling of an output signal of the current sensor 205 at appropriate timing so as to detect phase current of a phase in which a voltage level becomes a maximum value (maximum phase) and phase current of a phase in which a voltage level becomes a minimum value (minimum phase), i.e., current values of two phases.

If voltage levels of phases are separated from each other sufficiently, current values of two phases can be detected by the process described above. However, if the maximum phase of voltage and an intermediate phase become close to each other, or if the minimum phase of voltage and the intermediate phase become close to each other, it is difficult to detect current values of two phases. Note that description of the single shunt current detecting method including description of a reason why it becomes difficult to detect current values of two phases will appear later with reference to FIGS. 3, 4 and 5A-5D.

Considering this, in a certain conventional method, if current values of two phases cannot be detected by the single shunt current detecting method in a certain period, current values of three phases are estimated from past current information in the period. More specifically, d-axis current and q-axis current obtained by converting past current values of three phases are inversely converted into current values of three phases so as to estimate them.

In another conventional method, if current values of two phases cannot be detected by the single shunt current detecting method in a certain period, a pulse width of a PWM signal for each arm in the inverter is corrected based on gate signals of three phases in the period.

A usual correction example of a specified voltage value (pulse width) that corresponds to the above-mentioned correction is shown in FIG. 38. In FIG. 38, the horizontal axis indicates time, while 220u, 220v and 220w show voltage levels of the U-phase, the V-phase and the W-phase, respectively. Since a voltage level of each phase follows the specified voltage value (pulse widths) for each phase, they are considered to be equivalent. As shown in FIG. 38, the specified voltage value (pulse width) of each phase is corrected so that "maximum phase and intermediate phase" as well as "minimum phase and intermediate phase" of the voltage do not approach each other closer than a predetermined distance. Thus, voltages of individual phases do not become close to each other to the extent that current values of two phases cannot be detected, and current values of two phases can be detected stably.

In this way, correction with respect to voltage is beneficial. On the contrary, it is desired to provide a technique that can realize a desired correction for maintaining the state where motor current can be detected by a simple process. In addition, without limiting to motor current, it is important to develop a correction technique that can be realized by a simple process.

SUMMARY OF THE INVENTION

A motor control device according to the present invention includes a current detecting portion for detecting current flowing between an inverter for driving a three-phase motor and a DC power supply as a detection current. The motor control device detects motor current flowing in the motor from the detection current and controls the motor via the inverter based on the motor current. The motor control device further includes a specified voltage vector generating portion that generates a specified voltage vector indicating a voltage vector that an applied voltage to the motor should follow based on the motor current, and a specified voltage vector correcting portion that corrects the generated specified voltage vector. The motor control device controls the motor in accordance with the specified voltage vector after the correction.

For example, the specified voltage vector is a specified voltage vector on rotating coordinates, the specified voltage vector correcting portion corrects the specified voltage vector on the rotating coordinates in the process of converting the specified voltage vector on the rotating coordinates into specified three-phase voltage values on three-phase fixed coordinates, and the motor control device controls the motor by supplying the specified three-phase voltage values corresponding to the specified voltage vector after the correction to the inverter.

More specifically, for example, the specified voltage vector is a two-phase specified voltage vector on the ab coordinates rotating in a stepping manner every 60 degrees of electrical angle in accordance with a phase of the specified voltage vector with reference to a predetermined fixed axis.

More specifically, for example, the specified voltage vector correcting portion decides whether the correction is necessary or not based on the amplitude of a coordinate axis component forming the two-phase specified voltage vector on the ab coordinates, and it corrects the specified voltage vector by correcting the coordinate axis component when the correction is necessary.

In addition, for example, the motor control device determines a phase of current flowing as the detection current based on the generated specified voltage vector, and detects the motor current in accordance with a result of the determination.

As the above-mentioned method of determining a phase of current based on the specified voltage vector, following methods can be exemplified more concretely. For example, a phase of current flowing as the detection current is determined based on a phase of the specified voltage vector with reference to a predetermined fixed axis.

Alternatively, for example, a phase of current flowing as the detection current is determined based on a coordinate axis component of the specified voltage vector on the ab coordinates and a variable corresponding to a phase difference between the coordinate axis on the ab coordinates and a predetermined fixed axis.

For example, the motor control device further includes a specified three-phase voltage value generating portion that generates specified three-phase voltage values from the specified voltage vector after the correction, decides timing for detecting the detection current based on the result of the determination and the specified three-phase voltage values, detects the motor current from the detection current detected at the timing, and controls the motor by supplying the specified three-phase voltage values to the inverter.

In addition, for example, it is possible to adopt the structure in which timing for detecting the detection current is decided based on a magnitude of the generated specified voltage vector, and the motor current is detected from the detection current that is detected at the timing.

In addition, for example, it is possible to adopt the structure in which timing for detecting the detection current is decided based on a coordinate axis component of the specified voltage vector on the ab coordinates, and the motor current is detected from the detection current that is detected at the timing.

In addition, a motor driving system according to the present invention includes a three-phase motor, an inverter that drives the motor, and a motor control device according to any one of above descriptions that controls the motor by controlling the inverter.

A current detecting unit according to the present invention includes a current detecting portion that detects current flowing between a three-phase inverter and a DC power supply, as detection current. The current detecting unit detects three phase current of the inverter from the detection current. The current detecting unit further includes a specified voltage vector generating portion that generates a specified voltage vector indicating a voltage vector that three-phase voltages of the inverter should follow, and a specified voltage vector correcting portion that corrects the generated specified voltage vector, so that the inverter is controlled in accordance with the specified voltage vector after the correction.

For example, in the current detecting unit, the specified voltage vector is a specified voltage vector on the rotating coordinates, the specified voltage vector correcting portion corrects the specified voltage vector on the rotating coordinates in the process of converting the specified voltage vector on the rotating coordinates into specified three-phase voltage values on the three-phase fixed coordinates, and the inverter is controlled in accordance with the specified three-phase voltage values corresponding to the specified voltage vector after the correction.

More specifically, for example, in the current detecting unit, the specified voltage vector is a two-phase specified voltage vector on the ab coordinates rotating in a stepping manner every 60 degrees of electrical angle in accordance with a phase of the specified voltage vector with reference to a predetermined fixed axis.

More specifically, for example, in the current detecting unit, the specified voltage vector correcting portion decides whether the correction is necessary or not based on the amplitude of a coordinate axis component forming the two-phase specified voltage vector on the ab coordinates, and it corrects the specified voltage vector by correcting the coordinate axis component when the correction is necessary.

In addition, an inverter controlling device according to the present invention includes a current detecting unit described above so as to control the inverter based on the detected three phase current, and the specified voltage vector generating portion that generates the specified voltage vector based on the three phase current.

For example, the inverter controlling device further includes a current converting portion that converts the three phase current into active current and reactive current with reference to a phase of an output voltage of the inverter. The specified voltage vector generating portion generates the specified voltage vector based on the active current and the reactive current.

In addition, a system interconnecting device according to the present invention includes an inverter controlling device described above and an inverter that converts the DC voltage from the DC power supply into three-phase AC voltage, so that AC power based on the AC voltage is supplied to a load by interconnection with an external three-phase AC power system.

BRIEF DESCRIPTION OF THE DRAWINGS

FIG. 6 is a diagram as a table showing combinations (modes) of a relationship of phase voltage levels in the motor shown in FIG. 1 and phases of current detected in the combinations.

FIG. 25 is a diagram showing a table for explaining a method of identifying a mode performed by the coordinate rotating portion shown in FIG. 23.

FIG. 28 is a diagram showing a table for explaining a method of identifying a mode performed by a mode deciding portion shown in FIG. 27.

DETAILED DESCRIPTION OF THE PREFERRED EMBODIMENTS

Figure 1:
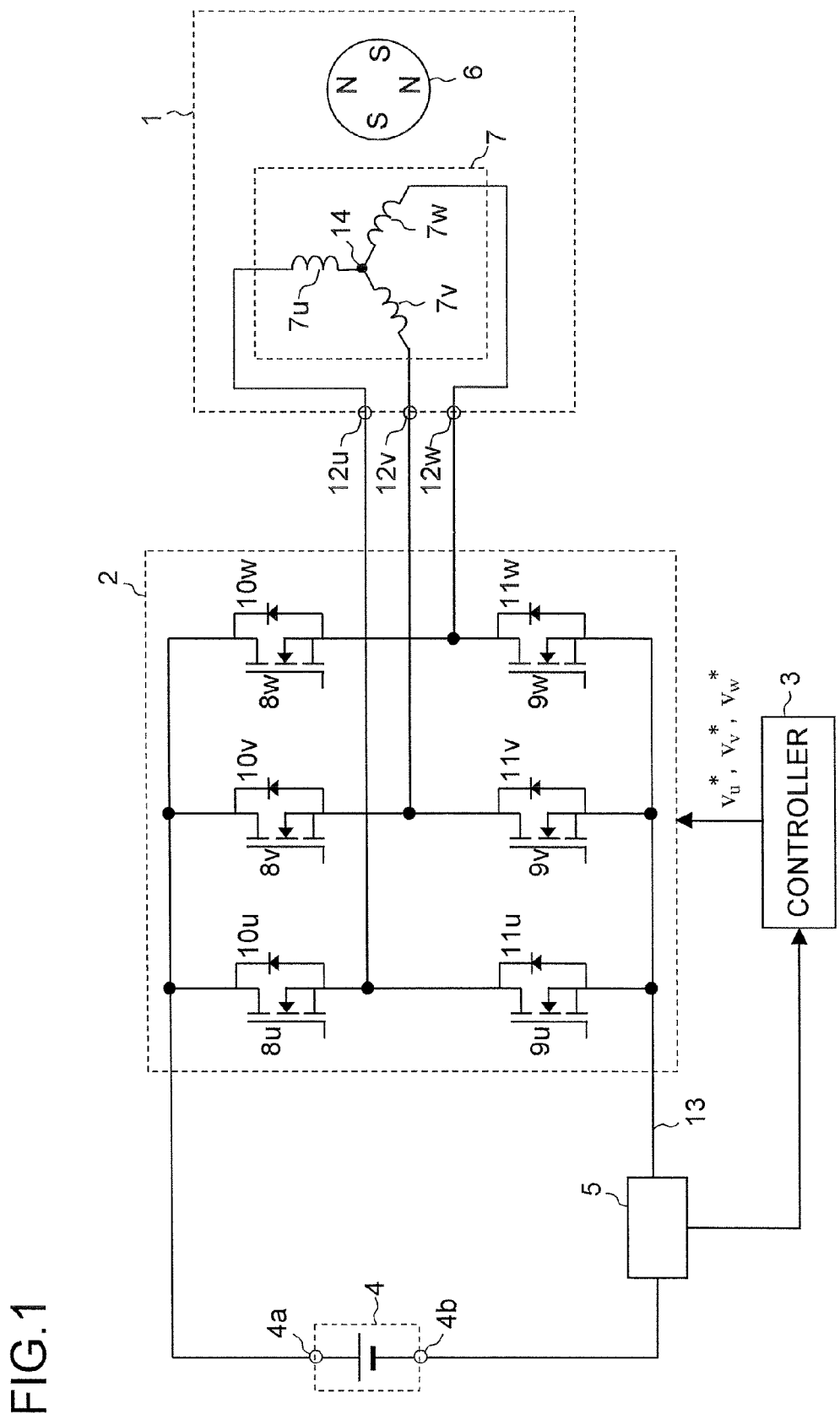
FIG. 1 is a block diagram of a general structure of a motor driving system according to a first embodiment of the present invention.

Hereinafter, embodiments of the present invention will be described concretely with reference to the attached drawings. In the drawings to be referred to, the same portions are denoted by the same references so that overlapping descriptions for the same portions will be omitted as a general rule.

First Embodiment

In the first place, a first embodiment of the present invention will be described. Before describing first to fifth examples of the first embodiment, items that are common to the examples and items to be referred to in each example will be described first. FIG. 1 is a block structural diagram of a motor driving system according to the first embodiment.

The motor driving system shown in FIG. 1 is equipped with a three-phase permanent-magnet synchronous motor 1 (hereinafter referred to as a "motor 1" simply), a PWM (Pulse Width Modulation) inverter 2 (hereinafter referred to as an "inverter 2" simply), a controller 3, a DC power supply 4 and a current sensor 5. The DC power supply 4 delivers a DC voltage between a positive output terminal 4a and a negative output terminal 4b so that the negative output terminal 4b becomes a low voltage side. The motor driving system shown in FIG. 1 adopts a single shunt current detecting method.

The motor 1 includes a rotor 6 to which a permanent magnet is provided and a stator 7 to which armature windings 7u, 7v and 7w of U-phase, V-phase and W-phase are provided. The armature windings 7u, 7v and 7w are connected at a neutral point 14 as a center in a form of Y-connection. Non-connection ends of the armature windings 7u, 7v and 7w that are opposite ends of the neutral point 14 are connected to terminals 12u, 12v and 12w, respectively.

The inverter 2 is provided with a half bridge circuit for the U-phase, a half bridge circuit for the V-phase and a half bridge circuit for the W-phase. Each of the half bridge circuits includes a pair of switching elements. In each of the half bridge circuits, the pair of switching elements are connected in series between the positive output terminal 4a and the negative output terminal 4b of the DC power supply 4, so that each of the half bridge circuits is supplied with a DC voltage from the DC power supply 4.

The half bridge circuit for the U-phase is made up of a high voltage side switching element 8u (hereinafter referred to as an upper arm 8u, too) and a low voltage side switching element 9u (hereinafter referred to as a lower arm 9u, too). The half bridge circuit for the V-phase is made up of a high voltage side switching element 8v (hereinafter referred to as an upper arm 8v, too) and a low voltage side switching element 9v (hereinafter referred to as a lower arm 9v, too). The half bridge circuit for the W-phase is made up of a high voltage side switching element 8w (hereinafter referred to as an upper arm 8w, too) and a low voltage side switching element 9w (hereinafter referred to as a lower arm 9w, too). In addition, the switching elements 8u, 8v, 8w, 9u, 9v and 9w are respectively connected to diodes 10u, 10v, 10w, 11u, 11v and 11w in parallel so that the direction from the low voltage side to the high voltage side of the DC power supply 4 becomes the forward direction. Each of the diodes works as a freewheel diode.

The connection node of the upper arm 8u and the lower arm 9u that are connected in series, the connection node of the upper arm 8v and the lower arm 9v that are connected in series, the connection node of the upper arm 8w and the lower arm 9w that are connected in series are connected to the terminals 12u, 12v and 12w, respectively. Note that field-effect transistors are shown as the switching elements in FIG. 1, but they can be replaced with IGBTs (Insulated Gate Bipolar Transistors) or the like.

The inverter 2 generates a PWM (Pulse Width Modulation) signal for each phase based on a specified three-phase voltage value supplied from the controller 3 and supplies the PWM signal to a control terminal (base or gate) of each switching element in the inverter 2, so that each switching element performs switching action. The specified three-phase voltage values that are supplied from the controller 3 to the inverter 2 include a specified U-phase voltage value $v_u^*$, a specified V-phase voltage value $v_v^*$ and a specified W-phase voltage value $v_w^*$. The specified voltage values $v_u^*$, $v_v^*$ and $v_w^*$ represent voltage levels (voltage values) of the U-phase voltage $v_u$, V-phase voltage $v_v$ and W-phase voltage $v_w$, respectively.

Then, the inverter 2 controls on (conducting state) or off (nonconducting state) of the switching elements based on the specified voltage values $v_u^*$, $v_v^*$ and $v_w^*$.

Ignoring a dead time for preventing the upper arm and the lower arm of the same phase from becoming the on state simultaneously, the upper arm is on when the lower arm is off in each half bridge circuit. On the contrary, the upper arm is off when the lower arm is on. In the following description, the above-mentioned dead time will be ignored.

The DC voltage applied to the inverter 2 by the DC power supply 4 is converted into a three-phase AC voltage that is PWM-modulated (pulse width modulated), for example, by the switching action of the switching elements in the inverter 2. When the three-phase AC voltage is applied to the motor 1, current corresponding to the three-phase AC voltage flows in the armature winding (7u, 7v and 7w) so that the motor 1 is driven.

The current sensor 5 senses current that flows in a bus line 13 of the inverter 2 (hereinafter referred to as "bus current"). The bus current includes a DC component, so it may be regarded as DC current. In the inverter 2, the low voltage sides of the lower arms 9u, 9v and 9w are connected together to the negative output terminal 4b of the DC power supply 4. The wiring line to which the low voltage sides of the lower arms 9u, 9v and 9w are connected together is the bus line 13, and the current sensor 5 is inserted in the bus line 13 in series. The current sensor 5 transmits a signal indicating a current value of the bus current (detection current) to the controller 3. The controller 3 refers to an output signal of the current sensor 5 and the like so as to generate and deliver the above-mentioned specified three-phase voltage values. Note that the current sensor 5 is a shunt resistor, a current transformer or the like, for example. In addition, it is possible to insert the current sensor 5 not in the wire (bus line 13) between the low voltage sides of the lower arms 9u, 9v and 9w and the negative output terminal 4b but in the wire between the high voltage sides of the upper arms 8u, 8v and 8w and the positive output terminal 4a.

Here, with reference to FIGS. 2, 3, 4, 5A-5D, and 6, a relationship between the bus current and the phase current flowing in the armature winding of each phase and the like will be described. The current flowing in the armature windings 7u, 7v and 7w are referred to as U-phase current, V-phase current and W-phase current, respectively, and each of them (or a generic name of them) is referred to as phase current (see FIG. 1). Further, concerning the phase current, a polarity of the current direction flowing from the terminal 12u, 12v or 12w to the neutral point 14 is regarded as positive, while a polarity of the current direction flowing from the neutral point 14 outward is regarded as negative.

Figures 2, 3:
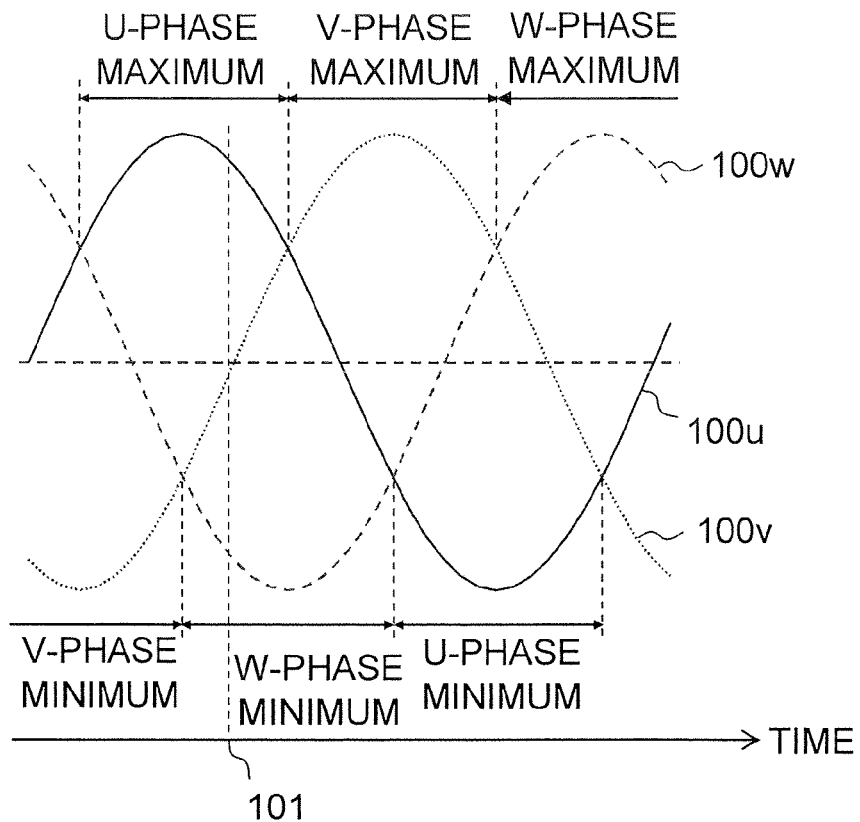
FIG. 2 is a diagram showing a typical example of a three-phase AC voltage that is applied to the motor shown in FIG. 1.
FIG. 3 is a diagram as a table showing a relationship between energizing patterns of the motor shown in FIG. 1 and bus current.

FIG. 2 shows a typical example of the three-phase AC voltage that is applied to the motor 1. In FIG. 2, references 100u, 100v and 100w show waveforms of the U-phase voltage, the V-phase voltage and the W-phase voltage to be applied to the motor 1, respectively. Each of the U-phase voltage, the V-phase voltage and the W-phase voltage (or a generic name of them) is referred to as phase voltage. When sinusoidal current is to be supplied to the motor 1, an output voltage of the inverter 2 should be a sine wave. Although each of the phase voltages shown in FIG. 2 is an ideal sine wave, a distortion is added to the sine wave in the present embodiment (as described later in detail).

As shown in FIG. 2, a relationship among the voltage levels of the U-phase voltage, the V-phase voltage and the W-phase voltage alters as time passes. This relationship is determined by the specified three-phase voltage values, and the inverter 2 decides an energizing pattern for each phase in accordance with the specified three-phase voltage values. FIG. 3 shows this energizing pattern as a table. In FIG. 3, the first to the third columns from the left side indicate the energizing pattern. The fourth column will be described later.

The energizing pattern includes:

an energizing pattern "LLL" in which all the lower arms of the U, V and W-phases are turned on;

an energizing pattern "LLH" in which the upper arm of the W-phase is turned on while the lower arms of the U and V-phases are turned on;

an energizing pattern "LHL" in which the upper arm of the V-phase is turned on while the lower arms of the U and W-phases are turned on;

an energizing pattern "LHH" in which the upper arms of the V and W-phases are turned on while the lower arm of the U-phase is turned on;

an energizing pattern "HLL" in which the upper arm of the U-phase is turned on while the lower arms of the V and W-phases are turned on;

an energizing pattern "HLH" in which the upper arms of the U and W-phases are turned on while the lower arm of the V-phase is turned on;

an energizing pattern "HHL" in which the upper arms of the U and V-phases are turned on while the lower arm of the W-phase is turned on; and an energizing pattern "HHH" in which all the upper arms of the U, V and W-phases are turned on (references of the upper arms and the lower arms ($8u$ and the like) are omitted).

Figure 4:
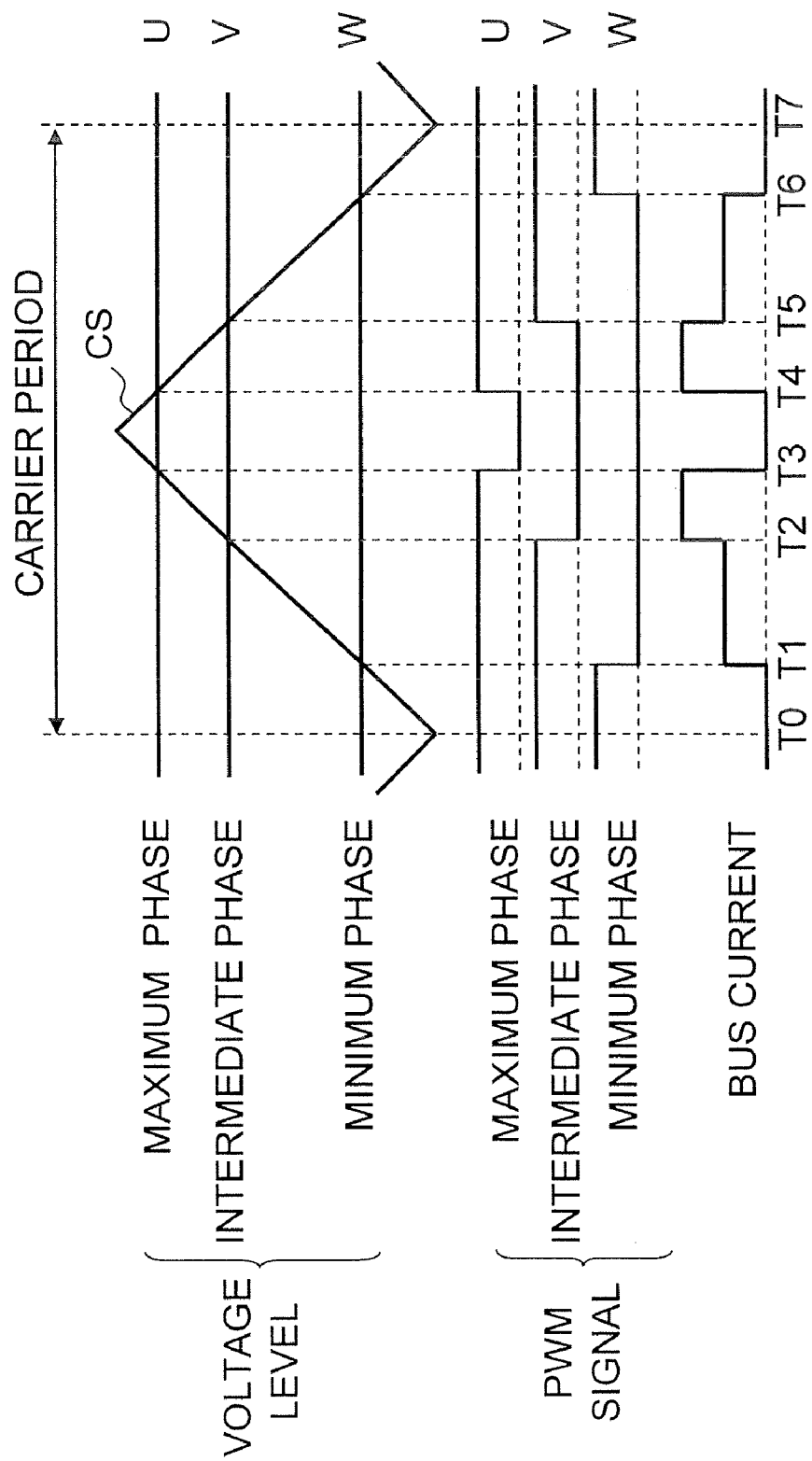
FIG. 4 is a diagram showing a relationship between a voltage level of each phase voltage and a carrier signal in the motor shown in FIG. 1 and waveforms of a PWM signal and bus current corresponding to the relationship.

FIG. 4 shows a relationship between a voltage level of each phase voltage and a carrier signal in the case where three-phase modulation is performed and waveforms of a PWM signal and bus current corresponding to the relationship. The relationship between voltage levels of the individual phase voltages changes variously, but FIG. 4 shows it by noting a certain timing 101 shown in FIG. 2 for concrete description. More specifically, FIG. 4 shows the case where a voltage level of the U-phase voltage is the maximum, and a voltage level of the W-phase voltage is the minimum. The phase having the maximum voltage level is referred to as a "maximum phase", the phase having the minimum voltage level is referred to as a "minimum phase", and the phase whose voltage level is not the maximum or the minimum is referred to as an "intermediate phase". In the state shown in FIG. 4, the maximum phase, the intermediate phase and the minimum phase are the U-phase, the V-phase and the W-phase, respectively. In FIG. 4, reference CS denotes a carrier signal that is compared with a voltage level of each phase voltage. The carrier signal is a periodical signal of a triangular wave, and the period of the signal is referred to as a carrier period. Note that the carrier period is much shorter than a period of the three-phase AC voltage shown in FIG. 2. Therefore, if the triangular wave of the carrier signal shown in FIG. 4 is added to the diagram of FIG. 2, the triangular wave will look like a single line.

Further with reference to FIGS. 5A-5D, a relationship between the phase current and the bus current will be described. FIGS. 5A-5D are equivalent circuits of the armature windings and a periphery thereof at individual timings shown in FIG. 4.

Figure 5A:
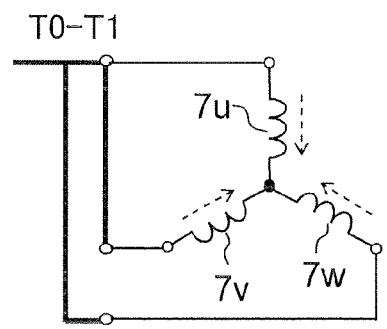
FIGS. 5A-5D are equivalent circuit diagrams of armature windings and a periphery thereof shown in FIG. 1 at each timing shown in FIG. 4.

A start timing of each carrier period, i.e., the timing when the carrier signal is a lowest level is referred to as T0. At the timing T0, the upper arms ($8u$, $8v$ and $8w$) of the individual phases are turned on. In this case, as shown in FIG. 5A, a short circuit is formed so that current from or to the DC power supply 4 becomes zero. Therefore, the bus current becomes zero.

Figure 5B:
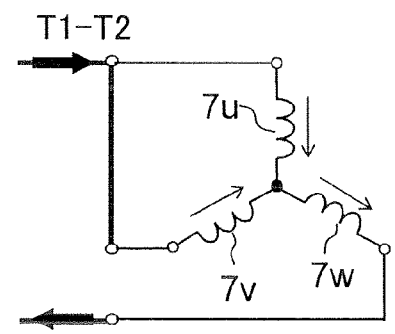

The inverter 2 refers to $v_u^*$, $v_v^*$ and $v_w^*$ so as to compare a voltage level of each phase voltage with the carrier signal. In the increasing process of a level of the carrier signal (voltage level), when a voltage level of the minimum phase crosses the carrier signal at the timing T1, the lower arm of the minimum phase is turned on. Then, as shown in FIG. 5B, current of the minimum phase flows as the bus current. In the example shown in FIG. 4, the lower arm $9w$ of the W-phase is in the turned-on state during the period from the timing T1 to a timing T2 that will be described later. Therefore, the W-phase current (having negative polarity) flows as the bus current.

Figure 5C:
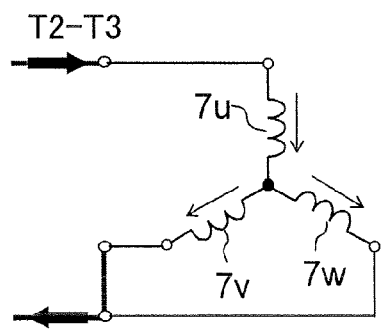

Further when a level of the carrier signal increases and reaches the timing T2 when a voltage level of the intermediate phase crosses the carrier signal, the upper arm of the maximum phase is turned on, and the lower arms of the intermediate phase and the minimum phase are turned on. Therefore, as shown in FIG. 5C, current of the maximum phase flows as the bus current. In the example shown in FIG. 4, the upper arm $8u$ of the U-phase is in the turned-on state, and the lower arms $9v$ and $9w$ of the V-phase and the W-phase are turned on in the period from the timing T2 to a timing T3 that will be described later. Therefore, the U-phase current (having positive polarity) flows as the bus current.

Figure 5D:
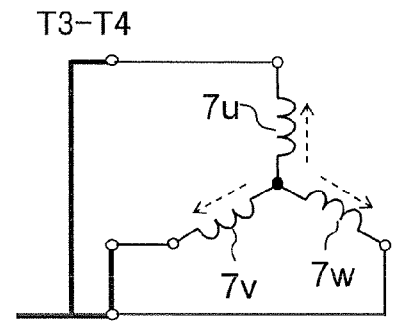

Further when a level of the carrier signal increases and reaches the timing T3 when a voltage level of the maximum phase crosses the carrier signal, the lower arms of all phases are turned on. Therefore, as shown in FIG. 5D, a short circuit is formed so that current from or to the DC power supply 4 becomes zero. Therefore, the bus current becomes zero.

At a middle timing between the timing T3 and a timing T4 that will be described later, the carrier signal reaches the maximum level, and then a level of the carrier signal decreases. In the decreasing process of a level of the carrier signal, the states as shown in FIGS. 5D, 5C, 5B and 5A appear one by one in this order. More specifically, in the decreasing process of a level of the carrier signal, it is supposed that a voltage level of the maximum phase crosses the carrier signal at the timing T4, a voltage level of the intermediate phase crosses the carrier signal at a timing T5, a voltage level of the minimum phase crosses the carrier signal at a timing T6, and a next carrier period starts at a timing T7. Then, the period between the timing T4 and the timing T5, the period between the timing T5 and the timing T6, the period between the timing T6 and the timing T7 have the same energizing patterns as the period T2-T3, the period T1-T2 and the period T0-T1, respectively.

Therefore, if the bus current is sensed in the period T1-T2 or T5-T6, the minimum phase current can be detected from the bus current. If the bus current is sensed in the period T2-T3 or T4-T5, the maximum phase current can be detected from the bus current. Then, the intermediate phase current can be obtained by calculation utilizing the fact that a sum of the three phase current values becomes zero. The fourth column in the table shown in FIG. 3 indicates a phase of current that flows as the bus current in each energizing pattern with a polarity of the current. For example, in the energizing pattern "HHL" corresponding to the eighth row in the table shown in FIG. 3, the W-phase current (having negative polarity) flows as the bus current.

Furthermore, the period obtained by removing the period between the timing T1 and the timing T6 from the carrier period indicates a pulse width of the PWM signal for the minimum phase. The period obtained by removing the period between the timing T2 and the timing T5 from the carrier period indicates a pulse width of the PWM signal for the intermediate phase. The period obtained by removing the period between the timing T3 and the timing T4 from the carrier period indicates a pulse width of the PWM signal for the maximum phase.

Although the above description exemplifies the case where the U-phase is the maximum phase and the W-phase is the minimum phase, there are six combinations of the maximum phase, the intermediate phase and the minimum phase. FIG. 6 shows the combinations as a table. When the U-phase voltage, the V-phase voltage and the W-phase voltage are denoted by $v_u$, $v_v$ and $v_w$, respectively, the state that satisfies "$v_u > v_v > v_w$" is referred to as a first mode, the state that satisfies "$v_v > v_u > v_w$" is referred to as a second mode, the state that satisfies "$v_v > v_w > v_u$" is referred to as a third mode, the state that satisfies "$v_w > v_v > v_u$" is referred to as a fourth mode, the state that satisfies "$v_w > v_u > v_v$" is referred to as a fifth mode, and the state that satisfies "$v_u > v_w > v_v$" is referred to as a sixth mode. The examples shown in FIGS. 4 and 5A-5D correspond to the first mode. In addition, FIG. 6 also indicates a phase of current sensed in each mode.

The specified U-phase voltage value $v_u^*$, the specified V-phase voltage value $v_v^*$ and the specified W-phase voltage value $v_w^*$ are specifically shown as set values of counter CntU, CntV and CntW, respectively. A larger set value is assigned to a higher phase voltage. For example, "CntU>CntV>CntW" holds in the first mode.

The counter (not shown) that is provided to the controller 3 increments its count value from zero every carrier period with reference to the timing T0. When the count value reaches CntW, the state in which the upper arm 8w of the W-phase is turned on is switched to the state in which the lower arm 9w is turned on. When the count value reaches CntV, the state in which the upper arm 8v of the V-phase is turned on is switched to the state in which the lower arm 9v is turned on. When the count value reaches CntU, the state in which the upper arm 8u of the U-phase is turned on is switched to the state in which the lower arm 9u is turned on. After the carrier signal reached the maximum level, the count value is decremented so that the switching action is performed reversely.

Therefore, in the first mode, the timing when the above-mentioned counter value reaches CntW corresponds to the timing T1. The timing when it reaches CntV corresponds to the timing T2. The timing when it reaches CntU corresponds to the timing T3. For this reason, in the first mode, while the counter value is incremented, the output signal of the current sensor 5 is sampled at a timing when the counter value is larger than CntW and is smaller than CntV, so that the W-phase current (having negative polarity) flowing as the bus current can be detected. Furthermore, the output signal of the current sensor 5 is sampled at a timing when the counter value is larger than CntV and is smaller than CntU, so that the U-phase current (having positive polarity) flowing as the bus current can be detected.

In the same manner, as shown in FIG. 6, in the second mode, the timing when the above-mentioned counter value reaches CntW corresponds to the timing T1. The timing when it reaches CntU corresponds to the timing T2. The timing when it reaches CntV corresponds to the timing T3. For this reason, in the second mode, while the counter value is incremented, the W-phase current (having negative polarity) can be detected from the bus current at the timing when the counter value is larger than CntW and is smaller than CntU. The V-phase current (having positive polarity) can be detected from the bus current at the timing when the counter value is larger than CntU and is smaller than CntV. Ditto for the third to the sixth modes.

In addition, sampling timing for sensing phase current of the minimum phase in the period T1-T2 (e.g., mid-term between the timing T1 and the timing T2) is denoted by ST1, and sampling timing for sensing phase current of the maximum phase in the period T2-T3 (e.g., mid-term between the timing T2 and the timing T3) is denoted by ST2.

Note that a pulse width (and a duty factor) of the PWM signal for each phase is specified by the set values CntU, CnuV and CntW of the counter as the specified three-phase voltage values ($v_u^*$, $v_v^*$ and $v_w^*$).

When each phase current is detected from the bus current based on the above-mentioned principle, as understood from FIG. 4, if the voltage levels of the maximum phase and the intermediate phase approach each other for example, a time length between the period T2-T3 and the period T4-T5 becomes short. When the bus current is detected by converting an analog output signal from the current sensor 5 shown in FIG. 1 into a digital signal, if this time length is extremely short, necessary time for A/D conversion or a converging time for a ringing (a current ripple that is caused by the switching) cannot be secured. As a result, phase current of the maximum phase cannot be sensed. In the same manner, if the voltage levels of the minimum phase and the intermediate phase approach each other, phase current of the minimum phase cannot be sensed. If the current values of two phases cannot be measured, phase current of three phases cannot be reproduced. As a result, a vector control of the motor 1 cannot be performed.

In the present embodiment (examples that will be described later), during the period while it is considered that such current values of two phases cannot be measured, a voltage vector (specified voltage vector) indicating an applied voltage to the motor 1 is corrected so that a voltage level difference between phase voltages is maintained higher than a predetermined value, for canceling the malfunction described above.

Figure 7:
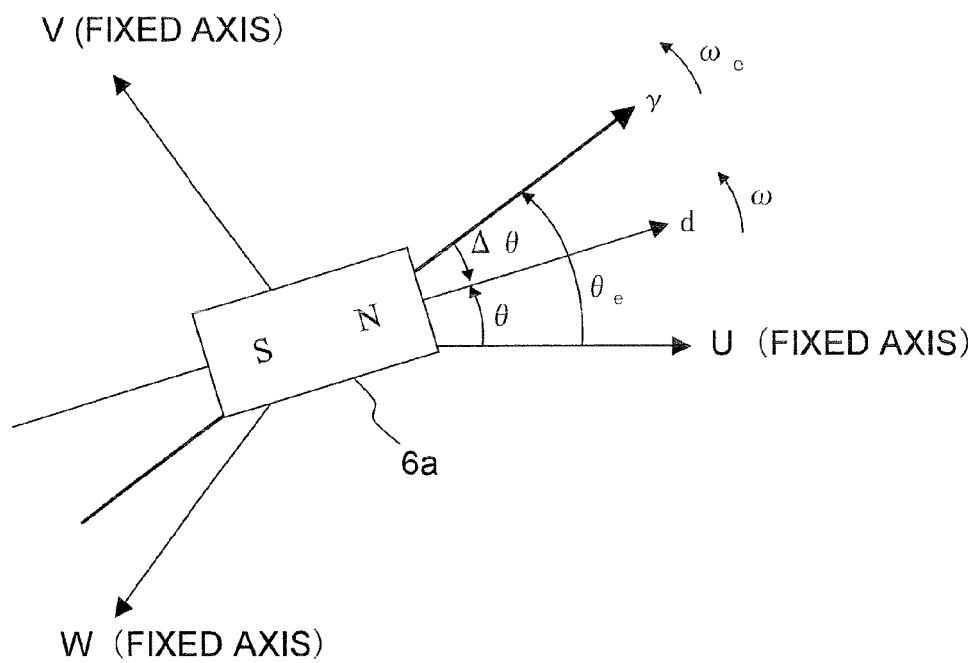
FIG. 7 is an analytic model diagram of the motor shown in FIG. 1.

Prior to a detailed description of this correction method, various kinds of state quantities (state variables) will be described and defined. FIG. 7 is an analytic model diagram of the motor 1. FIG. 7 shows armature winding fixed axes of the U-phase, the V-phase and the W-phase (hereinafter, they may be simply referred to as the U-phase axis, the V-phase axis and the W-phase axis). Numeral 6a denotes a permanent magnet that is provided to the rotor 6 of the motor 1. In a rotating coordinate system that rotate at the same speed as magnetic flux generated by the permanent magnet 6a, the d-axis is defined as the direction of the magnetic flux generated by the permanent magnet 6a. In addition, the q-axis is defined as the phase leading the d-axis by 90 degrees of electrical angle, though it is not shown.

In addition, if a position sensor for detecting a rotor position is not used for performing the vector control on the motor 1, estimated axes for control are defined because the real d-axis and q-axis are unknown. A γ-axis is defined as the estimated axis for control corresponding to the d-axis, and a δ-axis is defined as the estimated axis for control corresponding to the q-axis. The δaxis is an axis leading from the γ-axis by 90 degrees of electrical angle (not shown in FIG. 7). Usually, the vector control is performed so that the γ-axis and the δaxis match the d-axis and the q-axis, respectively. The d-axis and the q-axis are the coordinate axes in the actual rotating coordinate system, and the coordinates that selects them as the coordinate axes is referred to as the dq coordinates. The γ-axis and the δaxis are coordinate axes in the rotating coordinate system for control (estimated rotating coordinate system), and the coordinates that selects them as the coordinate axes is referred to as the γδ coordinates.

The d-axis (and the q-axis) is rotating, and its rotation speed (electrical angle speed) is referred to as an actual motor speed ω. The γ-axis (and δ-axis) is also rotating, and its rotation speed (electrical angle speed) is referred to as an estimated motor speed $ω_e$. In addition, as to the rotating dq coordinates at a moment, a phase of the d-axis is expressed by θ (actual rotor position θ) with reference to the armature winding fixed axis of the U-phase. In the same manner, as to the rotating γδ coordinates at a moment, a phase of the γ-axis is expressed by $θ_e$ (estimated rotor position $θ_e$) with reference to the armature winding fixed axis of the U-phase. Then, an axial error Δθ between the d-axis and the γ-axis is expressed by "$Δθ=θ-θ_e$".

In addition, a whole motor voltage that is applied to the motor 1 from the inverter 2 is denoted by $V_a$, while a whole motor current that is supplied to the motor 1 from the inverter 2 is denoted by $I_a$. Then, a γ-axis component, a δ-axis component, a d-axis component and a q-axis component of the motor voltage $V_a$ are expressed as γ-axis voltage $v_γ$, a δ-axis voltage $v_δ$, a d-axis voltage $V_d$ and a q-axis voltage $V_q$, respectively. Further, a γ-axis component, a δ-axis component, a d-axis component and a q-axis component of the motor current $I_a$ are expressed as a γ-axis current $i_γ$, a δ-axis current $i_δ$, a d-axis current $i_d$ and a q-axis current $i_q$, respectively.

In addition, specified values with respect to the γ-axis voltage $v_γ$, the δ-axis voltage $v_δ$, the d-axis voltage $v_d$ and the q-axis voltage $v_q$ (specified voltage values) are referred to as a specified γ-axis voltage value $v_γ^*$, a specified δ-axis voltage value $v_δ^*$, a specified d-axis voltage value $v_d^*$ and a specified q-axis voltage value $v_q^*$, respectively, which will also be referred to in other examples described later. The specified voltage values $v_γ^*$, $v_δ^*$, $v_d^*$ and $v_q^*$ indicate voltage (voltage values) that are calculated in the motor driving system and that the voltages $v_γ$, $v_δ$, $v_d$ and $v_q$ should follow, respectively.

Furthermore, specified values with respect to the γ-axis current $i_γ$, the δ-axis current $i_δ$, the d-axis current $i_d$ and the q-axis current $i_q$ (specified current values) are referred to as a specified γ-axis current value $i_γ^*$, a specified δaxis current value $i_δ^*$, a specified d-axis current value $i_d^*$ and a specified q-axis current value $i_q^*$, respectively. The specified current values $i_γ^*$, $i_δ^*$, $i_d^*$ and $i_q^*$ indicate current (current values) that are calculated in the motor driving system and that the currents $i_γ$, $i_δ$, $i_d$ and $i_q$ should follow, respectively.

[About Correction Method]

Hereinafter, a correction method of the voltage vector that is a characteristic function of the present embodiment will be described.

Figure 8:
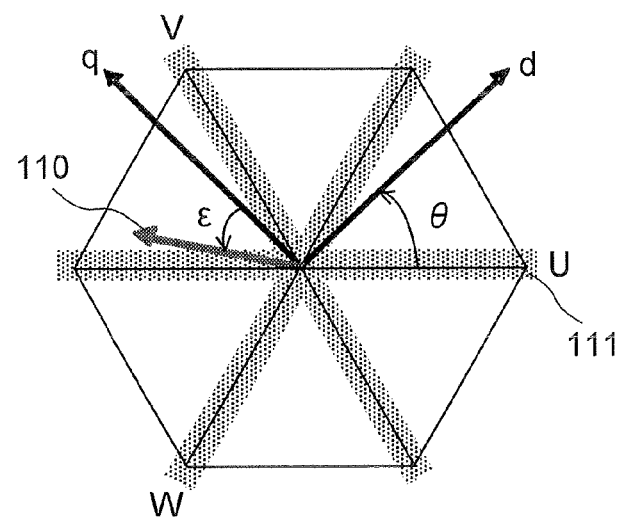
FIG. 8 is a space vector diagram showing a relationship among the U-phase axis, the V-phase axis and the W-phase axis that are fixed axes and a d-axis and a q-axis that are rotation axes and a voltage vector in a first embodiment of the present invention.

FIG. 8 shows a space vector diagram indicating a relationship among the U-phase axis, the V-phase axis and the W-phase axis that are fixed axes and the d-axis and the q-axis that are rotation axes and the voltage vector. The vector denoted by reference 110 is the voltage vector. A phase of the voltage vector 110 viewed from the q-axis is denoted by ε. A phase of the voltage vector 110 with reference to the U-phase axis is expressed by (θ+ε+π/2).

The voltage vector 110 is the voltage applied to the motor 1 that is regarded as a vector. For example, noting the dq coordinates, the d-axis component and the q-axis component of the voltage vector 110 are $v_d$ and $v_q$, respectively. Actually, the specified d-axis voltage value $v_d^*$ and the specified q-axis voltage value $v_q^*$ are calculated in the motor driving system, and the voltage vector 110 is expressed by using $v_d^*$ and $v_q^*$. For this reason, the voltage vector can also be referred to as the specified voltage vector.

An asterisk region 111 with hatching that includes a vicinity of the U-phase axis, a vicinity of the V-phase axis and a vicinity of the W-phase axis indicates the region where current values of two phases cannot be detected. For example, if the V-phase voltage and the W-phase voltage are close to each other so that current values of two phases cannot be detected, the voltage vector 110 is located at a vicinity of the U-phase axis. If the U-phase voltage and the W-phase voltage are close to each other so that current values of two phases cannot be detected, the voltage vector 110 is located at a vicinity of the V-phase axis.

In this way, the region 111 where current values of two phases cannot be detected exist every 60 degrees of electrical angle with reference to the U-phase axis. If the voltage vector 110 exists in the region 111, the current values of two phases cannot be detected. Therefore, if the voltage vector exists in the region 111, the voltage vector should be corrected so that the voltage vector becomes a vector outside the region 111.

Figure 9:
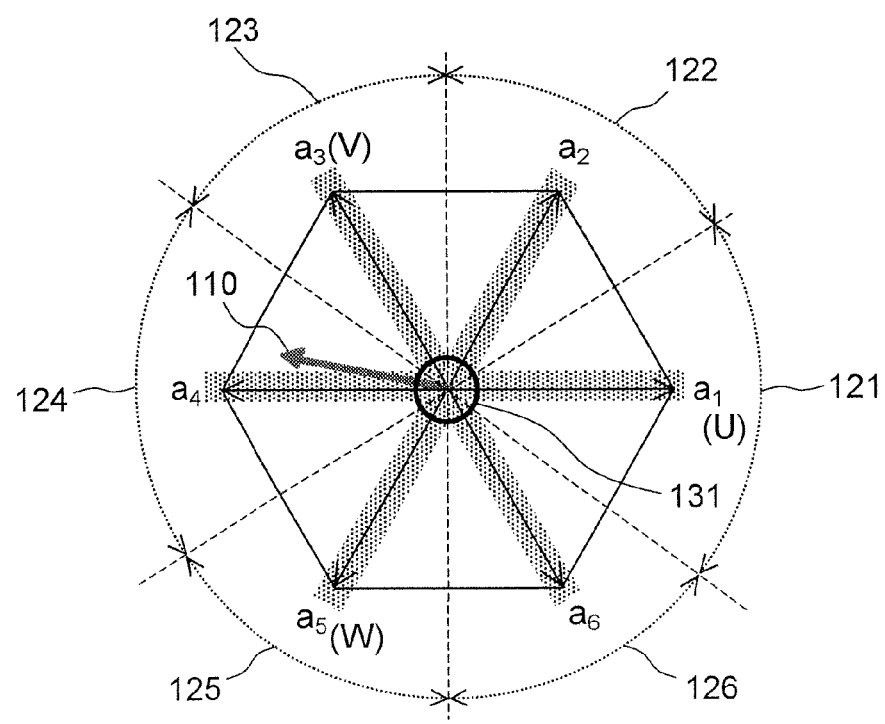
FIG. 9 is a diagram for explaining a-axis defined in the present invention.

In order to perform this correction, noting characteristic of the region 111 in which current values of two phases cannot be detected, it is considered coordinates that rotate in a stepping manner every 60 degrees of electrical angle. The coordinates are referred to as ab coordinates (note that the dq coordinates and the γβ coordinates are coordinates that rotate continuously). The ab coordinates have coordinate axes of the a-axis and the b-axis that are orthogonal to each other. FIG. 9 shows six axes that the a-axis can be. The a-axis becomes any one of $a_1$ to $a_6$ axes in accordance with the phase (θ+ε+π/2) of the voltage vector 110. The $a_1$ axis, the $a_3$ axis and the $a_5$ axis match the U-phase axis, the V-phase axis and the W-phase axis, respectively. The $a_2$ axis, the $a_4$ axis and the $a_6$ axis match an intermediate axis between the $a_1$ axis and the $a_3$ axis, an intermediate axis between the $a_3$ axis and the $a_5$ axis, and an intermediate axis between the $a_5$ axis and the $a_1$ axis, respectively. Note that a circle denoted by reference 131 will be described later.

If the voltage vector 110 is located in the range denoted by reference 121, i.e., "11π/6≦(θ+ε+π/2)<0" or "0≦(θ+ε+π/2)<π/6" holds, the a-axis becomes the $a_1$ axis.

If the voltage vector 110 is located in the range denoted by reference 122, i.e., "π/6≦(θ+ε+π/2)<π/2" holds, the a-axis becomes the $a_2$ axis.

If the voltage vector 110 is located in the range denoted by reference 123, i.e., "π/2≦(θ+ε+π/2)<5π/6" holds, the a-axis becomes the $a_3$ axis.

If the voltage vector 110 is located in the range denoted by reference 124, i.e., "5π/6≦(θ+ε+π/2)<7π/6" holds, the a-axis becomes the $a_4$ axis.

If the voltage vector 110 is located in the range denoted by reference 125, i.e., "7π/6≦(θ+ε+π/2)<3π/2" holds, the a-axis becomes the $a_5$ axis.

If the voltage vector 110 is located in the range denoted by reference 126, i.e., "3π/2≦(θ+ε+π/2)<11π/6" holds, the a-axis becomes the $a_6$ axis.

For example, if the voltage vector 110 is located at the position shown in FIG. 9, the a-axis becomes the $a_4$ axis.

In this way, the a-axis rotates in a stepping manner every 60 degrees along with rotation of the voltage vector, and the b-axis also rotates in a stepping manner every 60 degrees together with the a-axis and being orthogonal to the same. The a-axis and the b-axis can be expressed to be coordinate axes that are digitized every 60 degrees and rotate every 60 degrees. For this reason, the a-axis is always located at the center of the region where current values of two phases cannot be detected. In this correction method, a voltage vector on the dq coordinates is converted into that on the ab coordinates, and they are corrected if necessary by referring to the a-axis component and the b-axis component of the voltage vector converted into that on the ab coordinates (e.g., the b-axis component is increased by the correction).

Figure 10:
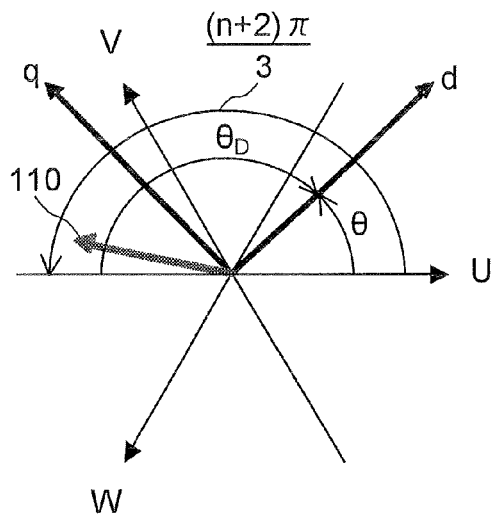
FIG. 10 is a diagram showing a state in which a rotor phase (θ) is disassembled considering a relationship with the a-axis shown in FIG. 9.

More concrete method of realizing this correction process will be described. A phase of the axis to which the voltage vector 110 is closest among the $a_1$ to $a_6$ axes is expressed by "$(n+2)\pi/3$" with reference to the U-phase axis. Here, "n" is a quotient that is obtained by dividing $(\theta+\epsilon)$ by $\pi/3$. For convenience sake, as shown in FIG. 10, $\theta$ is divided into the above-mentioned phase $(n+2)\pi/3$ and a phase difference $\theta_D$ between it and phase $(n+2)\pi/3$. A relationship between these phases is expressed by the equation (1-1) and the equation (1-2).

$$\theta + \varepsilon = \frac{n\pi}{3} + \alpha, \quad \left(\text{where, } 0 \le \alpha < \frac{\pi}{3}\right) \qquad (1\text{-}1)$$

$$\theta = \theta_D + \frac{(n+2)\pi}{3} \qquad (1\text{-}2)$$

Coordinate conversion of the dq coordinates is performed by the phase difference $\theta_D$, so that the voltage vector 110 is regarded as a voltage vector on the ab coordinates. Considering on the ab coordinates, the a-axis component and the b-axis component of the voltage vector 110 is regarded as the a-axis voltage $v_a$ and the b-axis voltage $v_b$. Then, the d-axis voltage $v_d$ and q-axis voltage $v_q$ as well as the a-axis voltage $v_a$ and the b-axis voltage $v_b$ hold a coordinate conversion equation of the equation (1-3) as below.

$$\begin{pmatrix} v_a \\ v_b \end{pmatrix} = \begin{bmatrix} \cos\theta_D & -\sin\theta_D \\ \sin\theta_D & \cos\theta_D \end{bmatrix} \begin{pmatrix} v_d \\ v_q \end{pmatrix} \qquad (1\text{-}3)$$

The phase difference $\theta_D$ can be calculated as below. A value of n matching $\epsilon$ calculated by using the equation (1-4) as below (i.e., a quotient obtained by dividing $(\theta+\epsilon)$ by $\pi/3$) is determined by referring to $\theta$. Substituting the determined n and $\theta$ into the above-mentioned equation (1-2), then the phase difference $\theta_D$ can be obtained.

$$\varepsilon = \tan^{-1}\left(\frac{-v_d}{v_q}\right) \qquad (1\text{-}4)$$

Figure 11:
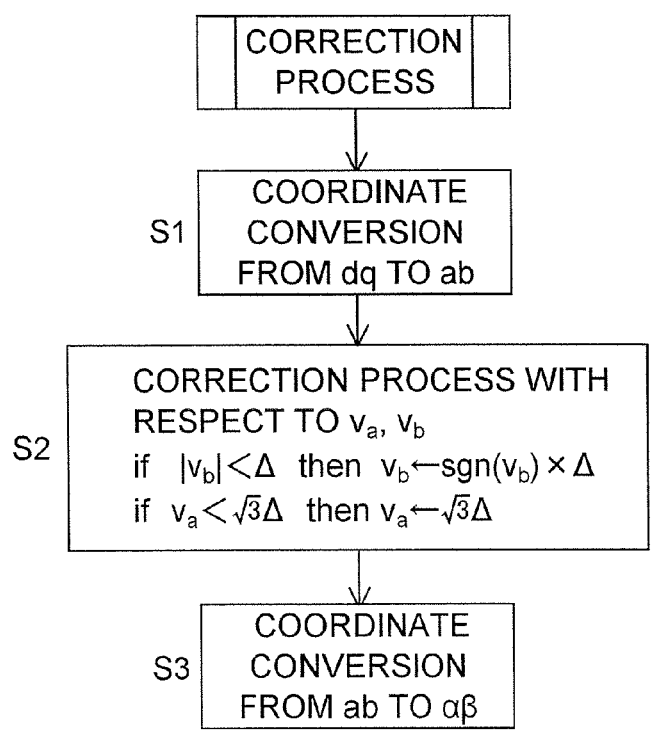
FIG. 11 is a flowchart showing a procedure of a correction process of a voltage vector according to the present invention.

Then, the correction process is performed with referring to the a-axis voltage $v_a$ and the b-axis voltage $V_b$ calculated in accordance with the equation (1-3). FIG. 11 shows a flowchart indicating a procedure of this correction process. In the step S1, the coordinate conversion is performed in accordance with the equation (1-3). In the following step S2, the correction process with respect to $v_a$ and $v_b$ is performed.

In the step S2, it is decided first whether or not a value that indicates an amplitude of the b-axis voltage $v_b$ (i.e., an absolute value of the b-axis voltage $v_b$) is smaller than a predetermined threshold value $\Delta$ (here, $\Delta>0$). In other words, it is decided whether or not the expression (1-5) as below is satisfied. Further, if the absolute value of the b-axis voltage $v_b$ is smaller than the threshold value $\Delta$ and the b-axis voltage $v_b$ is positive, the correction is performed so that $v_b$ equals $\Delta$. If the absolute value of the b-axis voltage $v_b$ is smaller than the threshold value $\Delta$ and the b-axis voltage $v_b$ is negative, the correction is performed so that $V_b$ equals $(-\Delta)$. If the absolute value of the b-axis voltage $v_b$ is more than or equal to the threshold value $\Delta$, the correction is not performed with respect to $v_b$.

Furthermore, in the step S2, it is also decided whether or not the a-axis voltage $v_a$ satisfies the equation (1-6) as below. If it satisfies the equation (1-6), the correction of $v_a$ is performed so that $v_a$ becomes equal to the right side of the equation (1-6). If $v_a$ does not satisfy the equation (1-6) as below, the correction is not performed with respect to $v_a$. Note that the equation (1-6) is used for deciding whether the voltage vector 110 is included inside the circle 131 shown in FIG. 9. The state where the voltage vector 110 is included inside the circle 131 corresponds to the state where the phase voltages of three phases are close to each other. In this state, the current values of two phases cannot be detected regardless of a value of the b-axis voltage $v_b$.

$$|v_b| < \Delta \qquad (1\text{-}5)$$

$$v_a < \sqrt{3}\Delta \qquad (1\text{-}6)$$

Figure 12A:
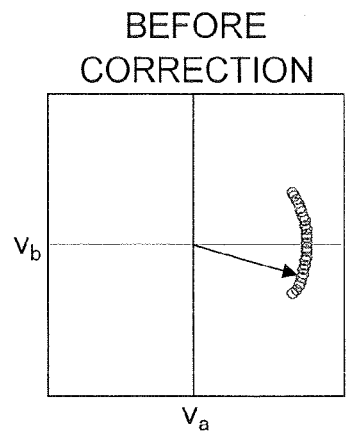
FIG. 12A is a diagram showing a voltage vector locus on the ab coordinates before the correction process shown in FIG. 11.
Figure 12B:
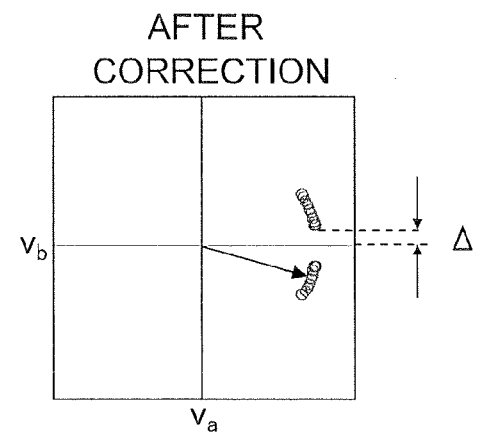
FIG. 12B is a diagram showing a voltage vector locus on the ab coordinates after the correction process shown in FIG. 11.

FIGS. 12A and 12B show a locus of the voltage vector (110) on the ab coordinates before and after the correction process performed in the step S2. FIG. 12A shows a voltage vector locus on the ab coordinates before the correction, and FIG. 12B shows a voltage vector locus on the ab coordinates after the correction. FIGS. 12A and 12B exemplify a case where the b-axis voltage $v_b$ is corrected. Each of FIGS. 12A and 12B shows a lot of plotted dots indicating voltage values at timings. The voltage vector before the correction corresponding to FIG. 12A can be located at a vicinity of the a-axis where current values of two phases cannot be detected, while the voltage vector after the correction corresponding to FIG. 12B is not located at a vicinity of the a-axis by the correction with respect to $v_b$.

Figure 13:
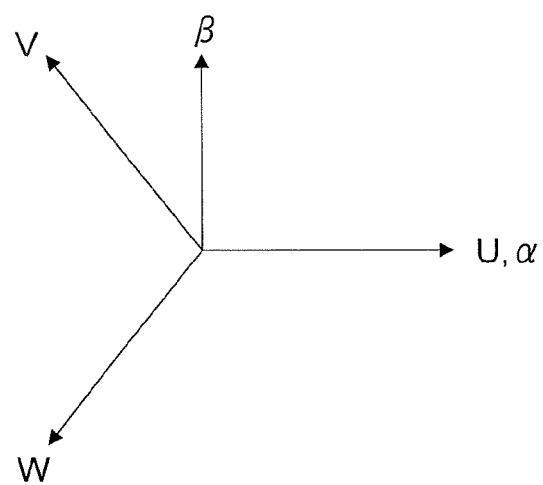
FIG. 13 is a diagram showing a relationship among the U-phase axis, the V-phase axis, the W-phase axis, the α-axis and the β-axis.

After the correction process in the step S2, the coordinates of the voltage vector 110 after the correction is converted by the "phase $(n+2)\pi/3$" in the step S3. In other words, the voltage vector 110 on the ab coordinates after the correction is converted into the voltage vector 110 on the $\alpha\beta$ coordinates. The $\alpha\beta$ coordinates ($\alpha\beta$ fixed coordinates) are fixed coordinates having coordinate axes that are the $\alpha$-axis and the $\beta$-axis orthogonal to the $\alpha$-axis. As shown in FIG. 13, the $\alpha$-axis is identical to the U-phase axis. Supposing that the $\alpha$-axis component and the $\beta$-axis component of the voltage vector 110 is the $\alpha$-axis voltage $v_\alpha$ and the $\beta$-axis voltage $v_\beta$, the $\alpha$-axis voltage $v_\alpha$ and the $\beta$-axis voltage $v_\beta$, as well as the a-axis voltage $v_a$ and the b-axis voltage $v_b$ after the correction satisfy the equation (1-7) as below, which is a coordinate conversion equation.

$$\begin{pmatrix} v_\alpha \\ v_\beta \end{pmatrix} = \begin{bmatrix} \cos((n+2)\pi/3) & -\sin((n+2)\pi/3) \\ \sin((n+2)\pi/3) & \cos((n+2)\pi/3) \end{bmatrix} \begin{pmatrix} v_a \\ v_b \end{pmatrix} \qquad (1\text{-}7)$$

In addition, it is also possible to convert the a-axis voltage $v_a$ and the b-axis voltage $v_b$ after the correction into the U-phase voltage $v_u$ and the V-phase voltage $v_v$ in accordance with the equation (1-8) below. In addition, the W-phase voltage $v_w$ is calculated in accordance with the equation (1-9) as below.

$$\begin{pmatrix} v_u \\ v_v \end{pmatrix} = \sqrt{\frac{2}{3}} \begin{bmatrix} \cos((n+2)\pi/3) & -\sin((n+2)\pi/3) \\ \cos(n\pi/3) & -\sin(n\pi/3) \end{bmatrix} \begin{pmatrix} v_a \\ v_b \end{pmatrix} \qquad (1\text{-}8)$$

$$v_w = -(v_u + v_v) \qquad (1\text{-}9)$$

Figure 14:
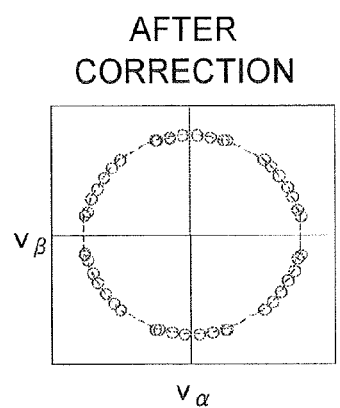
FIG. 14 is a diagram showing the voltage vector locus on the αβ coordinates that are obtained through the correction process shown in FIG. 11.
Figure 15A:
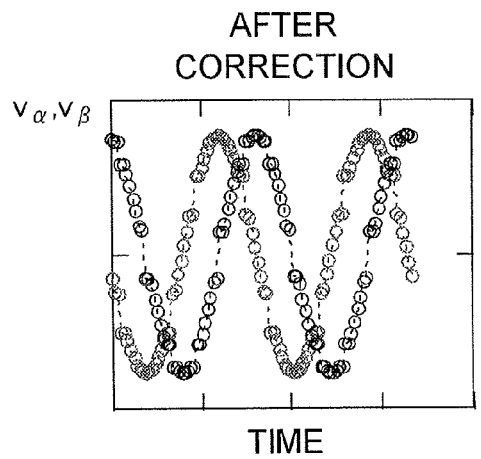
FIG. 15A is a diagram showing voltage waveforms of the α-axis voltage and the β-axis voltage obtained through the correction process shown in FIG. 11.
Figure 15B:
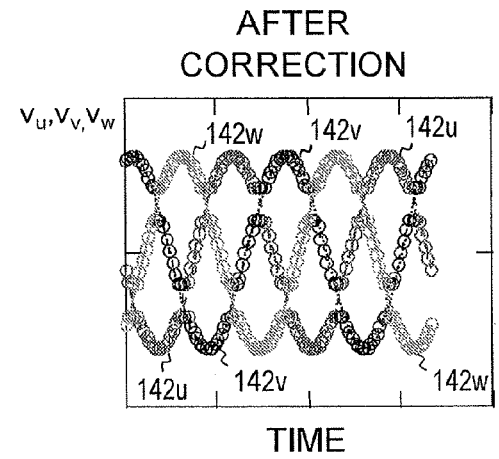
FIG. 15B is a diagram showing voltage waveforms of a U-phase voltage, a V-phase voltage and a W-phase voltage obtained through the correction process shown in FIG. 11.

The voltage vector locus on the $\alpha\beta$ coordinates after the above-mentioned correction process is shown in FIG. 14. By this correction process, an area where the voltage vector is not located exists every 60 degrees of electrical angle in the $\alpha\beta$ coordinates that are fixed coordinates. In addition, the voltage waveform of $v_\alpha$ and $v_\beta$ obtained through the above-mentioned correction process is shown in FIG. 15A with the horizontal axis of time. In addition, the voltage waveform of $v_u$, $v_v$ and $v_w$ obtained through the above-mentioned correction process is shown in FIG. 15B with the horizontal axis of time. In FIG. 15B, plotted dots 142*u* on the distorted sine wave indicate a locus of $v_u$, plotted dots 142*v* on the distorted sine wave indicate a locus of $v_v$, and plotted dots 142*w* on the distorted sine wave indicate a locus of $v_w$. As understood from FIG. 15B too, a voltage difference between the phase voltages is secured to be larger than a predetermined value by the above-mentioned correction process.

Thus, in this correction method, when the coordinate conversion is performed from the dq coordinates to the fixed coordinates (e.g., the $\alpha\beta$ coordinates), the two-step coordinate conversion is performed via the ab coordinates. Since the correction process with respect to the voltage vector is performed on the ab coordinates that facilitate the correction, the necessary correction can be performed simply and securely. Since it is sufficient only to correct coordinate axis components $v_a$ and $v_b$ of the voltage vector (specified voltage vector) independently on the ab coordinates, the correction contents can be simple. In particular, the correction is necessary for all the three phases if the applied voltage is low, and it is easy to determine correction quantity in this case, too.

Note that it is obvious from the above-mentioned equation (1-2) that this two-step coordinate conversion is equivalent to the coordinate conversion between the dq coordinates and the $\alpha\beta$ coordinates (normal one-step coordinate conversion), i.e., that the equation (1-10) as below holds.

$$\begin{bmatrix} \cos\theta & -\sin\theta \\ \sin\theta & \cos\theta \end{bmatrix} = \begin{bmatrix} \cos((n+2)\pi/3) & -\sin((n+2)\pi/3) \\ \sin((n+2)\pi/3) & \cos((n+2)\pi/3) \end{bmatrix} \begin{bmatrix} \cos\theta_D & -\sin\theta_D \\ \sin\theta_D & \cos\theta_D \end{bmatrix} \quad (1\text{-}10)$$

Figure 16:
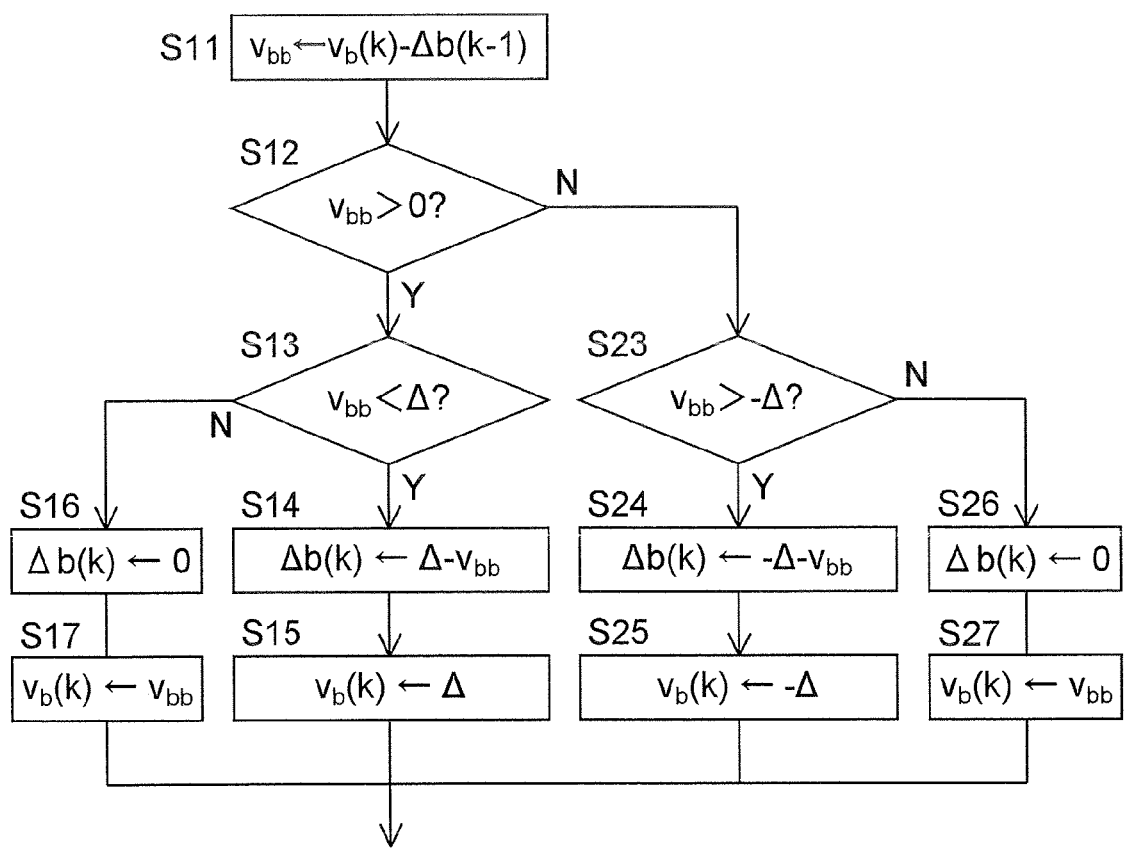
FIG. 16 is a flowchart showing a procedure of a process in a variation of the step S2 shown in FIG. 11.

In addition, it is possible to perform the correction considering the past correction in the correction process with respect to the b-axis voltage $v_b$ in the step S2. This correction process with respect to $v_b$ considering the past correction will be described with reference to FIG. 16. FIG. 16 is a flowchart showing a procedure of this correction process.

In the motor driving system, a value of $v_b$ is updated one after another at a predetermined sampling period $T_s$. Considering $v_b$ as a value digitized at the sampling period $T_s$, $v_b$ at each sampling period $T_s$ is denoted by $v_b(k)$, $v_b(k-1)$, $v_b(k-2)$, or the like. In addition, a variable $\Delta b$ is defines so that the variable $\Delta b$ at each sampling period $T_s$ is denoted by $\Delta b(k)$, $\Delta b(k-1)$, $\Delta b(k-2)$, or the like.

Sign in the parentheses "( )" (k, (k−1) and the like) denote sampling timings when the digitizing is performed at the sampling period $T_s$. The sign k is a natural number, and (k) denotes the sampling timing after (k−1). Signs $v_b(k)$ and $\Delta b(k)$ denote $v_b$ and $\Delta b$ at the (k−1)th sampling timing, and signs $v_b(k-1)$ and $\Delta b(k-1)$ denote $v_b$ and $\Delta b$ at the (k−1)th sampling timing. Note that the sampling period $T_S$ is integer times the carrier period of the carrier signal (see FIG. 4). If the carrier period is $1/(10\times10^3)$ seconds, $T_S$ is set to a value of $1/(10\times10^3)$, $1/(5\times10^3)$ or $1/(2.5\times10^3)$ seconds, for example.

FIG. 16 is a flowchart when the k-th sampling timing is noted. First in the step S11, a value obtained by subtracting the variable $\Delta b(k-1)$ considering the previous correction from $v_b(k)$ before the correction this time is substituted into the variable $V_{bb}$. Then, it is decided in the step S12 whether or not the variable $v_{bb}$ is positive. If the variable $v_{bb}$ is positive, the process goes to the step S13. If the variable $v_{bb}$ is negative (or zero), the process goes to the step S23.

In the step S13, the variable $v_{bb}$ is compared with the above-mentioned threshold value $\Delta$ (see equation (1-5) or the like). If the inequality "$v_{bb}<\Delta$" holds, the process goes to the step S14. If the inequality does not hold, the process goes to the step S16. In the step S14, a value obtained by subtracting the variable $v_{bb}$ calculated in the step S11 from the threshold value $\Delta$ is substituted into the variable $\Delta b(k)$, and in the succeeding step S15 the threshold value $\Delta$ is substituted into $v_b(k)$. On the other hand, in the step S16, zero is substituted into the variable $\Delta b(k)$, and in the succeeding step S17 the variable $v_{bb}$ is substituted into $v_b(k)$. When the process of the step S15 or S17 is finished, the process of FIG. 16 is finished.

In the step S23, the variable $v_{bb}$ is compared with $(-\Delta)$. If the inequality "$v_{bb}>-\Delta$" holds, the process goes to the step S24. If the inequality does not hold, the process goes to the step S26. In the step S24, a value obtained by subtracting the variable $v_{bb}$ calculated in the step S11 from $(-\Delta)$ is substituted into the variable $\Delta b(k)$, and in the succeeding step S25 $(-\Delta)$ is substituted into $v_b(k)$. On the other hand, in the step S26, zero is substituted into the variable $\Delta b(k)$, and the variable $v_{bb}$ is substituted into $v_b(k)$ in the succeeding step S27. When the process of the step S25 or S27 is finished, the process of FIG. 16 is finished.

The value of $v_b(k)$ obtained through the process of the step S15, S17, S25 or S27 shown in FIG. 16 is handled as the b-axis voltage $V_b$ after the correction this time (however, there is a case where actual correction is not performed). The variable $\Delta b(k)$ obtained through the process of the step S14, S16, S24 or S26 is used for the correction process of $v_b$ at the (k+1)th sampling timing.

Figure 17:
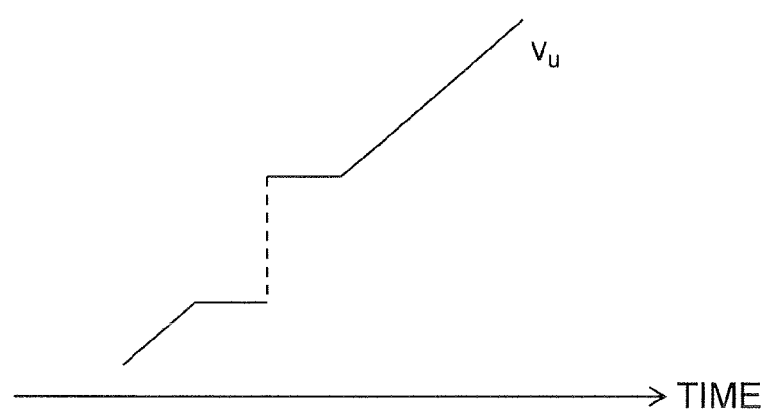
FIG. 17 is a diagram for explaining meaning of the process shown in FIG. 16.

Since the correction is performed with respect to $V_b$ so that the voltage vector 110 shown in FIG. 8 or the like is located outside the region 111, the phase voltages become discontinuous as shown in FIG. 15B. FIG. 17 shows the state of the voltage (e.g., $v_u$) at this discontinuous portion. This discontinuity is not desirable for smooth driving of the motor 1.

Figure 18:
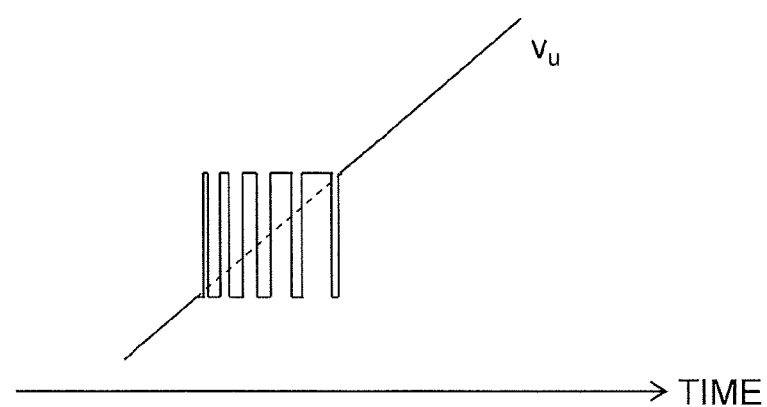
FIG. 18 is a diagram for explaining meaning of the process shown in FIG. 16.

In the period while the correction is necessary (i.e., the period while the equation (1-5) is satisfied), if the simple method is adopted in which $\Delta$ is substituted into $v_b$ if $v_b$ is positive while $(-\Delta)$ is substituted into $v_b$ if $v_b$ is negative like the above-mentioned step S2 (see FIG. 11), the discontinuity becomes relatively large, but if the correction process as shown in FIG. 16 is performed considering the past correction, $v_b$ goes back and forth between $\Delta$ and $(-\Delta)$. As a result, as shown in FIG. 18 for example, the discontinuity of the voltage is relieved because the voltage (e.g., $v_u$) varies as if it is PWM-modulated at the discontinuous part of the voltage.

Hereinafter, first to fifth examples will be described as examples of application of the correction process (correction method) described above. Note that described matters in a certain example (e.g., a first example) can also be applied to other examples as long as there is no contradiction.

First Example

Figure 19:
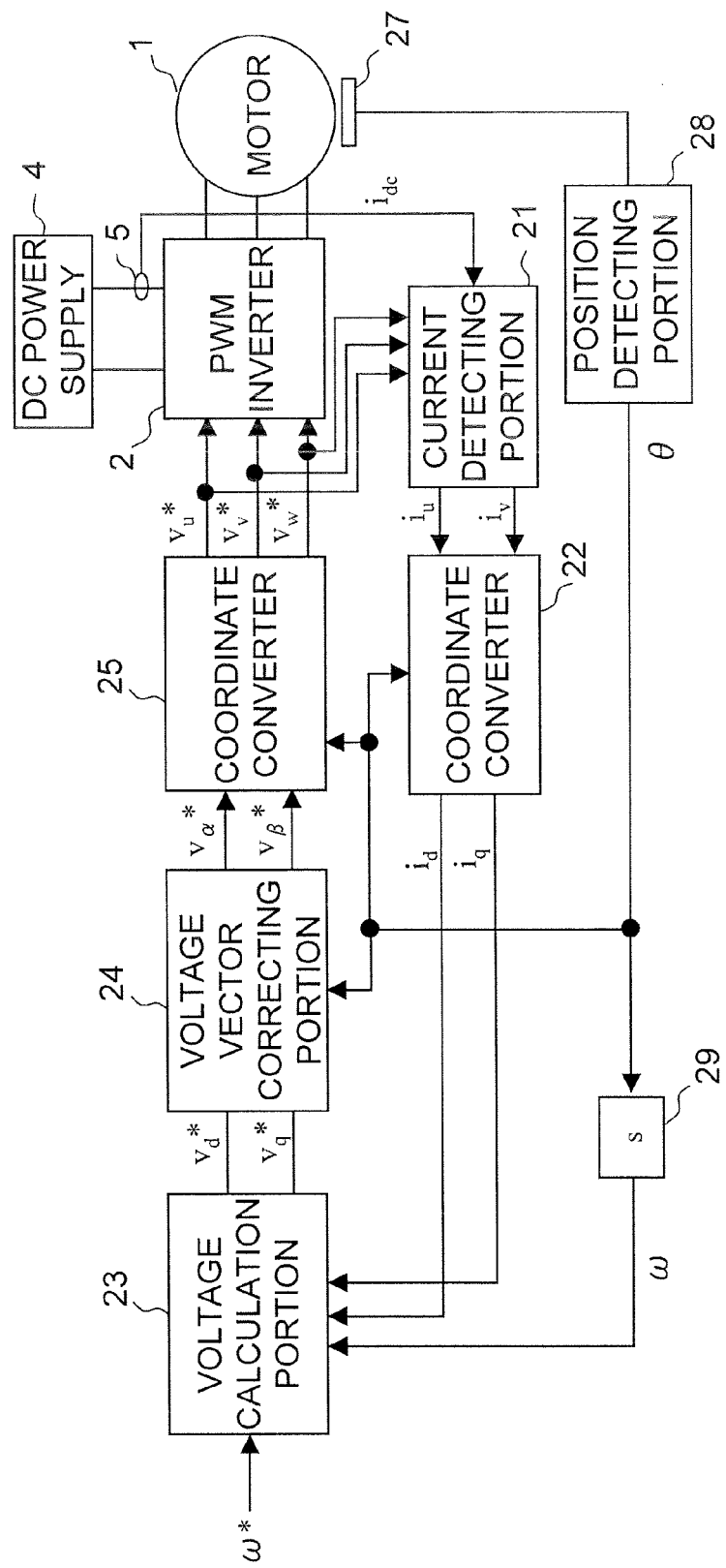
FIG. 19 is a block diagram of a general structure of a motor driving system according to a first example of the present invention.

In the first place, a first example will be described. FIG. 19 is a block diagram of a general structure of a motor driving system according to the first example. In FIG. 19, the same parts as those shown in FIG. 1 are denoted by the same references.

The motor driving system shown in FIG. 19 includes a motor 1, an inverter 2, a DC power supply 4 and a current sensor 5. It also includes "a current detecting portion 21, a coordinate converter 22, a voltage calculating portion 23, a voltage vector correcting portion 24, a coordinate converter 25, a position sensor 27, a position detecting portion 28 and a differentiator 29" that constitute the controller 3 shown in FIG. 1.

The position sensor 27 is a rotary encoder or the like, which provides the position detecting portion 28 with a signal corresponding to an actual rotor position θ (phase) of the rotor 6 of the motor 1. The position detecting portion 28 detects the actual rotor position θ based on the output signal of the position sensor 27. The differentiator 29 differentiates the actual rotor position θ so as to calculate the actual motor speed ω that is delivered.

As described above, the current sensor 5 senses the bus current and delivers the signal that indicates a current value of the bus current. The bus current is denoted by $i_{dc}$. The current detecting portion 21 refers to the specified three-phase voltage values $v_u^*$, $v_v^*$ and $v_w^*$ delivered from the coordinate converter 25 so as to specify which phases are the maximum phase, the intermediate phase and the minimum phase, respectively. Based on the specified three-phase voltage values $v_u^*$, $v_v^*$ and $v_w^*$, it also decides the timings ST1 and ST2 (see FIG. 6) for sampling the output signal of the current sensor 5, so as to calculate and deliver the U-phase current $i_u$ and the V-phase current $i_v$ from current values of the bus current obtained at the timings. On this occasion, a relational expression "$i_u+i_v+i_w=0$" is used if necessary ($i_w$ is W-phase current).

The coordinate converter 22 converts the U-phase current $i_u$ and the V-phase current $i_v$ into the d-axis current $i_d$ and the q-axis current $i_q$ based on the actual rotor position θ, and delivers them.

The voltage calculating portion 23 is supplied externally with a specified motor speed value ω* as a specified value for rotating the motor 1 (rotor 6) at a desired speed. In addition, the voltage calculating portion 23 is supplied with an actual motor speed ω from the differentiator 29 and is supplied with the d-axis current $i_d$ and the q-axis current $i_q$ from the coordinate converter 22. The voltage calculating portion 23 calculates the specified q-axis current value $i_q^*$ that the q-axis current $i_q$ should follow based on a speed error (ω*−ω). For example, $i_q^*$ is calculated so that (ω*−ω) converges to zero by the proportional-plus-integral control. In addition, the voltage calculating portion 23 refers to $i_q^*$ so as to calculate the specified d-axis current value $i_d^*$ that the d-axis current $i_d$ should follow. For example, it calculates $i_d^*$ for realizing a maximum torque control. Then, the voltage calculating portion 23 calculates and delivers the specified d-axis voltage value $v_d^*$ that the d-axis voltage $v_d$ should follow and the specified q-axis voltage value $v_q^*$ that the q-axis voltage $v_q$ should follow so that the current errors ($i_d^*−i_d$) and ($i_q^*−i_q$) converge to zero, by the proportional-plus-integral control.

The voltage vector correcting portion 24 corrects $v_d^*$ and $v_q^*$ via the coordinate conversion based on $v_d^*$ and $v_q^*$ and θ, while it calculates and delivers the specified α-axis voltage value $v_α^*$ that the α-axis voltage $v_α$ should follow and the specified β-axis voltage value $v_β^*$ that the β-axis voltage $v_β$ should follow. The coordinate converter 25 converts $v_α^*$ and $v_β^*$ into the specified three-phase voltage values ($v_u^*, v_v^*$ and $v_w^*$) based on the actual rotor position θ and delivers the specified three-phase voltage values to the inverter 2. The inverter 2 supplies the three-phase AC current to the motor 1 in accordance with the specified three-phase voltage values as described above.

Figure 20:
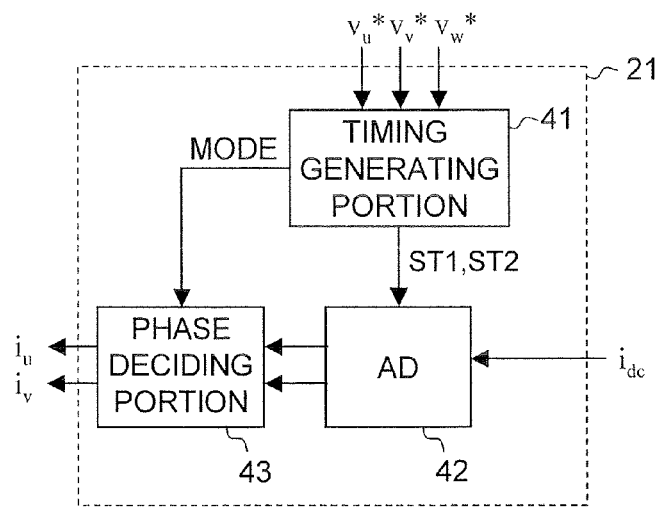
FIG. 20 is an inner block diagram of a current detecting portion shown in FIG. 19.

FIG. 20 shows an inner block diagram of the current detecting portion 21. An operation of the current detecting portion 21 will be described with reference to FIG. 6 as well. The current detecting portion 21 has a timing generating portion 41, an AD converter 42 and a phase deciding portion 43. As described above with reference to FIG. 6, $v_u^*$, $v_v^*$ and $v_w^*$ represent set values CntU, CntV and CntW of the counter, respectively. Based on $v_u^*$, $v_v^*$ and $v_w^*$, the timing generating portion 41 decides a magnitude relation among the set values CntU, CntV and CntW of the counter, and it identifies to which one of the first to the sixth modes the present time belongs. Based on $v_u^*$, $v_v^*$ and $v_w^*$, it also decides timings ST1 and ST2 when the bus current should be detected considering the identified mode. For example, if "CntU>CntV>CntW" holds, the present time is decided to belong to the first mode, and the timing corresponding to a value between the set values CntW and CntV is defined to be ST1 while the timing corresponding to a value between the set values CntV and CntU is defined to be ST2.

Hereinafter, information indicating the mode to which the present time belongs is referred to as "mode information".

The AD converter 42 samples the output signal (analog output signal) of the current sensor 5 at each of the timings ST1 and ST2, so as to detects and delivers current value of the bus current $i_{dc}$ at each of the timings ST1 and ST2 as digital values. The phase deciding portion 43 refers to the mode information identified by the timing generating portion 41 so as to calculate $i_u$ and $i_v$ from the output signal of the AD converter 42. For example, if the mode information indicates the first mode, the bus current detected at timings ST1 and ST2 are ($−i_w$) and $i_u$, respectively. Using the relational expression "$i_u+i_v+i_w=0$", $i_u$ and $i_v$ can be calculated.

Figure 21:
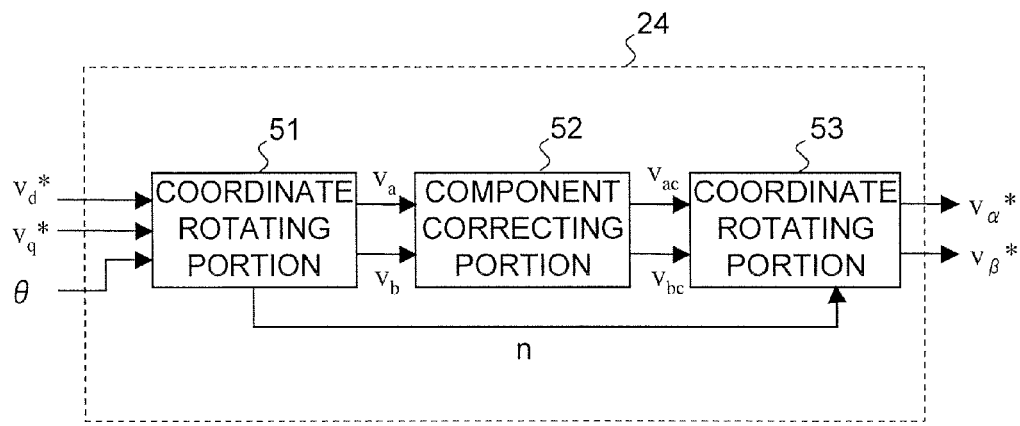
FIG. 21 is an inner block diagram of a voltage vector correcting portion shown in FIG. 19.

FIG. 21 shows an inner block diagram of the voltage vector correcting portion 24. The voltage vector correcting portion 24 includes coordinate rotating portions 51 and 53 and a component correcting portion 52. The voltage vector correcting portion 24 uses $v_d^*$ and $v_q^*$ as $v_d$ and $v_q$ in the above equations (1-3) and (1-4).

The coordinate rotating portion 51 converts $v_d^*$ and $v_q^*$ into $v_a$ and $v_b$ based on $v_d^*$ and $v_q^*$ and θ in accordance with the above equation (1-3). In other words, it converts a two-phase specified voltage vector expressed by $v_d^*$ and $v_q^*$ on the dq coordinates into a two-phase specified voltage vector expressed by $v_a$ and $v_b$ on the ab coordinates (these specified voltage vectors correspond to the voltage vector 110 shown in FIG. 8).

In order to perform the calculation based on the equation (1-3), the phase difference $θ_D$ is necessary. The phase difference $θ_D$ is calculated by the above-mentioned method referring to the equation (1-4). In addition, "n" that is determined by the coordinate rotating portion 51 when the phase difference $θ_D$ is calculated can be used for calculation in the coordinate rotating portion 53.

The component correcting portion 52 performs the correction process in the step S2 shown in FIG. 11 or the correction process shown in FIG. 16 with respect to $v_a$ and $v_b$, and it delivers $v_a$ and $v_b$ after the correction as $v_{ac}$ and $v_{bc}$, respectively. However, if the correction is not necessary, "$v_{ac}=v_a$" and "$v_{bc}=v_b$" hold.

The coordinate rotating portion 53 converts the a-axis voltage and the b-axis voltage after the correction (i.e., $v_{ac}$ and $v_{bc}$) into $v_α^*$ and $v_β^*$ in accordance with the above equation (1-7). In other words, it converts the two-phase specified voltage vector expressed by $v_{ac}$ and $v_{bc}$ on the ab coordinates into two-phase specified voltage vector expressed by $v_α^*$ and $v_β^*$ on the αβ coordinates (αβ fixed coordinates). On this occasion $v_{ac}$, $v_{bc}$, $v_α^*$ and $v_β^*$ are used as $v_a$, $v_b$, $v_α$ and $v_β$ in the equation (1-7), respectively.

In the first example, the mode to which the present time belong is identified based on a relationship among levels of $v_u^*$, $v_v^*$ and $v_w^*$, so that a phase of current flowing in the bus line 13 (see FIG. 1) as bus current at the timings ST1 and ST2 is decided. Then, the timings ST1 and ST2 are decided from $v_u^*$, $v_v^*$ and $v_w^*$ based on a result of the decision (i.e., the mode information).

Second Example

Figure 22:
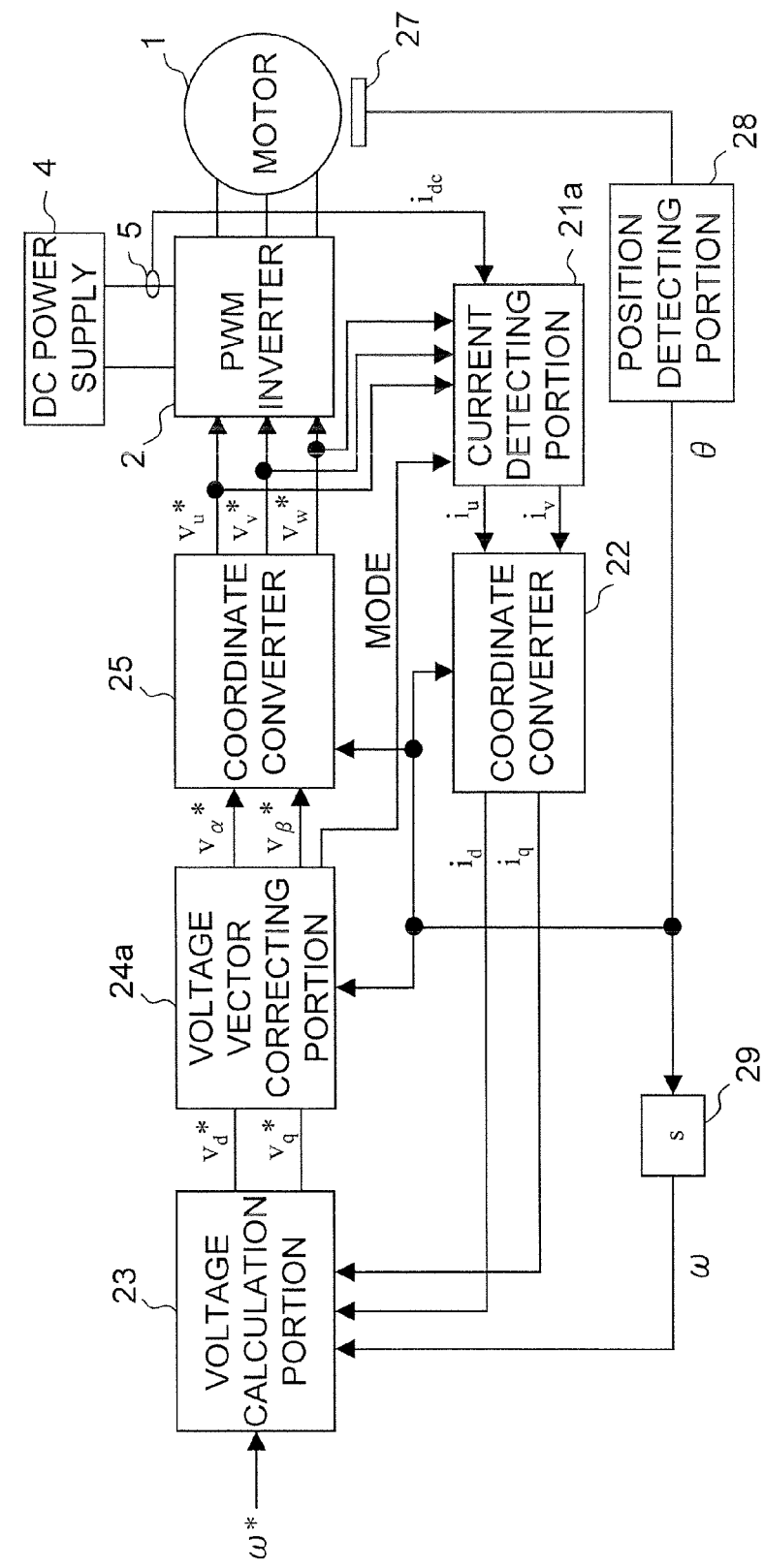
FIG. 22 is a block diagram of a general structure of a motor driving system according to a second example of the present invention.

Next, the second example will be described. FIG. 22 is a block diagram of a general structure of a motor driving system according to the second example. In FIG. 22, the same parts as those shown in FIGS. 1 and 19 are denoted by the same references.

The motor driving system shown in FIG. 22 includes a motor 1, an inverter 2, a DC power supply 4 and a current sensor 5. It also includes "a current detecting portion 21a, a coordinate converter 22, a voltage calculating portion 23, a voltage vector correcting portion 24a, a coordinate converter 25, a position sensor 27, a position detecting portion 28 and a differentiator 29" that constitute the controller 3 shown in FIG. 1.

The motor driving system shown in FIG. 22 is different from the motor driving system shown in FIG. 19 in that the current detecting portion 21 and the voltage vector correcting portion 24 in the motor driving system shown in FIG. 19 are replaced with the current detecting portion 21a and the voltage vector correcting portion 24a, and both the motor driving systems are similar to each other in other structure. The difference between them will be described in detail. Note that when the items described in the first example are applied to the second example, a difference between references 21 and 21a as well as a difference between references 24 and 24a will be ignored if necessary.

Figure 23:
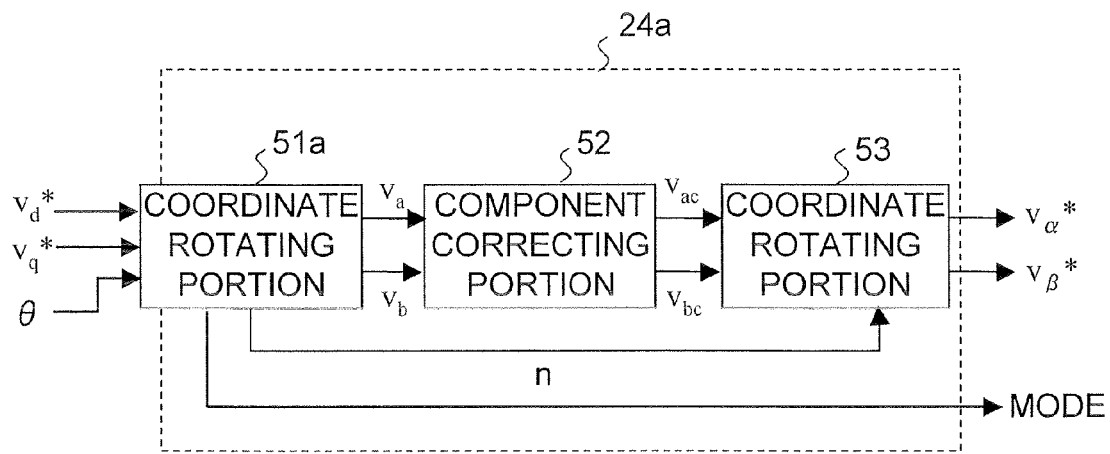
FIG. 23 is an inner block diagram of the voltage vector correcting portion shown in FIG. 22.

FIG. 23 shows an inner block diagram of the voltage vector correcting portion 24a. The voltage vector correcting portion 24a has coordinate rotating portions 51a and 53, and a component correcting portion 52. The voltage vector correcting portion 24a uses $V_d^*$ and $v_q^*$ as $v_d$ and $v_q$ in the above equation (1-3) and (1-4).

The coordinate rotating portion 51a converts $V_d^*$ and $V_q^*$ into $v_a$ and $V_b$ based on $V_d^*$ and $v_q^*$ and $\theta$ in accordance with the above equation (1-3). When the calculation based on the equation (1-3) is performed, the phase difference $\theta_D$ becomes necessary. The phase difference $\theta_D$ is calculated by using the above-mentioned method referring to the equation (1-4). In addition, "n" that is determined by the coordinate rotating portion 51a when the phase difference $\theta_D$ is calculated can be used for calculation in the coordinate rotating portion 53.

Figure 24:
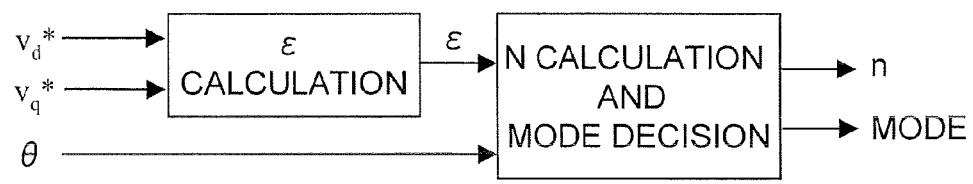
FIG. 24 is a block diagram showing process contents of a coordinate rotating portion shown in FIG. 23.

In addition, the coordinate rotating portion 51a identifies the mode to which the present time belongs referring to $\epsilon$ determined based on $V_d^*$ and $v_q^*$, and it generates the mode information. FIG. 24 shows process contents of the coordinate rotating portion 51a as a block diagram. FIG. 25 shows a table for explaining the method of identifying a mode performed by the coordinate rotating portion 51a. As described above with reference to FIG. 6, "$v_u > v_v > v_w$" holds in the first mode, for example. On the other hand, as described above with reference to FIG. 8, a phase of the voltage vector (specified voltage vector) with reference to the U-phase axis is expressed by $(\theta + \epsilon + \pi/2)$. If "$0 < (\theta + \epsilon + \pi/2) < \pi/3$" holds, "$v_u > v_v > v_w$" holds.

Considering this point, the coordinate rotating portion 51a refers to $\theta$ and $\epsilon$ so as to decide that the present time belongs to the first mode if "$0 < (\theta + \epsilon + \pi/2) < \pi/3$" holds. Considering in the same manner, the present time is decided to belong to the second mode if "$\pi/3 < (\theta + \epsilon + \pi/2) < 2\pi/3$" holds, or the third mode if "$2\pi/3 < (\theta + \epsilon + \pi/2) < \pi$" holds, or the fourth mode if "$\pi < (\theta + \epsilon + \pi/2) < 4\pi/3$" holds, or the fifth mode if "$4\pi/3 < (\theta + \epsilon + \pi/2) < 5\pi/3$" holds, or the sixth mode if "$5\pi/3 < (\theta + \epsilon + \pi/2) < 2\pi$" holds.

The component correcting portion 52 and the coordinate rotating portion 53 shown in FIG. 23 are the same as those shown in FIG. 21.

Figure 26:
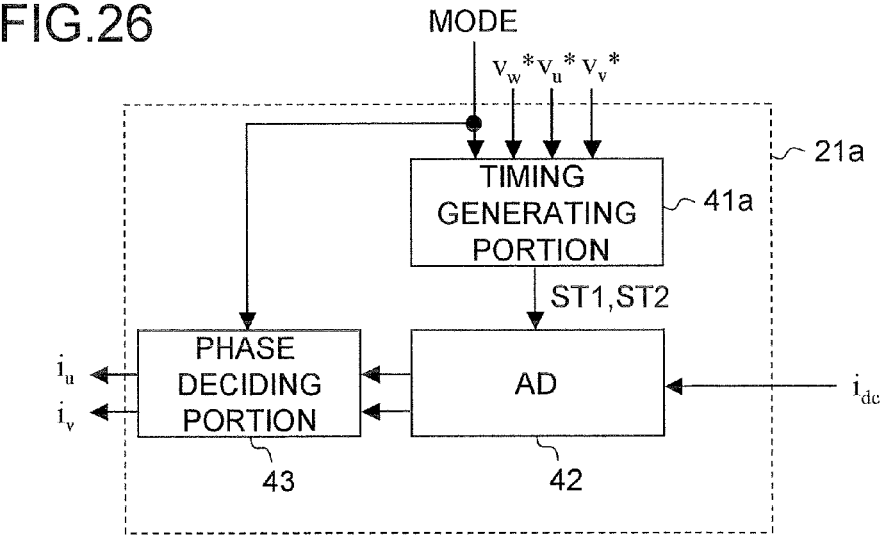
FIG. 26 is an inner block diagram of the current detecting portion shown in FIG. 22.

FIG. 26 shows an inner block diagram of the current detecting portion 21a. The current detecting portion 21a includes a timing generating portion 41a, an AD converter 42, and a phase deciding portion 43. The timing generating portion 41a decides the timings ST1 and ST2 when the bus current should be detected based on the $v_u^*$, $v_v^*$ and $v_w^*$, considering the mode information generated by the voltage vector correcting portion 24a. Since the voltage vector correcting portion 24a gives the mode information, it is not necessary to perform the decision for identifying a mode by the timing generating portion 41a unlike the timing generating portion 41 in the first example (FIG. 20).

The AD converter 42 and the phase deciding portion 43 shown in FIG. 26 are the same as those shown in FIG. 20. However, the mode information is given from the voltage vector correcting portion 24a to the phase deciding portion 43 shown in FIG. 26.

In the second example, the mode to which the present time belongs is identified based on the phase $(\theta + \epsilon + \pi/2)$ of the specified voltage vector with reference to the U-phase axis, so that a phase of current flowing in the bus line 13 (see FIG. 1) as the bus current at the timings ST1 and ST2 is decided. Then, the timings ST1 and ST2 are decided from $v_u^*$, $v_v^*$ and $v_w^*$ in accordance with a result of the decision (i.e., the mode information).

Third Example

Figure 27:
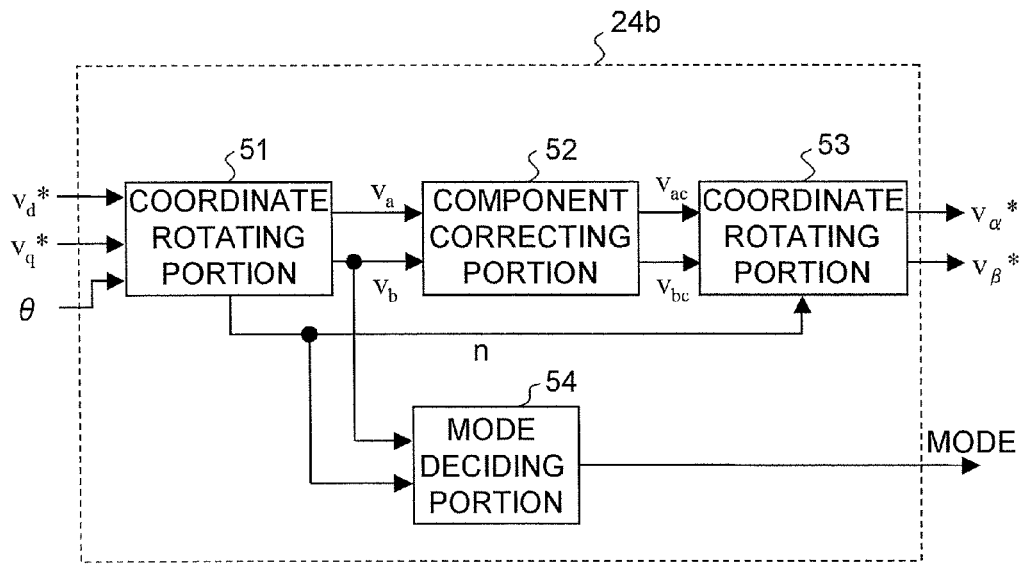
FIG. 27 is an inner block diagram of a voltage vector correcting portion that can be used as the voltage vector correcting portion shown in FIG. 22 according to a third example of the present invention.

Next, the third example will be described. A general structural block diagram of a motor driving system according to the third example is the same as that according to the second example (FIG. 22). However, the voltage vector correcting portion in the third example is different from that in the second example. An inner block diagram of the voltage vector correcting portion 24b in the third example is shown in FIG. 27. In the third example, the voltage vector correcting portion 24a shown in FIG. 22 is replaced with the voltage vector correcting portion 24b. The voltage vector correcting portion 24b is used in a combination with the current detecting portion 21a shown in FIG. 26.

The voltage vector correcting portion 24b includes the coordinate rotating portions 51 and 53, the component correcting portion 52, and the mode deciding portion 54. The voltage vector correcting portion 24b uses $v_d^*$ and $v_q^*$ as $v_d$ and $v_q$ in the above equations (1-3) and (1-4).

The coordinate rotating portions 51 and 53 and the component correcting portion 52 are the same as those shown in FIG. 21. "n and $v_b$" calculated by the coordinate rotating portion 51 are sent to the mode deciding portion 54.

The mode deciding portion 54 identifies a mode to which the present time belongs based on $v_b$ and n so as to generate the mode information, which is sent to the current detecting portion 21a (FIG. 22). FIG. 28 shows a table for explaining a method of identifying a mode performed by the mode deciding portion 54.

As described above with reference to FIG. 6, "$v_u>v_v>v_w$" holds in the first mode, for example. On the other hand, if "$3\pi/2<(\theta+\epsilon)<11\pi/6$" holds, "$v_u>v_v>v_w$" holds. In addition, if "$3\pi/2<(\theta+\epsilon)<5\pi/3$" holds, "n=4" and "$v_b>0$" hold. If "$5\pi/3<(\theta+\epsilon)<11\pi/6$" holds, "n=5" and "$v_b<0$" hold.

Considering these relationships, mode deciding portion 54 identifies a mode to which the present time belongs based on a polarity of $v_b$ and a value of n. More specifically, the present time is decided to belong to the first mode if "n=4 and $v_b>0$" holds or "n=5 and $v_b<0$" holds, or the second mode if "n=5 and $v_b>0$" holds or "n=0 and $v_b<0$" holds, or the third mode if "n=0 and $v_b>0$" holds or "n=1 and $v_b<0$" holds, or the fourth mode if "n=1 and $v_b>0$" holds or "n=2 and $v_b<0$" holds, or the fifth mode if "n=2 and $v_b>0$" holds or "n=3 and $v_b<0$" holds, or the sixth mode if "n=3 and $v_b>0$" holds or "n=4 and $v_b<0$" holds.

In the third example, a mode to which the present time belongs is identified based on $v_b$ that is a coordinate axis component of the two-phase specified voltage vector on the ab coordinates and a variable n that indicates a phase difference between the coordinate axis of the ab coordinates (a-axis) and the U-phase axis by 60 degrees of electrical angle as a unit, and a phase of the current flowing in the bus line 13 (see FIG. 1) as bus current at the timings ST1 and ST2 is decided. Then, the timings ST1 and ST2 are decided from $v_u^*$, $v_v^*$ and $v_w^*$ in accordance with a result of the decision (i.e., the mode information).

Fourth Example

Next, the fourth example will be described. The fourth example utilizes two-phase modulation. For this reason, contents described above on the precondition of the three-phase modulation (such as the PWM signal shown in FIG. 4 and the like) are modified partially as necessity of interpretation in the fourth example. It is supposed that a magnitude of the voltage vector (specified voltage vector) on the dq coordinates, the ab coordinates or the αβ coordinates is $V_{a2}$ and that the amplitude of voltage of one phase when the voltage vector is converted into the three phase voltages is $V_{a3}$. Then, the equation (2-1) as below holds.

$$V_{a3} = \sqrt{2/3} \cdot V_{a2} \tag{2-1}$$

In addition, if the voltages of two phases among the voltages of three phases cross each other, the crossing voltages of two phases are "$+(1/2)\cdot V_{a3}$" while the voltage of the remaining non-crossing phase is "$-V_{a3}$", or the crossing voltages of two phases are "$-(1/2)\cdot V_{a3}$" while the voltage of the remaining non-crossing phase is "$+V_{a3}$". For this reason, if voltages of two phases cross each other, an absolute value of a voltage difference between the crossing two phase voltages and the remaining phase voltage is $(3/2)\cdot V_{a3}$.

The two-phase modulation is a modulation method in which voltage (specified voltage) of each phase is shifted by the minimum phase voltage among three phase voltages. When the two-phase modulation is performed, a pulse width of the PWM signal with respect to the minimum phase is always zero (i.e., the lower arm with respect to the minimum phase is always turned on). The U-phase voltage, the V-phase voltage and the W-phase voltage when the two-phase modulation is performed are denoted by $v_u'$, $v_v'$ and $v_w'$, respectively. Then, a relationship between them and $v_u^*$, $v_v^*$ and $v_w^*$ when the three-phase modulation is performed is expressed by the equation (2-2), (2-3) and (2-4) as below. Here, "$\min(v_u^*, v_v^*, v_w^*)$" represents a voltage value of the minimum phase, i.e., a minimum value among $v_u^*$, $v_v^*$ and $v_w^*$ when the three-phase modulation is performed.

$$v_u' = v_u^* - \min(v_u^*, v_v^*, v_w^*) \tag{2-2}$$

$$v_v' = v_v^* - \min(v_u^*, v_v^*, v_w^*) \tag{2-3}$$

$$v_w' = v_w^* - \min(v_u^*, v_v^*, v_w^*) \tag{2-4}$$

Figure 29:
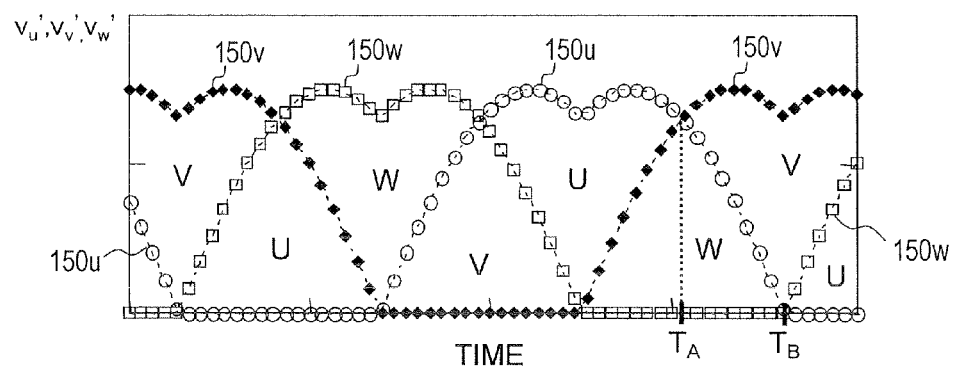
FIG. 29 shows voltage waveforms of the phase voltages in the case where it is applied to two-phase modulation, and is a diagram for explaining a principle of a fourth example of the present invention.

FIG. 29 shows voltage waveforms of $v_u'$, $v_v'$ and $v_w'$ with setting time on the horizontal axis. In FIG. 29, a curve 150u formed with circular plotted dots, a curve 150v formed with rhombic plotted dots and a curve 150w formed with square plotted dots show voltage waveforms of $v_u'$, $v_v'$ and $v_w'$, respectively. However, the curves 150u, 150v and 150w show voltage waveforms in the case where the correction process shown in the step S2 and the like in FIG. 11 is not performed. Note that a length of the vertical axis in FIG. 29 as well as FIGS. 30 and 31 that will be referred to later corresponds to the amplitude of the carrier signal (see FIG. 4).

Similarly to the case where the three-phase modulation is performed, current values of two phases cannot be detected from the bus current at the timing when two voltages among $v_u'$, $v_v'$ and $v_w'$ cross each other. For example, in the case where the W-phase is the minimum phase, current values of two phases cannot be detected from the bus current at the timing $T_A$ when the U-phase voltage cross the V-phase voltage or the timing $T_B$ when the minimum phase switches from the W-phase to the U-phase.

Viewing from the minimum phase, a voltage at which other two phases cross each other is denoted by $V_X$. Then, as understood obviously from the above description, $V_X$ is expressed by using $V_{a2}$ or $V_{a3}$ as shown in the equation (2-5) as below.

$$V_X = 3/2 \cdot V_{a3} = \frac{3}{2}\sqrt{\frac{2}{3}} \cdot V_{a2} = \sqrt{3/2} \cdot V_{a2} \tag{2-5}$$

Here, since the equation (2-6) is satisfied, the equations (2-7), (2-8) and (2-9) are derived from the equation (2-5).

$$V_{a2} = \sqrt{v_d^2 + v_q^2} = \sqrt{v_a^2 + v_b^2} = \sqrt{v_\alpha^2 + v_\beta^2} \tag{2-6}$$

$$V_X = \sqrt{3/2} \cdot \sqrt{v_a^2 + v_b^2} \tag{2-7}$$

$$V_X = \sqrt{3/2} \cdot \sqrt{v_d^2 + v_q^2} \tag{2-8}$$

$$V_X = \sqrt{3/2} \cdot \sqrt{v_\alpha^2 + v_\beta^2} \tag{2-9}$$

Figure 30:
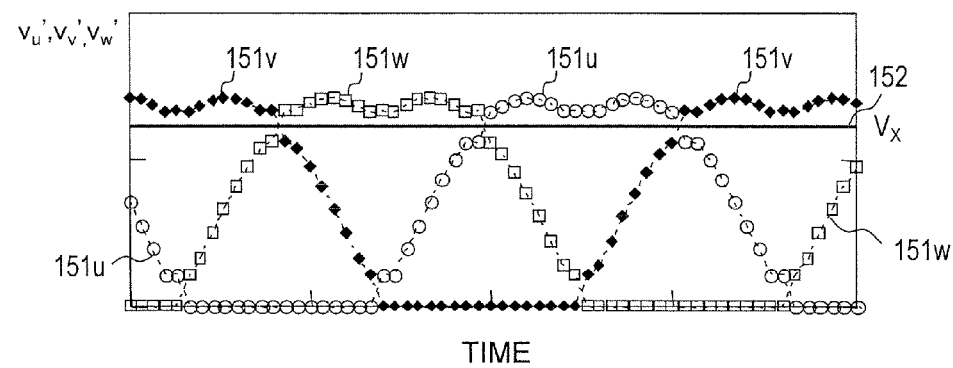
FIG. 30 shows voltage waveforms of the phase voltages in the case where it is applied to two-phase modulation, and is a diagram for explaining a principle of the fourth example of the present invention.

FIG. 30 shows voltage waveforms of $v_u'$, $v_v'$ and $v_w'$ in the case where the correction process as shown in the step S2 and the like in FIG. 11 is performed, with setting time on the horizontal axis. In FIG. 30, a curve 151u formed with circular plotted dots, a curve 151v formed with rhombic plotted dots and a curve 151w formed with square plotted dots show voltage waveforms of $v_u'$, $v_v'$ and $v_w'$, respectively after the correction process described above. In FIG. 30, the broken line 152 shows a voltage level (voltage value) of the voltage $V_X$.

As shown in FIG. 30 too, the voltage $V_X$ is always located between the voltage of the maximum phase and the voltage of the intermediate phase. Therefore, it is possible to decide timing when the bus current is detected by using the voltage $V_X$. In other words, a set value $\mathrm{CntV}_X$ of the counter corresponding to the voltage $V_X$ calculated from the equation (2-7), (2-8) or (2-9) is generated, and the set value $CntV_X$ of the counter should be handled as the timing when current of one phase is detected from the bus current.

As described above with reference to FIGS. 4, 5A-5D and 6 and the like, the counter that is provided to the controller 3 increments its counter value from 0 every carrier period with reference to the timing when the carrier signal is in the lowest level. For this reason, in each carrier period, the output signal of the current sensor 5 is sampled at the timing when its count value reaches $CntV_X$, so that the phase current of the maximum phase can be detected from the output signal indicating the bus current. Since the voltage $V_X$ exists between the voltage of the maximum phase and the voltage of the intermediate phase, the timing when the count value reaches $CntV_X$ corresponds to the timing between the timings T2 and T3 (see FIG. 4) in the case where the three-phase modulation is performed. In the fourth example, the timing when the count value reaches $CntV_X$ is handled as the timing ST2.

Since the lower arm of the minimum phase is always turned on (i.e., a set value of the counter of the minimum phase is zero) if the two-phase modulation is performed, the timing when the carrier signal is in the lowest level corresponds to the timing T1 or T6 shown in FIG. 4. Therefore, if the output signal of the current sensor 5 is sampled at the timing when the carrier signal is in the lowest level, for example, the phase current of the minimum phase can be detected from the output signal indicating the bus current. In the fourth example, the timing when the carrier signal is in the lowest level, i.e., the timing when a count value of the counter is zero is handled as the timing ST1.

Figure 31:
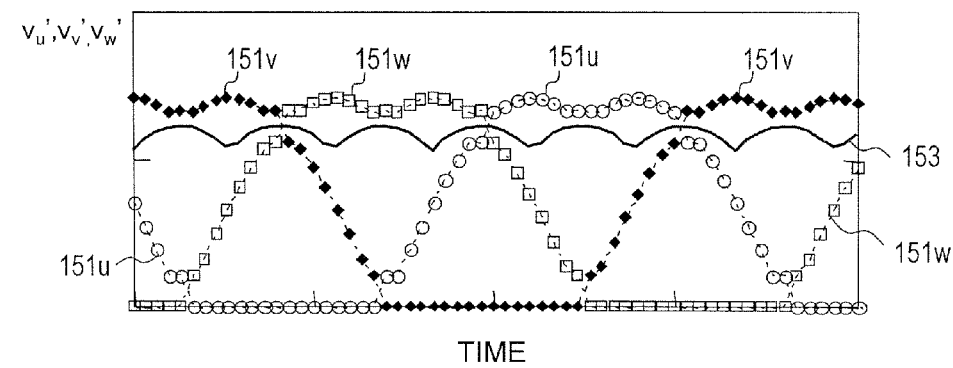
FIG. 31 shows voltage waveforms of the phase voltages in the case where it is applied to two-phase modulation, and is a diagram for explaining a principle of the fourth example of the present invention.

In addition, in order to simplifying the calculation of the voltage $V_X$, $V_X$ can be calculated by an approximate expression like the equation (2-10) as below. A curve 153 shown in FIG. 31 shows a voltage level (voltage value) of the voltage $V_X$ calculated in accordance with the equation (2-10). The curves 151$u$, 151$v$ and 151$w$ shown in FIG. 31 are the same as those shown in FIG. 30. As shown in FIG. 31, even if the voltage $V_X$ is calculated in accordance with the equation (2-10), the voltage $V_X$ always exists between the voltage of the maximum phase and the voltage of the intermediate phase. Therefore, it is possible to set the set value of the counter corresponding to the voltage $V_X$ calculated from the equation (2-10) as $CntV_X$.

$$V_X \approx \sqrt{3/2} \cdot v_a \quad (2\text{-}10)$$

In addition, considering presence of ringing (current ripple caused by switching) or the like, it is preferable that the timing of sampling the output signal of the current sensor 5 be far from the switching timing of the switching element in the inverter 2 as much as possible. For this reason, considering $\Delta$ corresponding to the correction width (see the above equation (1-5) and the like), it is possible to add correction to $CntV_X$ that is decided based on the equation (2-7), (2-8), (2-9) or (2-10).

Figure 32:
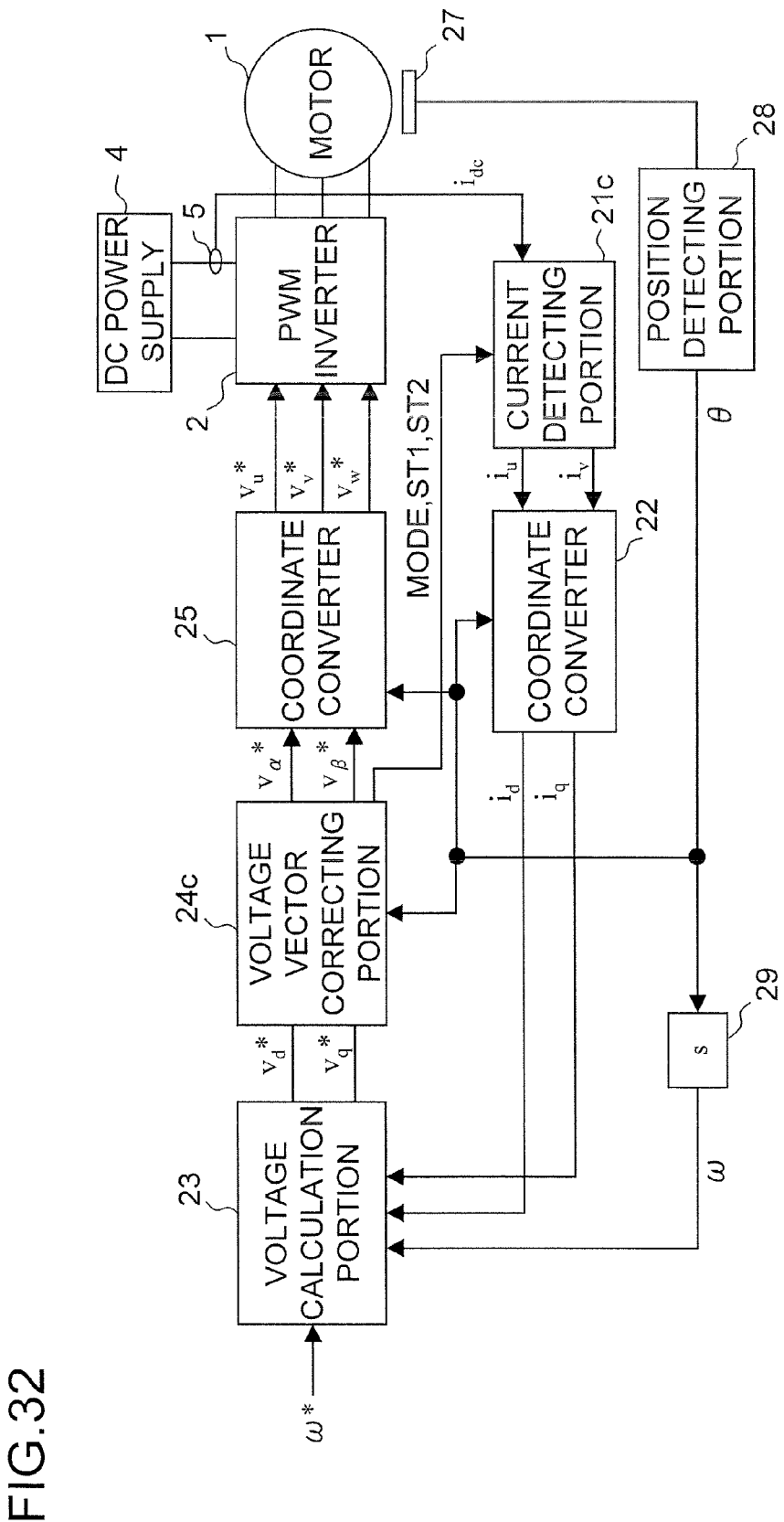
FIG. 32 is a block diagram of a general structure of a motor driving system according to the fourth example of the present invention.

A general structural block diagram of the motor driving system that utilizes the above-mentioned calculation of the voltage $V_X$ is shown in FIG. 32. In FIG. 32, the same parts as those shown in FIGS. 1 and 19 are denoted by the same references.

The motor driving system shown in FIG. 32 includes a motor 1, an inverter 2, a DC power supply 4 and a current sensor 5. It also includes "a current detecting portion 21$c$, a coordinate converter 22, a voltage calculating portion 23, a voltage vector correcting portion 24$c$, a coordinate converter 25, a position sensor 27, a position detecting portion 28 and a differentiator 29" that constitute the controller 3 shown in FIG. 1.

The motor driving system shown in FIG. 32 is different from the motor driving system shown in FIG. 19 in that the current detecting portion 21 and the voltage vector correcting portion 24 in the motor driving system shown in FIG. 19 are replaced with the current detecting portion 21$c$ and the voltage vector correcting portion 24$c$, and both the motor driving systems are similar to each other in other structure. The difference between them will be described in detail. Note that when the items described in the first example are applied to the fourth example, a difference between references 21 and 21$c$ as well as a difference between references 24 and 24$c$ will be ignored if necessary.

The motor driving system shown in FIG. 32 performs the two-phase modulation. The voltage values $v_u^*$, $v_v^*$ and $v_w^*$ for performing the three-phase modulation are converted into $v_u'$, $v_v'$ and $v_w'$ in accordance with the equations (2-2) to (2-4), and these $v_u'$, $v_v'$ and $v_w'$ are regarded as $v_u^*$, $v_v^*$ and $v_w^*$ in the two-phase modulation. The coordinate converter 25 shown in FIG. 32 supplies $v_u^*$, $v_v^*$ and $v_w^*$ in the two-phase modulation to the inverter 2.

Figure 33:
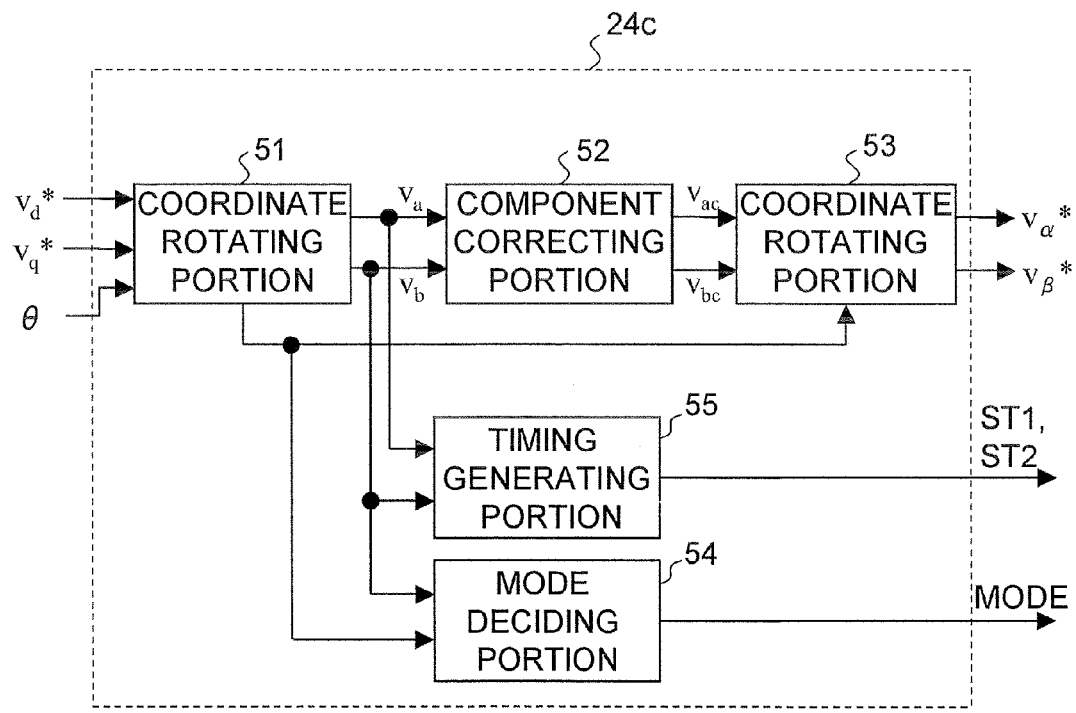
FIG. 33 is an inner block diagram of the voltage vector correcting portion shown in FIG. 32.

FIG. 33 shows an inner block diagram of the voltage vector correcting portion 24$c$. The voltage vector correcting portion 24$c$ includes the coordinate rotating portions 51 and 53, the component correcting portion 52, the mode deciding portion 54 and a timing generating portion 55. In other words, the voltage vector correcting portion 24$c$ is obtained by adding the timing generating portion 55 to the voltage vector correcting portion 24$b$ shown in FIG. 27, and both the voltage vector correcting portions are the same except for the addition.

Although the mode deciding portion 54 is provided for generating the mode information in this example similarly to the third example, it is possible to use the method described in the first or the second example as a method for identifying a mode to which the present time belongs.

The timing generating portion 55 calculates the voltage $V_X$ in accordance with the above equation (2-7) or (2-10) by using $v_a$ and $V_b$ or using only $v_a$ from the coordinate rotating portion 51. Then, it sets a set value $CntV_X$ of the counter corresponding to the calculated voltage $V_X$. This setting makes the timing ST2 fixed, and the timing when the count value is zero is regarded as the timing ST1 as described above.

In addition, it is possible to calculate the voltage $V_X$ in accordance with the equation (2-8) by using $v_d^*$ and $v_q^*$ as $v_d$ and $v_q$ in the equation (2-8). In addition, it is possible to converts the $v_d^*$ and $v_q^*$ into those on the $\alpha\beta$ coordinates (i.e., to perform coordinate rotation for them by $\theta$) so as to calculate the $\alpha$-axis component and the $\beta$-axis component of the voltage vector. Then, these $\alpha$-axis component and $\beta$-axis component are used as $v_\alpha$ and $v_\beta$ in the equation (2-9), while the voltage $V_X$ is calculated in accordance with the equation (2-9).

Figure 34:
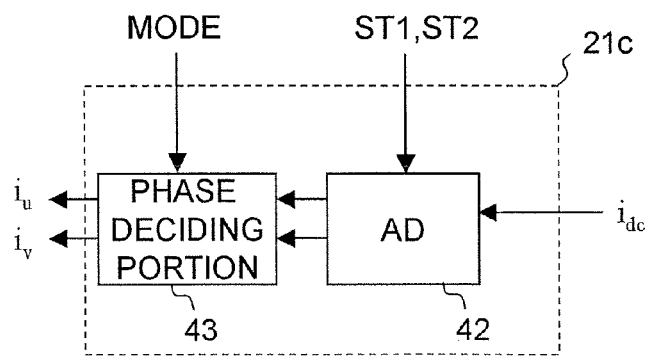
FIG. 34 is an inner block diagram of the current detecting portion shown in FIG. 32.

FIG. 34 shows an inner block diagram of the current detecting portion 21$c$. The current detecting portion 21$c$ includes an AD converter 42 and a phase deciding portion 43, and it is not equipped with a portion for deciding the timings ST1 and ST2 like the timing generating portion 41 shown in FIG. 20. The AD converter 42 of the current detecting portion 21$c$ samples the output signal (analog output signal) of the current sensor 5 at the timings ST2 and ST1 decided by the timing generating portion 55 shown in FIG. 33, i.e., the timing when the count value becomes the set value $CntV_X$ and the timing when the count value becomes zero. Thus, it detects and delivers current values of bus current as digital values at the timings ST1 and ST2. The phase deciding portion 43 refers to the mode information identified by the timing generating portion 55 so as to calculate $i_u$ and $i_v$ from the output signal of the AD converter 42.

In the fourth example, the timing when the output signal of the current sensor 5 is sampled is decided based on a magnitude of the voltage vector (specified voltage vector). In addition, it is also possible to decide the timing from the a-axis component of the voltage vector on the ab coordinates.

Fifth Example

Although the motor driving system is equipped with the position sensor 27 for detecting rotor position in the first to the fourth example, all the above description can also be applied to a case where the position sensor 27 is not provided, i.e., a case where so-called sensorless control is performed. An example in which the sensorless control is applied to the motor driving system shown in FIGS. 22 and 32 will be described as a fifth example. General block diagrams of the motor driving systems according to the fifth example are shown in FIGS. 35 and 36, which corresponds to FIGS. 22 and 32, respectively.

Figure 35:
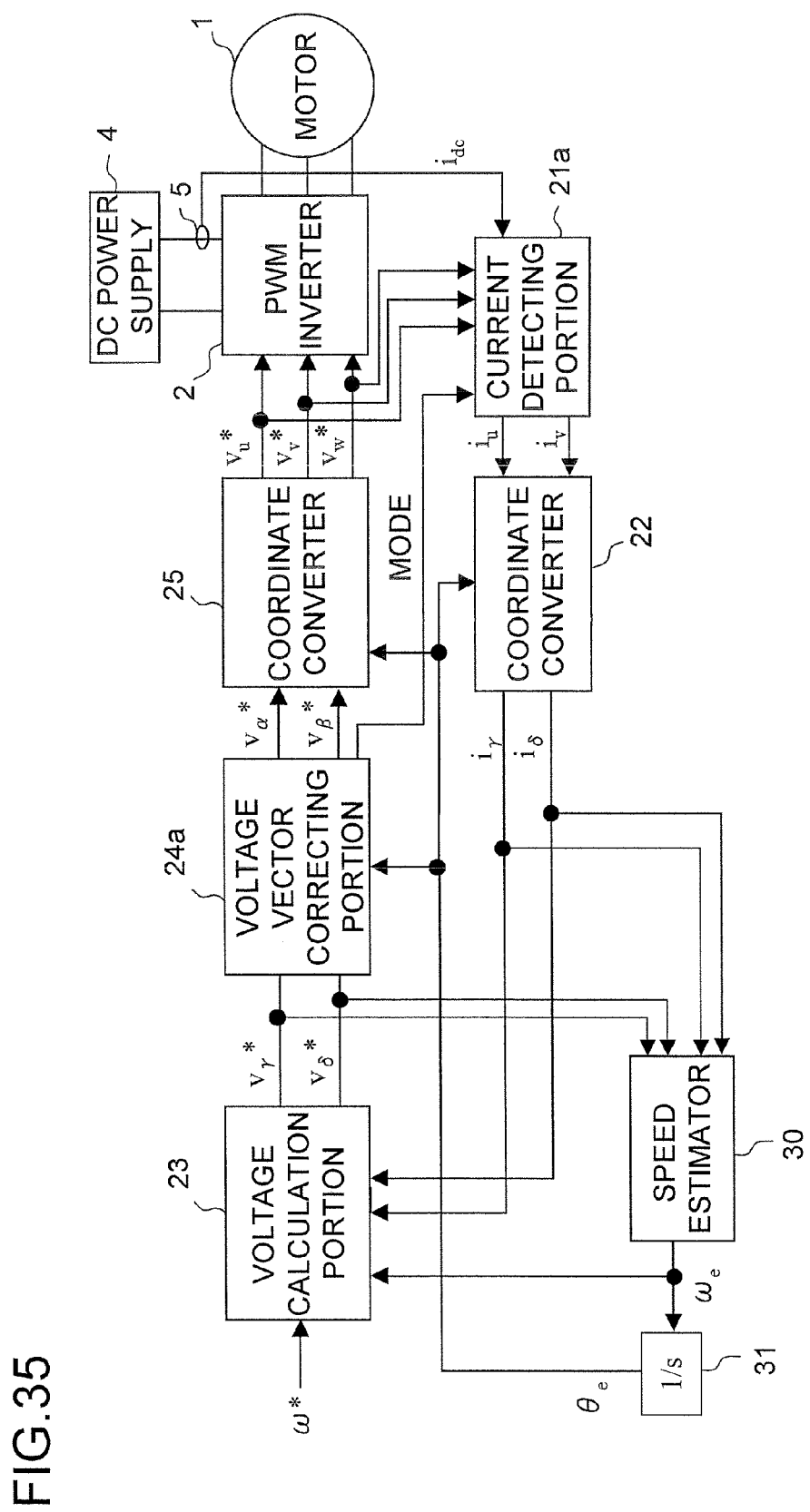
FIG. 35 is a block diagram of a general structure of a motor driving system according to a fifth example of the present invention.

The motor driving system shown in FIG. 35 is different from the motor driving system shown in FIG. 22 in that "the position sensor 27, the position detecting portion 28 and the differentiator 29 in the motor driving system shown in FIG. 22" are replaced with "the speed estimator 30 and the integrator 31", and both the motor driving systems are similar to each other in other structure. The motor driving system shown in FIG. 36 is different from the motor driving system shown in FIG. 32 in that "the position sensor 27, the position detecting portion 28 and the differentiator 29 in the motor driving system shown in FIG. 32" are replaced with "the speed estimator 30 and the integrator 31", and both the motor driving systems are similar to each other in other structure.

Figure 36:
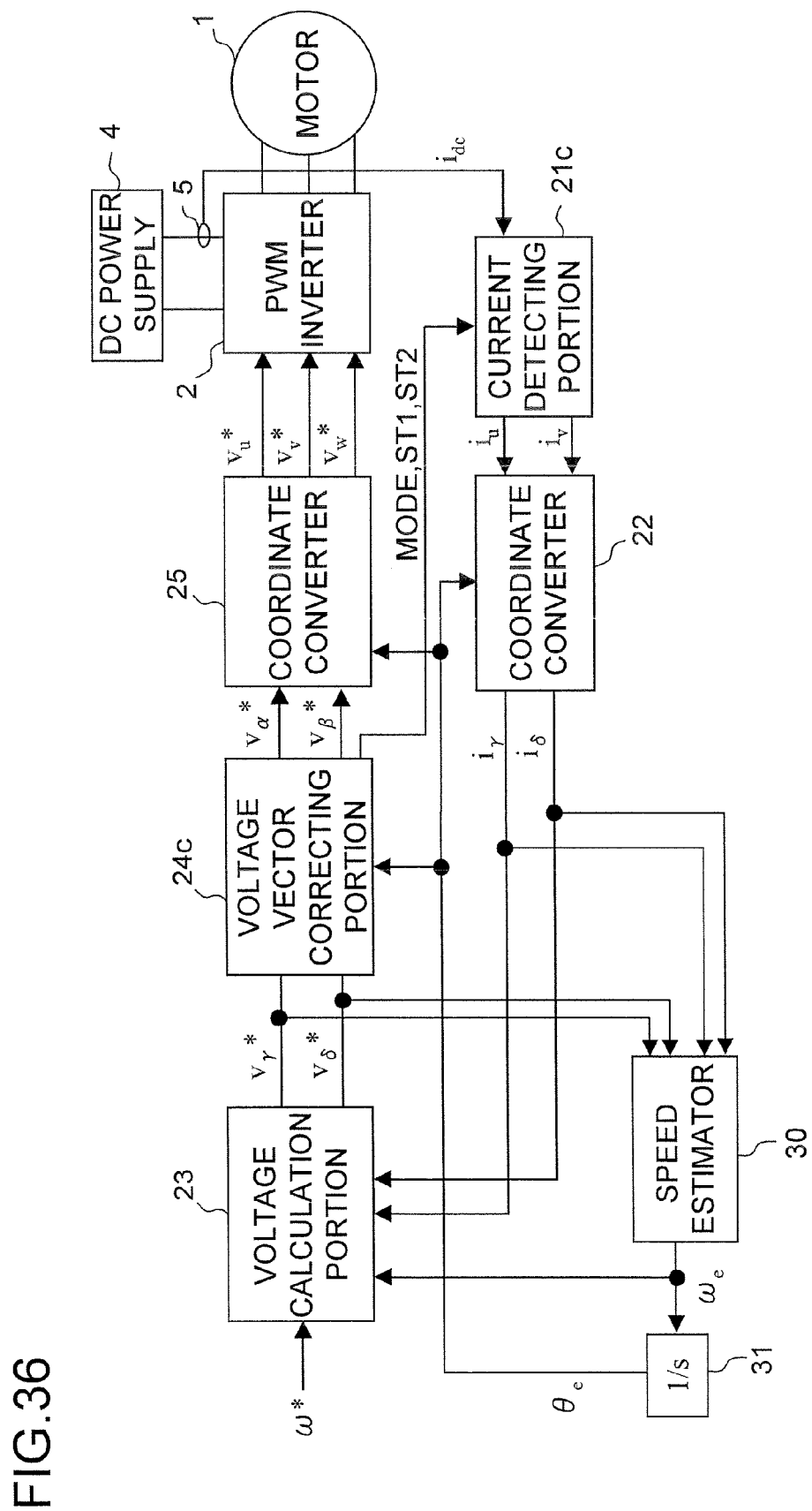
FIG. 36 is a block diagram of a general structure of a motor driving system according to the fifth example of the present invention.
Figure 37:
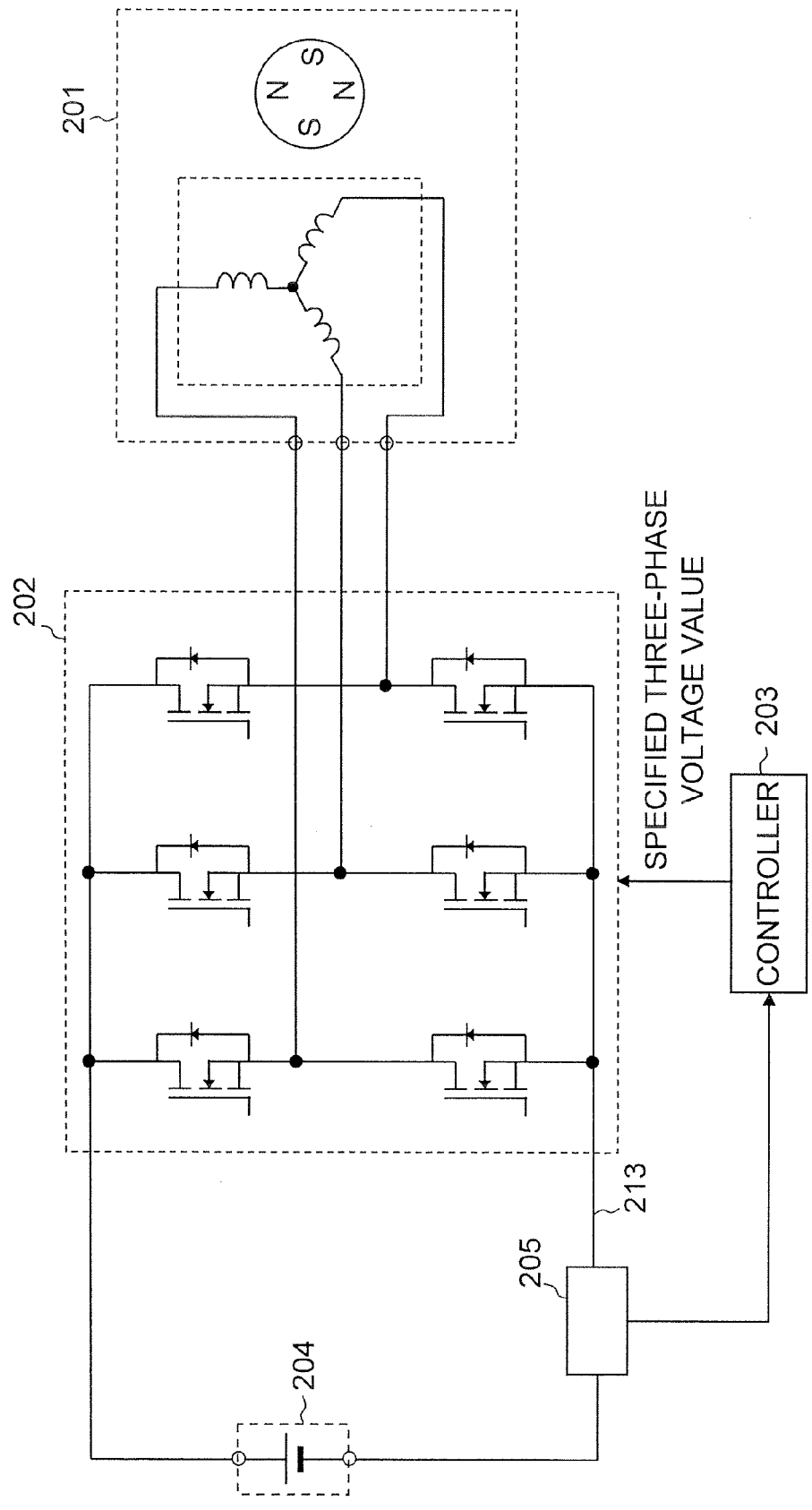
FIG. 37 is a block diagram of a general structure of a conventional motor driving system in which a single shunt current detecting method is adopted.
Figure 38:
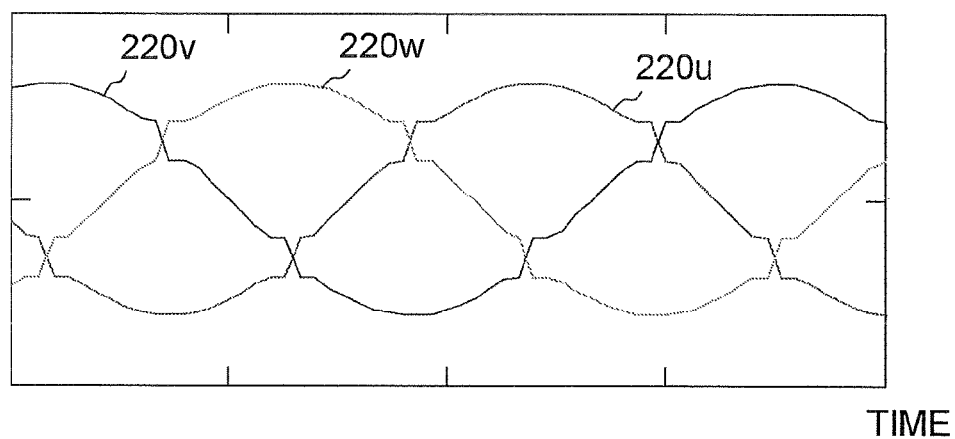
FIG. 38 is a diagram showing an example of correction of a specified voltage value (pulse width) in a case where the single shunt current detecting method is adopted in the conventional technique.

However, since the position sensor is not provided to the motor driving system shown in FIGS. 35 and 36, "d", "q", "θ" and "ω" in the above description and equations are replaced with "γ", "δ", "$\theta_e$" and "$\omega_e$", respectively, as necessity.

Therefore, in FIG. 35 or 36, the coordinate converter 22 converts $i_u$ and $i_v$ into $i_\gamma$ and $i_\delta$ based on the estimated rotor position $\theta_e$, the coordinate converter 25 converts $v_\alpha^*$ and $v_\beta^*$ into the specified three-phase voltage values ($v_u^*$, $v_v^*$ and $v_w^*$) based on the estimated rotor position $\theta_e$, the voltage calculating portion 23 calculates the specified γ-axis current value $i_\gamma^*$ and the specified δ-axis current value $i_\delta^*$ that the $i_\gamma$ and $i_\delta$ should follow based on the $i_\gamma$, $i_\delta$, $\omega^*$ and the estimated motor speed $\omega_e$, and further calculates the specified γ-axis voltage value $v_\gamma^*$ and specified δ-axis voltage value $v_\delta^*$ that the $v_\gamma$ and $v_\delta$ should follow. Of course, in FIG. 35 or 36, the voltage vector correcting portion 24a or 24c performs the correction process in the same manner as described above by using $v_\gamma^*$, $v_\delta^*$ and $\theta_e$ instead of $V_d^*$, $v_q^*$ and θ.

The speed estimator 30 calculates the estimated motor speed $\omega_e$ by using a whole or a part of $i_\gamma$, $i_\delta$, $v_\gamma^*$ and $v_\delta^*$. There are known various methods for calculating $\omega_e$, and any one of the methods can be used. For example, induction voltage (in other words, electromotive force) generated in the motor 1 is estimated by using $i_\gamma$, $i_\delta$, $v_\gamma^*$ and $v_\delta^*$ so that the axial error Δθ is calculated. Then; the proportional-plus-integral control is performed so that the axial error Δθ converges to zero for calculating $\omega_e$. The integrator 31 integrates $\omega_e$ so as to calculate $\theta_e$.

In each example, if the voltage vector (specified voltage vector) is located in the area where current values of two phases cannot be detected, the voltage vector is corrected so that the voltage vector is located outside the area in the process of coordinate conversion from the rotating coordinates to the three-phase fixed coordinates. In this way, motor current (each phase current) can be detected securely. Since motor current can be detected securely even in a standstill state or a slow rotation state of the motor 1, motor drive from the standstill state can be performed securely. In particular, a smooth start can be realized in an electric vehicle or the like including an electric bike driven by a motor. Note that if the method of estimating current as described in JP-A-2004-64903 is adopted, an error may be contained to a certain degree in the current value that is used for the vector control, because estimation is performed instead of detection. This error is not desirable for smooth start.

In addition, since it is sufficient to correct the coordinate axis components $v_a$ and $v_b$ of the voltage vector (specified voltage vector) independently, the correction contents are simple. In particular, the correction is necessary for all the three phases if the applied voltage is low. In this case too, the correction quantity can be decided easily.

Although the example of the motor driving system to which the present invention is applied is described above, the present invention includes various variations (or other examples). Hereinafter, Notes 1 to 5 will be written as variations (or other examples) or annotations with respect to the first embodiment. Contents of each Note can be combined with others freely as long as there is no contradiction.

[Note 1]

Although the inverter 2 utilizes the three-phase modulation in the above description except for the fourth example, the present invention does not depend on a modulation type. For example, if the inverter 2 performs a two-phase modulation, the energizing pattern thereof is different from that of the three-phase modulation shown in FIG. 3. Since the lower arm of the minimum phase is always turned on in the two-phase modulation, the energizing patterns corresponding to the period T0-T1 and the period T6-T7 shown in FIG. 4 do not exist. However, if a structure is adopted in which bus current is detected by the energizing patterns corresponding to the period T1-T2 and the period T2-T3 in the end, current of the maximum phase and the minimum phase can be detected without an exception.

Note that when the two-phase modulation is performed, amplitude of a fundamental component of the phase voltage can be made larger than that in the three-phase modulation (sine wave modulation). Thus, limitation with respect to a pulse width of the maximum phase is relieved so that a pulse width of the maximum phase can be utilized fully (i.e., a duty factor of the pulse can be increased up to 100%). In addition, since a pulse width of the PWM signal with respect to the minimum phase is always zero, a switching loss of one phase can be reduced.

[Note 2]

In the motor driving system described above in the first to the fifth examples, the a-axis voltage and the b-axis voltage after the correction are temporarily converted into the α-axis voltage and the β-axis voltage, and then they are converted into the three-phase voltages. However, it is possible to omit the conversion into the α-axis voltage and the β-axis voltage.

In other words, $v_{ac}$ and $v_{bc}$ calculated by the component correcting portion 52 shown in FIG. 21 or the like may be converted into $v_u^*$, $v_v^*$ and $v_w^*$ directly without going through αβ coordinates in accordance with the above equations (1-8) and (1-9). In this case, $v_{ac}$ and $v_{bc}$ as well as $v_u^*$, $v_v^*$ and $v_w^*$ are used as $v_a$ and $v_b$ as well as $v_u$, $v_v$ and $v_w$ in the equations (1-8) and (1-9). Note that the coordinate rotating portion 53 shown in FIG. 21 or the like is not necessary in this case.

[Note 3]

In addition, the individual portions constituting the motor driving system described above can freely use all the values generated in the motor driving system as necessity.

[Note 4]

In addition, a part or a whole of the functions of the controller 3 (see FIG. 1) can be realized by using software (a program) embedded in a general-purpose microcomputer, for example. If the controller 3 is realized by using software, the block diagram showing the structure of the individual portions of the controller 3 is regarded as a functional block diagram. Of course, the controller 3 may be constituted only by hardware without using software (a program).

[Note 5]

In addition, the controller 3 has a function as a motor control device, for example. It may also be considered that the motor control device includes the current sensor 5 shown in FIG. 1 or the like. In addition, the voltage calculating portion 23 shown in FIG. 19 or the like and the coordinate rotating portion 51 (or 51a) shown in FIG. 21 or the like have a function as a specified voltage vector generating portion, for example. In addition, the component correcting portion 52 shown in FIG. 21 or the like has a function as a specified voltage vector correcting portion, for example. In addition, the coordinate converter 25 shown in FIG. 19 or the like has a function as the specified three-phase voltage value generating portion, for example.

Second Embodiment

Next, a second embodiment of the present invention will be described. In the second embodiment, the technique described above in the first embodiment is utilized for system interconnection. The contents described above in the first embodiment are applied to the second embodiment or a third embodiment that will be described later, and different points from the first embodiment will be described in the second embodiment or the third embodiment that will be described later.

Figure 39:
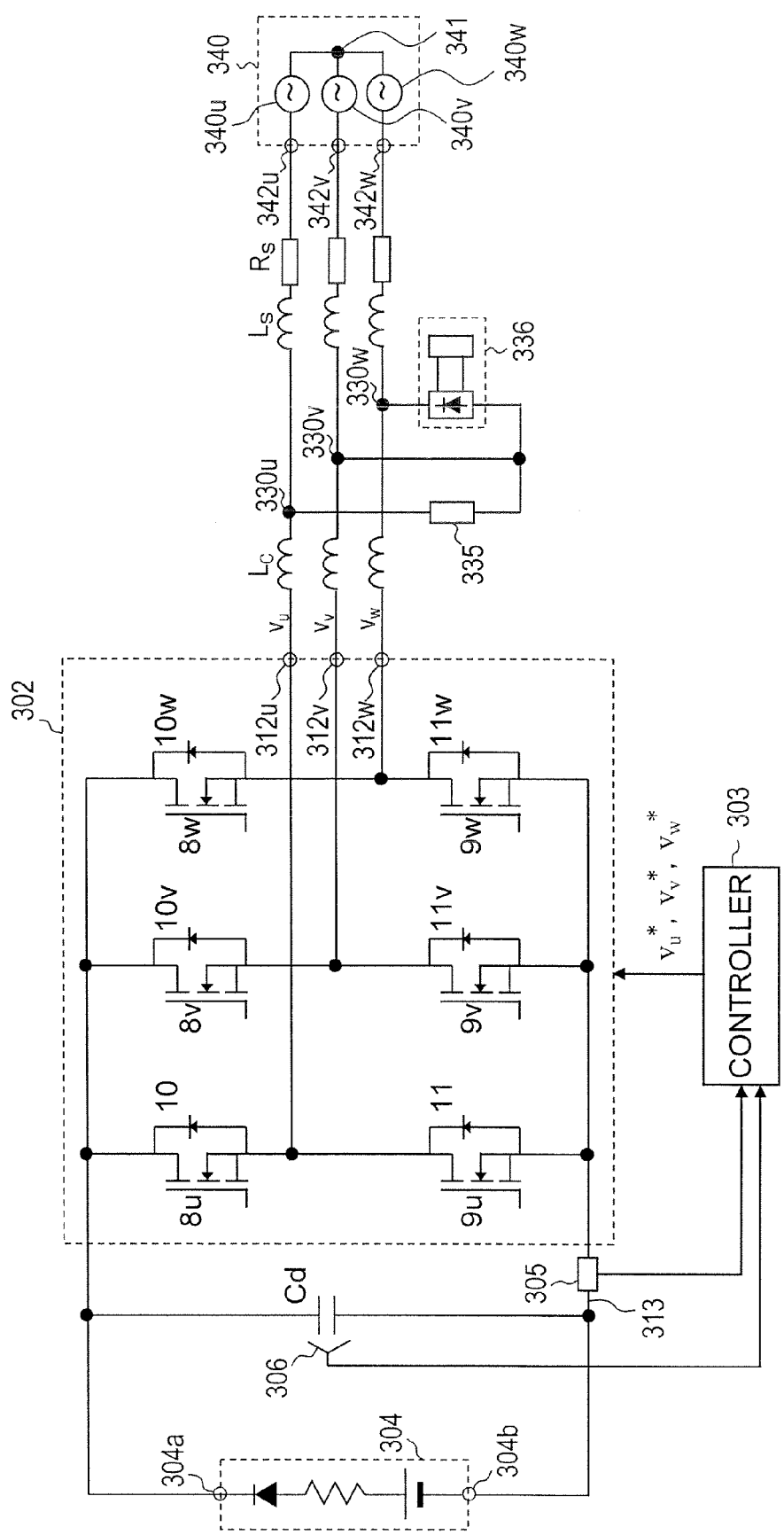
FIG. 39 is a general structural diagram of a system interconnecting system according to a second embodiment of the present invention.

FIG. 39 is a general structural diagram of a system interconnecting system according to the second embodiment. The system interconnecting system shown in FIG. 39 links electric power generated by a solar battery to the three-phase system by using the three-phase inverter. The present embodiment exemplifies a system interconnecting system that incorporate a current control system voltage interconnecting three-phase inverter. This type of system interconnecting inverter makes an interconnection with the system by applying voltage to an interconnection point so as to follow the specified current value. The control technique with respect to the three-phase inverter for system interconnection is disclosed, for example, in the document "Current Controlled Type Sinusoidal Voltage Interconnecting Three-Phase Inverter" by Yamada and two others, Institute of Electrical Engineers, National Conference Lecture Papers, March 2007, fourth volume 4-076, page 115.

A connection relationship of individual portions or the like shown in FIG. 39 will be described while pointing out common items between the second embodiment and the third embodiment that will be described below. In FIG. 39, numeral 304 denotes a solar battery as a DC power supply. An equivalent circuit of the solar battery 304 is shown in FIG. 39. The solar battery 304 performs generation of electric power based on solar energy and generates DC voltage. The DC voltage is generated between a positive output terminal 304a and a negative output terminal 304b so that the negative output terminal 304b becomes the low voltage side. The DC voltage between the positive output terminal 304a and the negative output terminal 304b is applied between both terminals of a smoothing capacitor Cd so that the smoothing capacitor Cd stores charge corresponding to the DC voltage. A voltage detector 306 detects a voltage value of voltage between both terminals of the smoothing capacitor Cd and sends the detected value to a controller 303.

A PWM inverter 302 shown in FIG. 39 (hereinafter referred to simply as an "inverter 302") is a three-phase inverter that is the same as the inverter 2 shown in FIG. 1, and its inner structure is the same as the inverter 2.

The inverter 302 is equipped with a half bridge circuit for the U-phase, a half bridge circuit for the V-phase and a half bridge circuit for the W-phase. Each half bridge circuit has a pair of switching elements. In each half bridge circuit, a pair of switching elements are connected between the positive output terminal 304a and the negative output terminal 304b in series, and the voltage between both terminals of the smoothing capacitor Cd is applied to each half bridge circuit. Note that u, v and w are generally used as signs that denote the phases of a three-phase motor, and in the system of the second embodiment and the third embodiment described later, other signs except u, v and w (e.g., a, b and c) are used in many cases. However, in the second embodiment and the third embodiment described later, u, v and w are used as signs that denote the phases of the inverter 302 for convenience of description.

In the system interconnecting system, a connection node of the upper arm 8u and the lower arm 9u that are connected in series, a connection node of the upper arm 8v and the lower arm 9v that are connected in series, and a connection node of the upper arm 8w and the lower arm 9w that are connected in series are connected to a terminal 312u that is an output terminal of the U-phase of the inverter 302, a terminal 312v that is an output terminal of the V-phase of the inverter 302, and a terminal 312w that is an output terminal of the W-phase of the inverter 302, respectively. Note that field-effect transistors are shown as the switching elements in FIG. 39, they can be replaced with IGBTs (Insulated Gate Bipolar Transistors) or the like.

The terminals 312u, 312v and 312w are connected to interconnection points 330u, 330v and 330w, respectively, via an interconnection reactor (inductor) and interior wiring. A reactance component of the interconnection reactor and interior wiring between the terminal 312u and the interconnection point 330u is denoted by $L_C$. In the same manner, a reactance component of the interconnection reactor and interior wiring between the terminal 312v and the interconnection point 330v as well as a reactance component of the interconnection reactor and interior wiring between the terminal 312w and the interconnection point 330w is also denoted by $L_C$. Note that it is possible to perform the system interconnection by using a three-phase transformer (not shown) disposed among the terminals 312u, 312v and 312w and the interconnection points 330u, 330v and 330w. This three-phase transformer is provided for a purpose of isolation between the inverter 302 and a system (an electric power system 340 that will be described later) and transformation.

Numeral 340 denotes an electric power system (system side power supply) that supplies three-phase AC power. The electric power system 340 can be divided into three AC voltage sources 340u, 340v and 340w for consideration, and each of the AC voltage sources 340u, 340v and 340w delivers an AC voltage having an angular frequency (angular speed) $\omega_S$ with reference to a reference point 341. However, phases of the AC voltages delivered from the AC voltage sources 340u, 340v and 340w are different from each other by 120 degrees of electrical angle.

The electric power system 340 delivers the output voltages of the AC voltage sources 340u, 340v and 340w with reference to the reference point 341 from the terminals 342u, 342v and 342w, respectively. The terminals 342u, 342v and 342w are connected to the interconnection points 330u, 330v and 330w, respectively, via outdoor wiring. Here, a reactance component and a resistance component of line impedance in each of the outdoor wiring are denoted by $L_S$ and $R_S$, respectively.

A load such as a household electrical appliance is connected between different interconnection points. In the example shown in FIG. 39, a load 335 that is a linear load is connected between the interconnection points 330u and 330v, and a load 336 that is a nonlinear load is connected between the interconnection points 330v and 330w. Therefore, the load 335 is driven by the voltage between the interconnection points 330u and 330v as a drive voltage, and the load 336 is driven by the voltage between the interconnection points 330v and 330w as the drive voltage. The linear load means a load that complies with the Ohm's law, while the nonlinear load means a load that does not comply with the Ohm's law. For example, a load including a rectifying circuit such as an AC/DC converter is considered as the load 336.

The inverter 302 generates a PWM signal (pulse width modulation signal) for each phase based on the specified three-phase voltage values given by the controller 303, and it makes the switching elements of the inverter 302 to switch by giving the PWM signal to the control terminal (base or gate) of the switching elements. The specified three-phase voltage values supplied from the controller 303 to the inverter 302 consist of the specified U-phase voltage value $v_u^*$, the specified V-phase voltage value $v_v^*$ and the specified W-phase voltage value $v_w^*$. Voltage levels (voltage values) of the U-phase voltage $v_u$, the V-phase voltage $v_v$ and the W-phase voltage $v_w$ are denoted by $v_u^*$, $v_v^*$ and $v_w^*$, respectively. Then, the inverter 302 controls on (conducting state) and off (non-conducting state) of each switching element based on $v_u^*$, $v_v^*$ and $v_w^*$. Note that presence of the dead time is ignored in the second embodiment and the third embodiment described later in the same manner as the first embodiment.

The DC voltage from the solar battery 304 is converted into the three-phase AC voltage after the PWM modulation (pulse width modulation) by the switching actions of the switching elements of the inverter 302. The system interconnecting system shown in FIG. 39 performs system interconnection between the solar battery 304 as the DC power supply and the electric power system 340, so that AC power corresponding to the three-phase AC voltage from the inverter 302 is supplied to the loads 335 and 336 by the interconnection with the electric power system 340.

The current sensor 305 senses current that flows in the bus line 313 of the inverter 302. This current is referred to as bus current in the second embodiment and the third embodiment described later in the same manner as the first embodiment. Since the bus current includes a DC component, it can be regarded as a DC current. In the inverter 302, the low voltage sides of the lower arms 9u, 9v and 9w are commonly connected to the negative output terminal 304b of the solar battery 304. The wiring to which the low voltage sides of the lower arms 9u, 9v and 9w are connected commonly is the bus line 313, and the current sensor 305 is inserted in the bus line 313 in series. The current sensor 305 transmits a signal indicating a current value of the sensed bus current (detection current) to the controller 303. The controller 303 refers to the output signal or the like of the current sensor 305 while it generates and delivers the specified three-phase voltage values described above. Note that the current sensor 305 can be a shunt resistor, a current transformer or the like, for example. In addition, it is possible to provide the current sensor 305 not to the wire (bus line 313) connecting the low voltage sides of the lower arms 9u, 9v and 9w with the negative output terminal 304b but to the wire connecting the high voltage sides of the upper arms 8u, 8v and 8w with the positive output terminal 304a.

Although the U-phase voltage $v_u$, the V-phase voltage $v_v$ and the W-phase voltage $v_w$ in the first embodiment mean the voltages of the terminals 12u, 12v and 12w viewed from the neutral point 14 shown in FIG. 1, the U-phase voltage $v_u$, the V-phase voltage $v_v$ and the W-phase voltage $v_w$ in the second embodiment and the third embodiment described later indicate voltages of the terminals 312u, 312v and 312w, respectively, viewed from a reference potential point having a certain fixed potential. For example, in the second embodiment the reference point 341 can be regarded as the above-mentioned reference potential point. Each of the U-phase voltage, the V-phase voltage and the W-phase voltage (or a generic name of them) is referred to as phase voltage. Furthermore, in the second embodiment and the third embodiment described later, currents that flow through the terminals 312u, 312v and 312w are called the U-phase current $i_u$, the V-phase current $i_v$ and the W-phase current $i_w$, respectively, and each of them (or a generic name of them) is referred to as phase current. Furthermore, as to the phase current, a polarity of the current in the direction of flowing out from the terminal 312u, 312v or 312w is defined to be positive.

Each phase voltage in the second embodiment and the third embodiment described later is like a sine wave similarly to each phase voltage in the first embodiment (see FIG. 2), and a relationship among voltage levels of the phase voltages is changing along with time. This relationship among voltage levels is determined by the specified three-phase voltage values, and the inverter 302 decides the energizing pattern with respect to each phase in accordance with the given specified three-phase voltage values. The total eight energizing patterns are the same as those in the first embodiment (see FIG. 3).

Furthermore, in the second embodiment and the third embodiment described later, a relationship between the voltage level of each phase voltage and the carrier signal, and waveforms of the PWM signal and the bus current corresponding to the relationship are the same as those in the first embodiment (see FIG. 4). The carrier signal is a periodic triangular wave signal generated in the controller 303 (the controller 3 or 503 in the first or the third embodiment) for comparison with voltage levels of the individual phase voltages, and a period thereof is referred to as the carrier period. Further, in the second embodiment and the third embodiment described later, a maximum phase, an intermediate phase and a minimum phase are defined similarly to the first embodiment. There are six combinations of the maximum phase, the intermediate phase and the minimum phase in the same manner as in the first embodiment (see FIG. 6), and the six combinations in the second embodiment and the third embodiment described later are classified into the first to the sixth modes in the same manner as in the first embodiment.

The switching action with respect to each arm of the inverter 302 based on $v_u^*$, $v_v^*$ and $v_w^*$ is the same as the first embodiment. More specifically, the inverter 302 compares the voltage level of each phase voltage denoted by $v_u^*$, $v_v^*$ or $v_w^*$ with the carrier signal in the same manner as the inverter 2 in the first embodiment and controls on and off of each arm based on a result of the comparison. Supposing a situation as shown in FIG. 4, if the bus current is detected in the period T1-T2 or the period T5-T6, current of the minimum phase can be detected from the bus current. If the bus current is detected in the period T2-T3 or the period T4-T5, current of the maximum phase can be detected from the bus current. Then, current of the intermediate phase can be obtained by calculation utilizing the fact that a total sum of current values of three phases becomes zero.

Furthermore in the second embodiment and the third embodiment described later, similarly to the first embodiment, the sampling timing when the phase current of the minimum phase is detected (e.g., the mid-term between the timings T1 and T2) is denoted by ST1, while the sampling timing when the phase current of the maximum phase is detected (e.g., the mid-term between the timings T2 and T3) is denoted by ST2.

In the second embodiment, the currents supplied from the inverter 302 via the terminals 312$u$, 312$v$ and 312$w$ are referred to generically as "interconnection current". The U-phase current $i_u$, the V-phase current $i_v$ and the W-phase current $i_w$ correspond to the U-phase axis component, the V-phase axis component and the W-phase axis component of the interconnection current, respectively.

Figure 40:
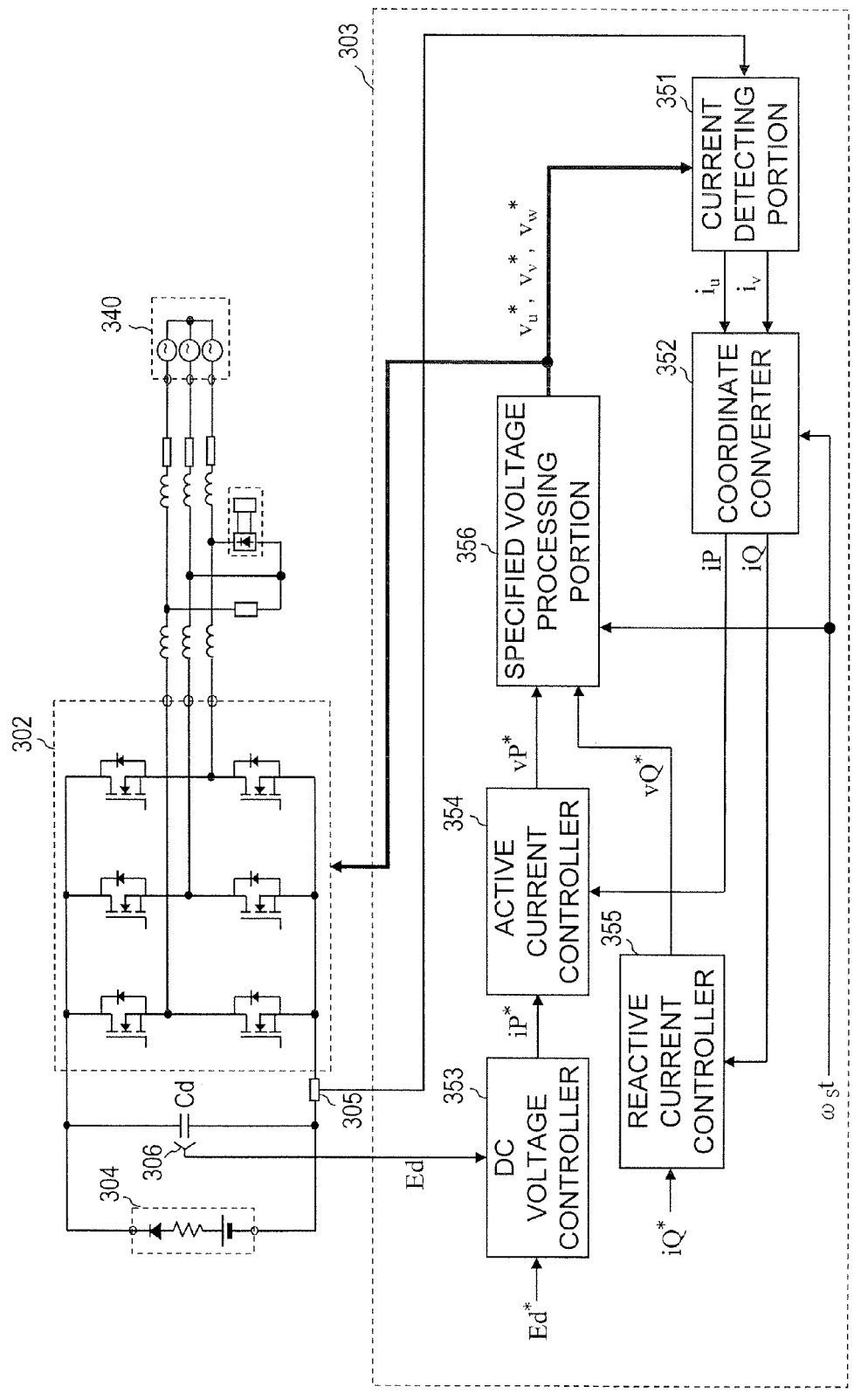
FIG. 40 is a general structural diagram of a system interconnecting system shown in FIG. 39, which includes an inner block diagram of the controller.

FIG. 40 shows a general structural diagram of a system interconnecting system according to the second embodiment, which includes an inner block diagram of the controller 303. The controller 303 includes individual portions denoted by numerals 351 to 356. The controller 303 detects each phase current from the bus current and converts the detected phase currents of three phases into active current and reactive current (i.e., performs P-Q conversion of the interconnection current), so as to calculate instantaneous active current iP and instantaneous reactive current iQ, Then, the specified voltage vector is generated so that a voltage value of the voltage between both terminals of the smoothing capacitor Cd is maintained at a desired value and the instantaneous reactive current iQ becomes zero. In order to enable detection of each phase current normally, the specified voltage vector is corrected on the ab coordinates similarly to the first embodiment, and the specified three-phase voltage values ($v_u^*$, $v_v^*$ and $v_w^*$) are generated from the specified voltage vector after the correction.

Figure 41:
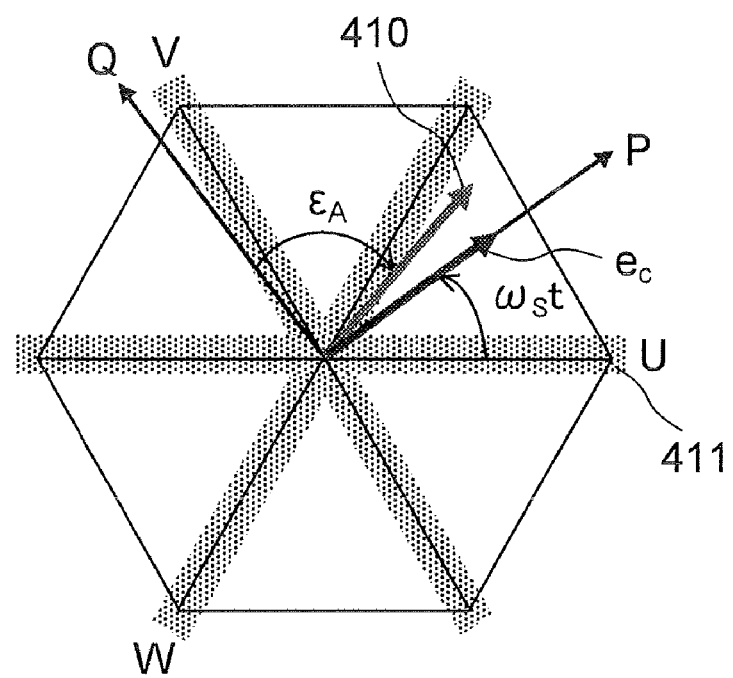
FIG. 41 is a space vector diagram showing a relationship among the U-phase axis, the V-phase axis and the W-phase axis that are fixed axes and the P-axis and the Q-axis that are rotation axes and a voltage vector in the second embodiment of the present invention.

Prior to description of operations of the individual portions shown in FIG. 40, a relationship among a plurality of axes that are referred to in the controller 303 will be described. FIG. 41 is a space vector diagram showing a relationship among the U-phase axis, the V-phase axis and the W-phase axis that are fixed axes and the P-axis and the Q-axis that are rotation axes. Similarly to the first embodiment, a phase of the V-phase axis leads by 120 degrees of electrical angle with reference to the U-phase axis, and a phase of the W-phase axis further leads by 120 degrees of electrical angle with reference to the V-phase axis. An angular frequency (angular speed) in rotation of the P-axis is regarded to be the same as an angular frequency $\omega_S$ of the AC voltage supplied from the AC voltage sources 340$u$, 340$v$ and 340$w$. A combined voltage of the voltages at the interconnection points 330$u$, 330$v$ and 330$w$ shown in FIG. 39 is regarded as vector quantity on the two-dimensional coordinate plane, and the voltage vector is represented by $e_C$. If the inverter 302 supplies current having the same phase as $e_C$ (current expressed by a current vector having the same direction as $e_C$), the inverter 302 is regarded to supply only active power (in this case, reactive power is supplied from the electric power system 340).

Therefore, a direction of the P-axis is regarded as the same as a direction of the voltage vector $e_C$ (therefore, the voltage vector $e_C$ is regarded to be on the P-axis). Then, the Q-axis is set to a phase leading the P-axis by 90 degrees of electrical angle, and the coordinates having the P-axis and the Q-axis as the coordinate axes are referred to as a PQ coordinates. In addition, elapsed time from the time point when the U-phase axis matches the P-axis is denoted by t, a phase of the P-axis viewed from the U-phase axis is denoted by $\omega_S t$ (the U-phase axis matches the P-axis at t=0). A phase of the output voltage of the inverter 302 leads the voltage vector $e_C$ by time corresponding to an interconnection reactor expressed by $L_C$. In FIG. 41, the vector denoted by numeral 410 is the voltage vector of the output voltage of the inverter 302. A phase of the voltage vector 410 viewed from the Q-axis is denoted by $\epsilon_A$. In FIG. 41, the counter-clockwise direction is regarded as the leading direction of the phase, so that "$\epsilon_A<0$" holds. Then, a phase of the voltage vector 410 with reference to the U-phase axis is expressed by "$\omega_S t + \epsilon_A + \pi/2$".

Similarly to the voltage vector 110 in the first embodiment (see FIG. 8), the voltage vector 410 is a vector of the combined voltage of the U-phase voltage $v_u$, the V-phase voltage $v_v$ and the W-phase voltage $v_w$ regarded as vector quantity on the two-dimensional coordinate plane. The U-phase axis component, the V-phase axis component and the W-phase axis component of the voltage vector 410 correspond to $v_u$, $v_v$ and $v_w$. In addition, noting a PQ coordinates, the voltage vector 410 can be divided into the P-axis component and the Q-axis component. The P-axis component and the Q-axis component of the voltage vector 410 are expressed by the P-axis voltage vP and the Q-axis voltage vQ, respectively. Actually, the specified P-axis voltage value vP* and the specified Q-axis voltage value vQ* are calculated in the controller 303, and vP* and vQ* represent the voltage vector 410. For this reason, the voltage vector corresponding to numeral 410 can also be referred to as a specified voltage vector.

An asterisk region 411 with hatching at a vicinity of the U-phase axis, a vicinity of the V-phase axis and a vicinity of the W-phase axis indicates the region where current values of two phases cannot be detected. For example, if the V-phase voltage and the W-phase voltage are close to each other so that current values of two phases cannot be detected, the voltage vector 410 is located at a vicinity of the U-phase axis. If the U-phase voltage and the W-phase voltage are close to each other so that current values of two phases cannot be detected, the voltage vector 410 is located at a vicinity of the V-phase axis. The region 411 exists every 60 degrees of electrical angle with reference to the U-phase axis in the same manner as the region 111 shown in FIG. 8. For this reason, in the same concept as the first embodiment, the ab coordinates that rotate in a stepping manner every 60 degrees of electrical angle similarly to the first embodiment can be defined (note that the PQ coordinates are coordinates that rotate in a continuous manner). More specifically, the phase ($\theta+\epsilon+\pi/2$) of the voltage vector 110 and the voltage vector 110 in the first embodiment shown in FIG. 8 are replaced with the phase ($\omega_S t + \epsilon_A + \pi/2$) of the voltage vector 410 and the voltage vector 410, and the definition of the ab coordinates described above in the first embodiment should be applied to the present embodiment (see FIGS. 8 and 9). As a result, the a-axis rotates in a stepping manner every 60 degrees of electrical angle responding to a phase ($\omega_S t + \epsilon_A + \pi/2$) of the voltage vector 410. The b-axis also rotates in a stepping manner every 60 degrees together with the a-axis that is orthogonal to the b-axis.

Actions of individual portions shown in FIG. 40 will be described. The signal indicating a current value of the bus current (detection current) sensed by the current sensor 305 is sent to the current detecting portion 351. The current detecting portion 351 performs the same action as the current detecting portion 21 shown in FIG. 19. More specifically, it refers to the specified three-phase voltage values $v_u{}^*$, $v_v{}^*$ and $v_w{}^*$ delivered by the specified voltage processing portion 356 so as to identify which phases are the maximum phase, the intermediate phase and the minimum phase. Based on the specified three-phase voltage values $v_u{}^*$, $v_v{}^*$ and $v_w{}^*$, it also decides the timings ST1 and ST2 when the output signal of the current sensor 305 should be sampled (see FIG. 6), and calculates and delivers the U-phase current $i_u$, and the V-phase current $i_v$ from a current value of the bus current obtained at the timings. In this case, the relational expression "$i_u+i_v+i_w=0$" is used as necessity.

The coordinate converter 352 performs the coordinate conversion of $i_u$ and $i_v$ from the current detecting portion 351 into those on the PQ coordinates based on the phase $\omega_S t$ so as to calculate the active current and the reactive current in the interconnection current. Since the calculated active current and the reactive current indicate an instantaneous value of the active current and an instantaneous value of the reactive current, they are referred to as an instantaneous active current and an instantaneous reactive current, respectively. In addition, the instantaneous active current and the instantaneous reactive current are denoted by iP and iQ, respectively. The references iP and iQ respectively indicate a P-axis component and a Q-axis component of the interconnection current. More specifically, iP and iQ are calculated by the equation (3-1) as below.

$$\begin{bmatrix} iP \\ iQ \end{bmatrix} = \sqrt{2} \begin{bmatrix} \sin(\omega_S t + \pi/3) & \sin\omega_S t \\ \cos(\omega_S t + \pi/3) & \cos\omega_S t \end{bmatrix} \begin{bmatrix} i_u \\ i_v \end{bmatrix} \quad (3\text{-}1)$$

The phase $\omega_S t$ corresponds to a phase of the output voltage of the inverter 302. As described above with reference to FIG. 41, the elapsed time from the time point when the U-phase axis matches the P-axis is denoted by t, and a phase of the P-axis viewed from the U-phase axis is denoted by $\omega_S t$. Therefore, the phase cost should be determined from a phase of the U-phase voltage $v_u$. Actually, an angular frequency and a phase of the AC voltage from the AC voltage source 340u that appears at the terminal 312u before the inverter 302 delivers the voltage is detected, and a value of $\omega_S$ and a time point when t becomes zero are determined in accordance with the detected angular frequency and the phase. Voltages $v_u$, $v_v$ and $v_w$ are sine wave voltages having the angular frequency $\omega_S$ (however, they include distortion due to the correction process performed by the specified voltage processing portion 356), and their phases are different from each other by 120 degrees of electrical angle.

The DC voltage controller 353 is supplied with a voltage Ed between both terminals of the smoothing capacitor Cd detected by the voltage detector 306 and a specified DC voltage value Ed* that indicates a target value of the voltage Ed between both the terminals. The specified DC voltage value Ed* matches Ed for obtaining a maximum electric power from the solar battery 304 (in other words, Ed for making the output power of the inverter 302 maximum). The DC voltage controller 353 calculates and delivers a specified active current value iP* so that (Ed−Ed*) converges to zero by the proportional-plus-integral control. In addition, a specified reactive current value iQ* is set to zero. Sign iP* represents a target value that iP should follow, while iQ* represents a target value that iQ should follow.

The active current controller 354 performs the proportional-plus-integral control based on iP* from the DC voltage controller 353 and iP from the coordinate converter 352 so that a current error (iP*−iP) converges to zero, so as to calculate the specified P-axis voltage value vP* that the P-axis voltage vP should follow. The reactive current controller 355 performs the proportional-plus-integral control based on the given iQ* and iQ from the coordinate converter 352 so that a current error (iQ*−iQ) converges to zero, so as to calculate the specified Q-axis voltage value vQ* that the Q-axis voltage vQ should follow.

Figure 42:
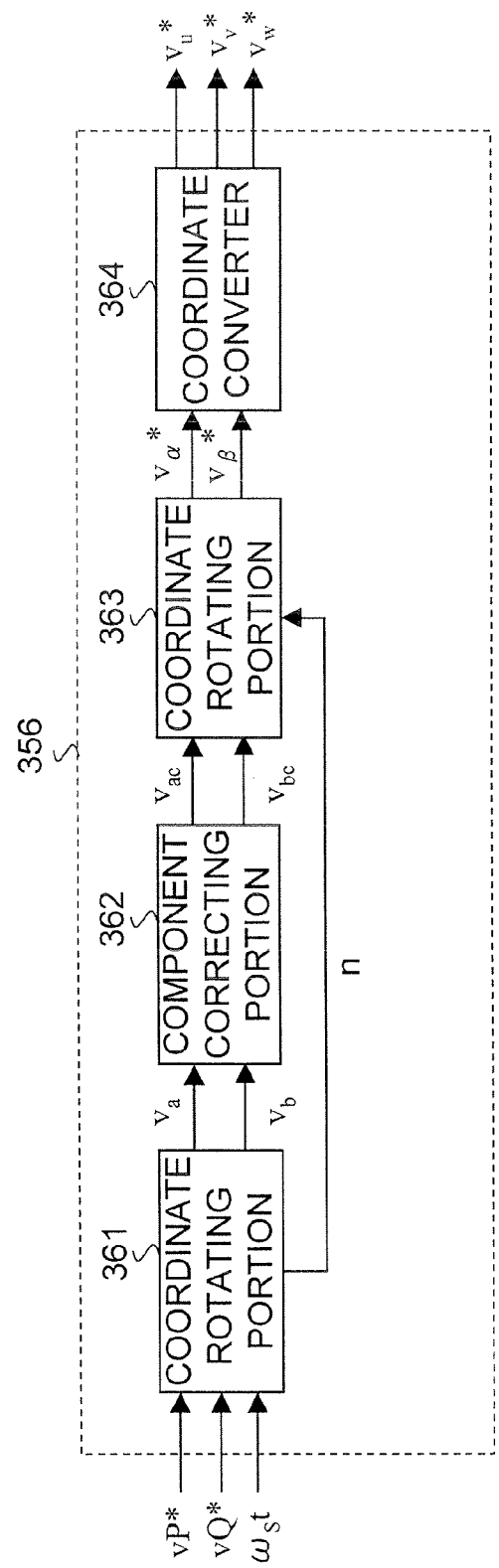
FIG. 42 is an inner block diagram of a specified voltage processing portion shown in FIG. 40.

A function of the specified voltage processing portion 356 is the same as the function of the combination portion of the voltage vector correcting portion 24 and the coordinate converter 25 shown in FIG. 19. FIG. 42 shows an inner block diagram of the specified voltage processing portion 356. The specified voltage processing portion 356 shown in FIG. 42 includes individual portions denoted by numerals 361 to 364.

The coordinate rotating portion 361 converts vP* and vQ* into $v_a$ and $V_b$ based on vP* and vQ* and $\omega_S t$ in accordance with a deformed equation of the above equation (1-3). In other words, the two-phase specified voltage vector expressed by vP* and vQ* on the PQ coordinates is converted into the two-phase specified voltage vector expressed by $v_a$ and $v_b$ on the ab coordinates.

Figure 43:
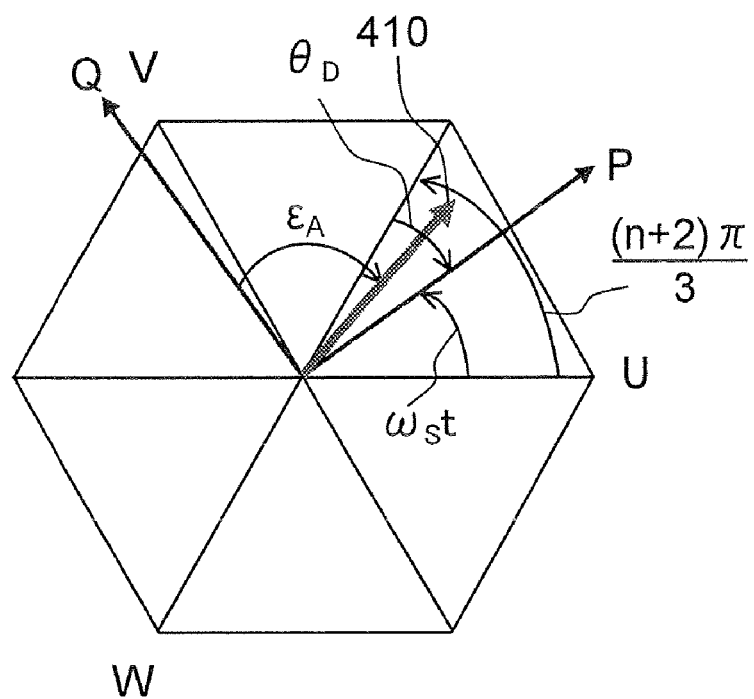
FIG. 43 is a space vector diagram showing a relationship among the U-phase axis, the V-phase axis and the W-phase axis that are fixed axes and the P-axis and the Q-axis that are rotation axes and a voltage vector in the second embodiment of the present invention.

The deformed equation of the above equation (1-3) means an equation by replacing $v_d$ and $v_q$ in the equation (1-3) with vP* and vQ*. In addition, as shown in FIG. 43, a phase of an axis having the closest voltage vector 410 with respect to the U-phase axis among axes including the a, axis through the $a_6$ axis (see FIG. 9) is expressed by "$(n+2)\pi/3$". Sign "n" in the second embodiment is a quotient obtained when the $(\omega_S t + \epsilon_A)$ is divided by $\pi/3$. Then, $\theta_D$ that satisfies the equation (3-2) below is used for calculation of the deformed equation of the equation (1-3) performed by the coordinate rotating portion 361.

$$\omega_S t = \theta_D + \frac{(n+2)\pi}{3} \quad (3\text{-}2)$$

The value of $\theta_D$ that satisfies the equation (3-2) can be calculated as follows. A value of n matching $\epsilon_A$ calculated by using the equation (3-3) below (i.e., a quotient obtained when $(\omega_S t + \epsilon_A)$ is divided by $\pi/3$) is determined by referring to $\omega_S t$. The determined n and $\omega_S t$ are substituted into the above equation (3-2) so that $\theta_D$ is obtained. In addition, the value of n determined when the value of $\theta_D$ is calculated is used for calculation in the coordinate rotating portion 363. Note that each calculation may be performed by using $\epsilon_A{}'$ with reference to the P-axis instead of $\epsilon_A$ with reference to the Q-axis. The sign $\epsilon_A{}'$ denotes a phase of the voltage vector 410 viewed from the P-axis. In this case, calculation of the variable n and the like are performed by using a relational expression "$\epsilon_A = \epsilon_A{}' - \pi/2$".

$$\varepsilon_A = \tan^{-1}\left(\frac{-vP^*}{vQ^*}\right) \quad (3\text{-}3)$$

The component correcting portion 362, the coordinate rotating portion 363 and the coordinate converter 364 shown in FIG. 42 have functions similar to the component correcting portion 52, the coordinate rotating portion 53 and the coordinate converter 25 (see FIGS. 19 and 21) in the first embodiment, respectively.

In other words, the component correcting portion 362 performs the correction process in the step S2 shown in FIG. 11 or the correction process shown in FIG. 16 on $v_a$ and $v_b$ obtained by the coordinate rotating portion 361, and it delivers $v_a$ and $v_b$ after the correction as $v_{ac}$ and $v_{bc}$, respectively. However, if the correction is not necessary, "$v_{ac}=v_a$" and "$v_{bc}=v_b$" are satisfied.

The coordinate rotating portion 363 converts the a-axis voltage and the b-axis voltage after the correction delivered from the component correcting portion 362 (i.e., $v_{ac}$ and $v_{bc}$) into $v_\alpha^*$ and $v_\beta^*$ in accordance with the above equation (1-7). More specifically, the two-phase specified voltage vector expressed by $v_{ac}$ and $v_{bc}$ on the ab coordinates is converted into the two-phase specified voltage vector expressed by $v_\alpha^*$ and $v_\beta^*$ on the $\alpha\beta$ coordinates ($\alpha\beta$ fixed coordinates). In this case, $V_{ac}, V_{bc}, v_\alpha^*$ and $v_\beta^*$ are used as $v_a, V_b, v_\alpha$ and $v_\beta$ in the equation (1-7), respectively. Note that the $\alpha\beta$ coordinates are the same as that defined in the first embodiment. However, $v_\alpha^*$ and $v_\beta^*$ in the second embodiment is of course orthogonal biaxial components of the specified voltage vector with respect to the output voltage of the inverter 302.

The coordinate converter 364 converts $v_\alpha^*$ and $v_\beta^*$ obtained in the coordinate rotating portion 363 into the specified three-phase voltage values ($v_u^*, v_v^*$ and $v_w^*$) and delivers the specified three-phase voltage values to the inverter 302. In addition, the specified three-phase voltage values are also supplied to the current detecting portion 351.

In this way, it is possible to apply the correction method described in the first embodiment to the system interconnecting system. Thus, the same effect as the first embodiment can be obtained. For example, the correction can be simplified, and the determination of correction quantity can be facilitated.

Note that the control performed by the controller 303 of the system interconnecting system can be said to be control with respect to the active current and the reactive current, and it can also be said to be control with respect to the active power and the reactive power. The AC voltage from the electric power system 340 is an AC voltage having substantially constant amplitude. Therefore, the control such that the active current and the reactive current become desired values by interconnection with the AC voltage just means control such that the active power and the reactive power become desired values (the active power is the product of the voltage and the active current while the reactive power is the product of the voltage and the reactive current). Therefore, the controller 303 can be called a current control unit as well as a power control unit.

In addition, although the solar battery 304 is used as an example of the DC power supply for the inverter 302, it is possible to use a fuel cell, a wind turbine generator or the like instead of the solar battery 304.

Third Embodiment

In the systems according to the first and the second embodiment, the detected current is used for current control (or power control). However, the technique described in the first or the second embodiment can be applied also to a system that detects current for a purpose of protection or the like instead of the current control (or power control) to which the detected current is used. This type of system will be described as a third embodiment of the present invention.

Figure 44:
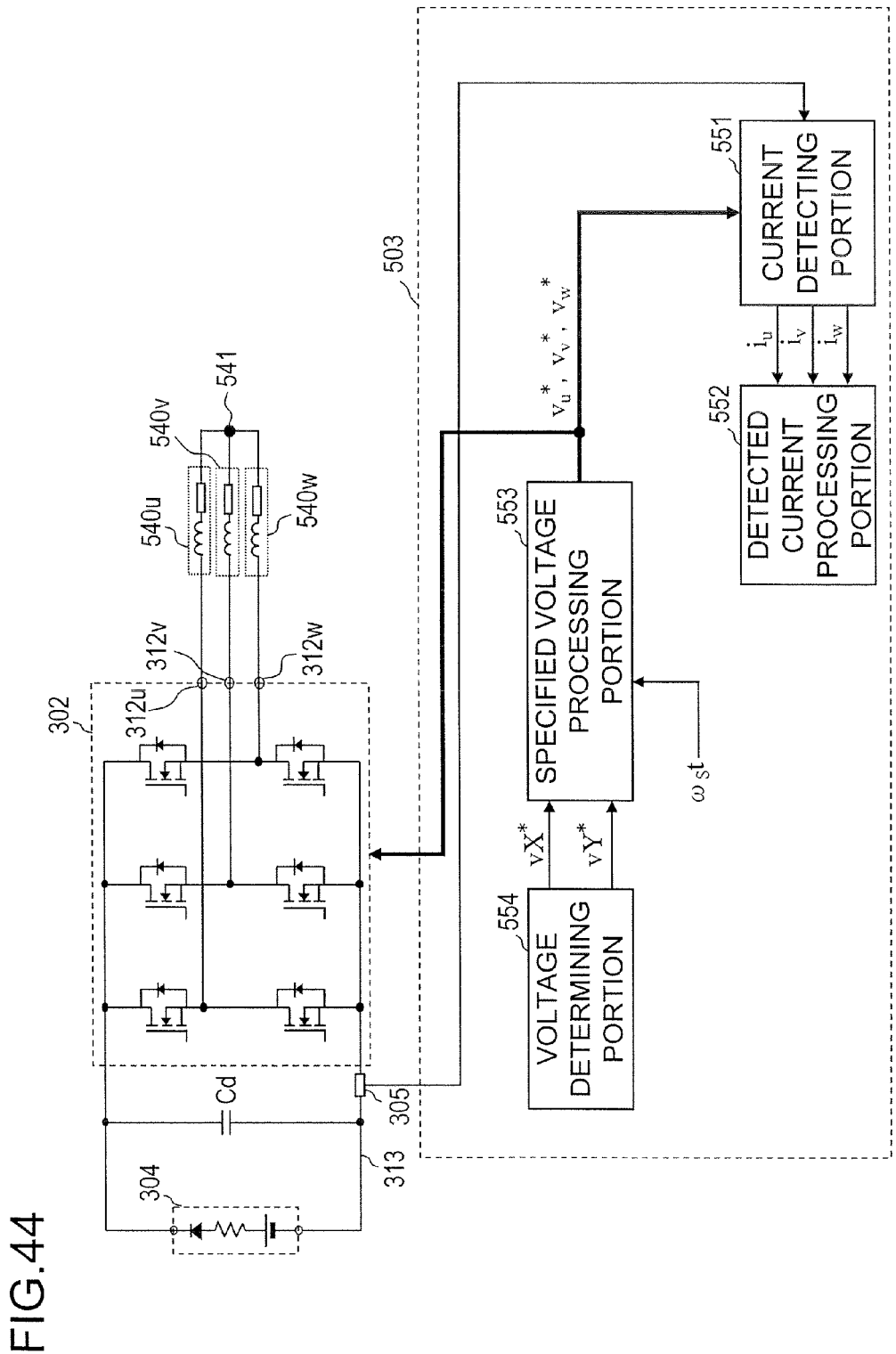
FIG. 44 is a general structural diagram of a three-phase load driving system according to a third embodiment of the present invention.

FIG. 44 is a general structural diagram of a three-phase load driving system according to third embodiment. In FIG. 44, the inverter 302, the solar battery 304, the current sensor 305 and the smoothing capacitor Cd are the same as those shown in FIG. 39 of the second embodiment, and connections among them are also the same as those in the second embodiment. For convenience of description, a DC power supply for the inverter 302 of the three-phase load driving system is a solar battery 304 similarly to the second embodiment. However, any type of DC power supply can be used as the DC power supply for the inverter 302.

Unlike the second embodiment, the terminals 312u, 312v and 312w that are output terminals of the inverter 302 are not connected to the electric power system side but are connected to the three-phase load in the three-phase load driving system. More specifically, the terminal 312u is connected to the reference point 541 via a load 540u, the terminal 312v is connected to the reference point 541 via a load 540v, and the terminal 312w is connected to the reference point 541 via a load 540w.

The U-phase voltage $v_u$, the V-phase voltage $v_v$ and the W-phase voltage $v_w$ in the three-phase load driving system shown in FIG. 44 are respectively voltages at the terminals 312u, 312v and 312w with reference to a potential of the reference point 541. The loads 540u, 540v and 540w respectively receive the U-phase voltage $v_u$, the V-phase voltage $v_v$ and the W-phase voltage $v_w$ as drive voltages. The loads 540u, 540v and 540w are loads of inductance or resistance elements, for example. The signs $v_u, v_v$ and $v_w$ are sine wave voltages having an angular frequency (angular speed) $\omega_S$ (however, they include distortion due to the correction process performed by the specified voltage processing portion 553). Their phases are different from each other by 120 degrees of electrical angle. Although the sign "$\omega_S$" that is used in the second embodiment is also used in the present embodiment for convenience of description, $\omega_S$ in the present embodiment has no relationship with the angular frequency of the AC voltage of the electric power system 340 shown in FIG. 39.

An action of the inverter 302 based on the given specified three-phase voltage values ($v_u^*, v_v^*$ and $v_w^*$) is the same as that in the second embodiment. However, in the three-phase load driving system shown in FIG. 44, the specified three-phase voltage values ($v_u^*, v_v^*$ and $v_w^*$) are supplied from the controller 503.

The controller 503 includes individual portions denoted by numerals 551-554. In the controller 503, an X-axis and a Y-axis are defined corresponding to the P-axis and the Q-axis in the second embodiment. Note that sign "X" used in the present embodiment denotes one different from that denoted by the same sign in the fourth example of the first embodiment.

Figure 45:
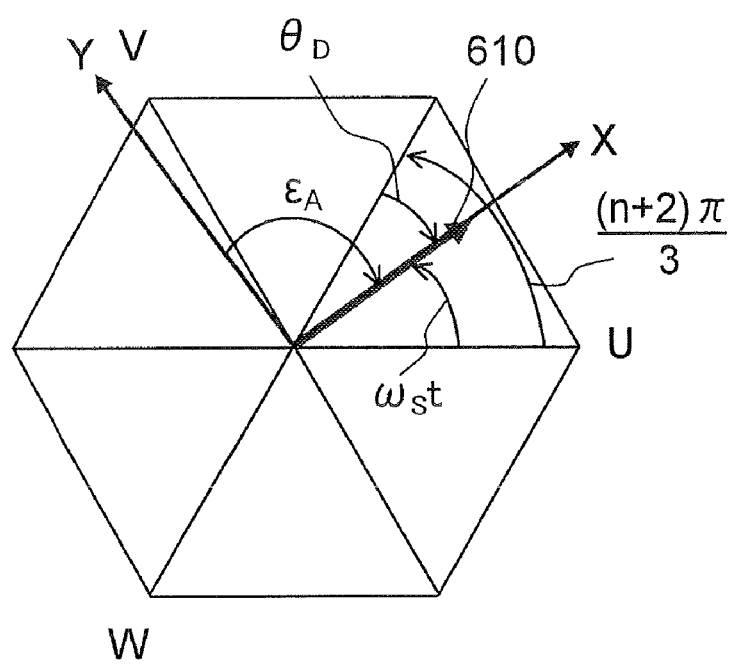
FIG. 45 is a space vector diagram showing a relationship among the U-phase axis, the V-phase axis and the W-phase axis that are fixed axes and the X-axis and the Y-axis that are rotation axes and a voltage vector in the third embodiment of the present invention.

FIG. 45 is a space vector diagram indicating a relationship among the U-phase axis, the V-phase axis and the W-phase axis that are fixed axes and the X-axis and the Y-axis that are rotation axes. A phase of the V-phase axis leads by 120 degrees of electrical angle with reference to the U-phase axis, and a phase of the W-phase axis further leads by 120 degrees of electrical angle with reference to the V-phase axis. An angular frequency (angular speed) in rotation of the X-axis is $\omega_S$. Numeral 610 denotes a voltage vector of the output voltage of the inverter 302 in the present embodiment.

A direction of the X-axis is the same as a direction of the voltage vector 610 (therefore, the voltage vector 610 is on the X-axis). Then, the Y-axis is set at a phase leading the X-axis by 90 degrees of electrical angle, and the coordinates having the X-axis and the Y-axis as the coordinate axes are referred to as the XY coordinates. Furthermore in the present embodiment, elapsed time from a time point when the U-phase axis matches the X-axis is denoted by t. A phase of the X-axis viewed from the U-phase axis is expressed by $\omega_S t$ (the U-phase axis matches the X-axis when "t=0" holds), and a phase of the voltage vector 610 viewed from the Y-axis is expressed by $\epsilon_A$. In FIG. 45, the counter-clockwise direction is considered to be the leading direction of the phase, so that "∈A<0" holds. Then, a phase of the voltage vector 610 with reference to the U-phase axis is expressed by "$\omega_S t+\epsilon_A+\pi/2=\omega_S t$".

The voltage vector 610 is the combined voltage of the U-phase voltage $v_u$, the V-phase voltage $v_v$ and the W-phase voltage $v_w$ as vector quantity on the two-dimensional coordinate plane. The U-phase axis component, the V-phase axis component and the W-phase axis component of the voltage vector 610 correspond to $v_u$, $v_v$ and $v_w$. In addition, noting the XY coordinates, the voltage vector 610 can be divided into the X-axis component and the Y-axis component. The X-axis component and the Y-axis component of the voltage vector 610 are expressed by the X-axis voltage vX and the Y-axis voltage vY, respectively. Actually, the specified X-axis voltage value vX* and the specified Y-axis voltage value vY* are calculated in the controller 503, and vX* and the vY* represents the voltage vector 610. For this reason, the voltage vector corresponding to numeral 610 can also be referred to as a specified voltage vector.

A region at a vicinity of the U-phase axis, a vicinity of the V-phase axis and a vicinity of the W-phase axis similar to the region 411 shown in FIG. 41 exists every 60 degrees of electrical angle with reference to the U-phase axis. For this reason, in the same concept as the first embodiment, the ab coordinates that rotate in a stepping manner every 60 degrees of electrical angle similarly to the first embodiment can be defined (note that the XY coordinates are coordinates that rotate in a continuous manner). More specifically, the phase $(\theta+\epsilon+\pi/2)$ of the voltage vector 110 and the voltage vector 110 in the first embodiment shown in FIG. 8 are replaced with the phase $(\omega_S t+\epsilon_A+\pi/2)$ of the voltage vector 610 and the voltage vector 610, and the definition of the ab coordinates described above in the first embodiment should be applied to the present embodiment (see FIGS. 8 and 9). As a result, the a-axis rotates in a stepping manner every 60 degrees of electrical angle responding to a phase $(\omega_S t+\epsilon_A+\pi/2)$ of the voltage vector 610. The b-axis also rotates in a stepping manner every 60 degrees together with the a-axis that is orthogonal to the b-axis. Note that $\theta_D$ and $(n+2)\pi/3$ shown in FIG. 45 are angle quantities defined in the same manner as in the second embodiment (see FIG. 43).

Actions of individual portions shown in FIG. 44 will be described. The current sensor 305 senses the bus current that flows in the bus line 313 of the inverter 302. A signal indicating a current value of the detected bus current (detection current) is sent to the current detecting portion 551. The current detecting portion 551 performs the same action as the current detecting portion 21 shown in FIG. 19. More specifically, it refers to the specified three-phase voltage values $v_u^*$, $v_v^*$ and $v_w^*$ delivered from the specified voltage processing portion 553, so as to identify which phases are the maximum phase, the intermediate phase and the minimum phase. Based on the specified three-phase voltage values $v_u^*$, $v_v^*$ and $v_w^*$, it also determines the timings ST1 and ST2 when the output signal of the current sensor 305 is sampled (see FIG. 6), so as to calculate and deliver the U-phase current $i_u$, the V-phase current $i_v$ and the W-phase current $i_w$ from the current value of the bus current obtained at the timings. In this case, the relational expression "$i_u+i_v+i_w=0$" is used as necessity.

The detected current processing portion 552 performs a predetermined process based on $i_u$, $i_v$ and $i_w$ delivered from the current detecting portion 551. For example, it detects whether or not $i_u$, $i_v$ and $i_w$ have increased abnormally (i.e., whether or not an output current of the inverter 302 has become overcurrent), and it performs a protection operation in accordance with a result of the detection.

Figure 46:
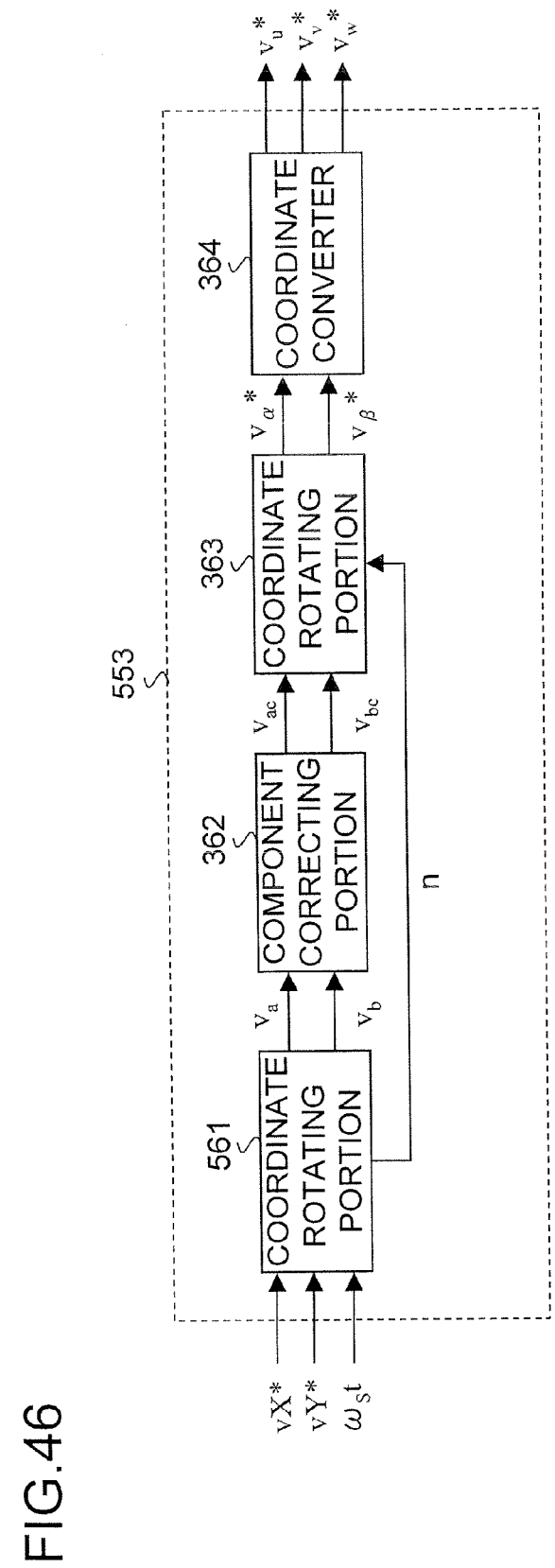
FIG. 46 is an inner block diagram of a specified voltage processing portion shown in FIG. 44.

The function and the inner structure of the specified voltage processing portion 553 are the same as those of the specified voltage processing portion 356 shown in FIG. 42. As to the specified voltage processing portion 356, "the P-axis, the Q-axis and the voltage vector 410" are replaced with "the X-axis, the Y-axis and the voltage vector 610" so that the specified voltage processing portion 553 is realized (see FIGS. 42, 43 and 45). An inner block diagram of the specified voltage processing portion 553 is shown in FIG. 46. The specified voltage processing portion 553 shown in FIG. 46 includes individual portions denoted by numerals 561 and 362-364. The method described above concerning the specified voltage processing portion 356 shown in FIG. 42 is applied to the specified voltage processing portion 553, too.

The coordinate rotating portion 561 converts vX* and the vY* into $v_a$ and $V_b$ based on the given vX* and the vY* and $\omega_S t$ in accordance with a deformed equation of the above equation (1-3). In other words, it converts a two-phase specified voltage vector expressed by vX* and the vY* on the XY coordinates into a two-phase specified voltage vector expressed by $v_a$ and $v_b$ on the ab coordinates. The deformed equation of the above equation (1-3) means an equation obtained by replacing $V_d$ and $V_q$ with vX* and the vY* in the equation (1-3).

Actions of the component correcting portion 362, the coordinate rotating portion 363 and the coordinate converter 364 in the specified voltage processing portion 553 are the same as those shown in FIG. 42, so overlapping description will be omitted. However, $v_a$ and $v_b$ to the component correcting portion 362 are obtained from the coordinate rotating portion 561. The coordinate converter 364 supplies the calculated specified three-phase voltage values ($v_u^*$, $v_v^*$ and $v_w^*$) to the inverter 302 and the current detecting portion 551.

The specified voltage values vX* and vY* to be given to the specified voltage processing portion 553 respectively indicate the specified X-axis voltage value that the X-axis voltage vX should follow and the specified Y-axis voltage value that the Y-axis voltage vY should follow, and they are delivered from the voltage determining portion 554. As shown in FIG. 45, vY* is zero because the voltage vector 610 is on the X-axis, and a value corresponding to a desired power value to be supplied to the three-phase load is substituted into vX*. In the first embodiment, the time point when the d-axis matches the U-phase axis depends on a rotor position of the motor. In the second embodiment, the time point when the P-axis matches the U-phase axis depends on a phase of the AC voltage of the electric power system side. In the third embodiment, however, there is no dependency like that, so the time point of t=0 can be defined freely. Ditto for $\omega_S$.

In this way, it is possible to apply the correction method described above in the first embodiment to the three-phase load driving system, so that the same effect as the first embodiment can be obtained. For example, the correction can be simplified, and the decision of the correction quantity can be facilitated.

Hereinafter, variations and the like with respect to each embodiment (in particular, the second and the third embodiments) will be described.

In the second and the third embodiment, any method described above in the first embodiment (i.e., any one of the methods described above in the first to the third examples of the first embodiment) can be used as the method of identifying a mode to which the present time belong and the method of deciding the timings ST1 and ST2 (see FIG. 6).

Furthermore, in the second or the third embodiment, $v_{ac}$ and $v_{bc}$ calculated by the component correcting portion 362 (see FIG. 42, FIG. 46) may be converted into $v_u^*$, $v_v^*$ and $v_w^*$ without going through the αβ coordinates in accordance with the above equations (1-8) and (1-9). In this case, $v_{ac}$ and $v_{bc}$ as well as $v_u^*$, $v_v^*$ and $v_w^*$ are used as $v_a$ and $v_b$ as well as $v_u$, $v_v$ and $v_w$ in the equations (1-8) and (1-9). Note that the coordinate rotating portion 363 is not necessary in this case.

Furthermore, in the second or the third embodiment, a part or a whole of the functions of the controller (303 or 503) can be realized by using software (a program) embedded in a general-purpose microcomputer or the like, for example. If software is used for realizing the controller (303 or 503), the block diagram showing structures of individual portions of the controller (303 or 503) shows a functional block diagram. Of course, it is possible to structure the controller (303 or 503) by using not software (a program) but only hardware.

In the first, the second or the third embodiment, the method of deriving all values to be derived including the above-mentioned various kinds of specified values ($v_d^*$, $v_q^*$, vP*, vQ*, vX*, vY*, and the like) and other state quantities ($\epsilon$, $\epsilon_A$ and the like) can be any method. For example, they can be derived by calculation in the controller (3, 303 or 503) or by looking up a table of data that is preset.

In addition, the following consideration is possible, for example.

In the second embodiment, the system interconnecting system shown in FIG. 40 is equipped with a current detecting unit, which includes the current detecting portion 351, the active current controller 354, the reactive current controller 355 and the specified voltage processing portion 356, and further may include the current sensor 305. For example, the active current controller 354 and the reactive current controller 355 shown in FIG. 40 and the coordinate rotating portion 361 shown in FIG. 42 work as the specified voltage vector generating portion, while the component correcting portion 362 shown in FIG. 42 works as the specified voltage vector correcting portion. In addition, for example, the controller 303 according to the second embodiment works as the inverter controlling device (or the current control unit or the power control unit), and the current detecting unit is included in the inverter controlling device. In addition, for example, the system interconnecting system shown in FIG. 40 includes a system interconnecting device, which includes the inverter 302 and the controller 303. It can be considered that the system interconnecting device further includes the solar battery 304 as the DC power supply, the current sensor 305, the voltage detector 306 and the smoothing capacitor Cd partly or as a whole.

In the third embodiment, the three-phase load driving system shown in FIG. 44 is equipped with a current detecting unit, which includes the current detecting portion 551, the voltage determining portion 554 and the specified voltage processing portion 553, and further may include the current sensor 305. For example, the voltage determining portion 554 shown in FIG. 44 and the coordinate rotating portion 561 shown in FIG. 46 work as the specified voltage vector generating portion, while the component correcting portion 362 shown in FIG. 46 work as the specified voltage vector correcting portion. It is possible to consider the controller 503 according to the third embodiment as the inverter controlling device, but the inverter controlling device does not generate the specified voltage vector based on a result of the detection performed by the current detecting portion 551.

The current detecting unit can be considered to be included also in the motor driving system of the first embodiment. The current detecting unit according to the first embodiment includes the current detecting portion 21, 21a or 21c shown in FIG. 19 or the like, the voltage calculating portion 23 shown in FIG. 19 or the like, the voltage vector correcting portion 24, 24a, 24b or 24c shown in FIG. 19 or the like, and further may include the current sensor 5 and/or the coordinate converter 25 shown in FIG. 19 or the like.

Note that there is a case where expression using only a sign ($i_\gamma$ or the like) indicates a state quantity (state variable) or the like corresponding to the sign for simplification of expression in this specification. In other words, "$i_\gamma$" and "γ-axis current $i_\gamma$" indicate the same meaning in this specification, for example.

The present invention is suitable for any electric equipment that uses a motor. In particular, it is suitable for a compressor for a refrigerator or an air conditioner for a motor vehicle, electric vehicle or the like. Other than these, it is suitable for various system interconnecting systems or three-phase load driving systems.

What is claimed is:

1. A motor control device comprising a current detecting portion that detects, as detection current, current flowing between a DC power supply outputting a DC voltage and an inverter to which the DC voltage is applied and that drives a three-phase motor, the motor control device detecting motor current flowing in the motor from the detection current and controlling the motor via the inverter based on the motor current, the motor control device further comprising:
    a specified voltage vector generating portion that generates a specified voltage vector indicating a voltage vector that an applied voltage to the motor should follow based on the motor current; and
    a specified voltage vector correcting portion that corrects the generated specified voltage vector, wherein
    the motor control device controls the motor in accordance with the specified voltage vector after the correction, and
    wherein the specified voltage vector correcting portion corrects the generated specified voltage vector so that the specified voltage vector after the correction becomes a vector outside a region where the motor current cannot be detected.

2. The motor control device according to claim 1, wherein the specified voltage vector is a specified voltage vector on rotating coordinates,
    the specified voltage vector correcting portion corrects the specified voltage vector on the rotating coordinates in the process of converting the specified voltage vector on the rotating coordinates into specified three-phase voltage values on three-phase fixed coordinates, and
    the motor control device controls the motor by supplying the specified three-phase voltage values corresponding to the specified voltage vector after the correction to the inverter.

3. The motor control device according to claim 1, wherein the specified voltage vector is a two-phase specified voltage vector on ab coordinates rotating in a stepping manner every 60 degrees of electrical angle in accordance with a phase of the specified voltage vector with reference to a predetermined fixed axis.

4. The motor control device according to claim 3, wherein the specified voltage vector correcting portion decides whether the correction is necessary or not based on the amplitude of a coordinate axis component forming the two-phase specified voltage vector on the ab coordinates, and it corrects the specified voltage vector by correcting the coordinate axis component when the correction is necessary.

5. The motor control device according to claim 1, wherein a phase of current flowing as the detection current is determined based on the generated specified voltage vector, and the motor current is detected in accordance with a result of the determination.

6. The motor control device according to claim 5, further comprising a specified three-phase voltage value generating portion that generates specified three-phase voltage values from the specified voltage vector after the correction, wherein
   timing for detecting the detection current is decided based on the result of the determination and the specified three-phase voltage values, and the motor current is detected from the detection current that is detected at the timing; and
   the specified three-phase voltage values are supplied to the inverter so that the motor is controlled.

7. The motor control device according to claim 1, wherein timing for detecting the detection current is decided based on a magnitude of the generated specified voltage vector, and the motor current is detected from the detection current that is detected at the timing.

8. The motor control device according to claim 3, wherein timing for detecting the detection current is decided based on a coordinate axis component of the specified voltage vector on the ab coordinates, and the motor current is detected from the detection current that is detected at the timing.

9. A motor driving system comprising:
   a three-phase motor;
   an inverter that drives the motor; and
   a motor control device according to claim 1 that controls the motor by controlling the inverter.

10. A current detecting unit comprising a current detecting portion that detects, as detection current, current flowing between a DC power supply outputting a DC voltage and a three-phase inverter to which the DC voltage is applied, the current detecting unit detecting three phase current of the inverter from the detection current, the current detecting unit further comprising:
   a specified voltage vector generating portion that generates a specified voltage vector indicating a voltage vector that three-phase voltages of the inverter should follow; and
   a specified voltage vector correcting portion that corrects the generated specified voltage vector, so that the inverter is controlled in accordance with the specified voltage vector after the correction, wherein
   the specified voltage vector correcting portion corrects the generated specified voltage vector so that the specified voltage vector after the correction becomes a vector outside a region where current values of two phases of the three phase current cannot be detected.

11. The current detecting unit according to claim 10, wherein the specified voltage vector is a specified voltage vector on rotating coordinates,
   the specified voltage vector correcting portion corrects the specified voltage vector on the rotating coordinates in the process of converting the specified voltage vector on the rotating coordinates into specified three-phase voltage values on three-phase fixed coordinates, and
   the inverter is controlled in accordance with the specified three-phase voltage values corresponding to the specified voltage vector after the correction.

12. The current detecting unit according to claim 10, wherein the specified voltage vector is a two-phase specified voltage vector on ab coordinates rotating in a stepping manner every 60 degrees of electrical angle in accordance with a phase of the specified voltage vector with reference to a predetermined fixed axis.

13. The current detecting unit according to claim 12, wherein the specified voltage vector correcting portion decides whether the correction is necessary or not based on the amplitude of a coordinate axis component forming the two-phase specified voltage vector on the ab coordinates, and it corrects the specified voltage vector by correcting the coordinate axis component when the correction is necessary.

14. An inverter controlling device, comprising:
   a current detecting unit according to claim 10 so as to control the inverter based on the detected three phase current; and
   the specified voltage vector generating portion that generates the specified voltage vector based on the three phase current.

15. The inverter controlling device according to claim 14, further comprising a current converting portion that converts the three phase current into active current and reactive current with reference to a phase of an output voltage of the inverter, wherein the specified voltage vector generating portion generates the specified voltage vector based on the active current and the reactive current.

16. A system interconnecting device comprising;
   an inverter controlling device according to claim 14; and
   an inverter that converts DC voltage from the DC power supply into three-phase AC voltage, so that AC power based on the AC voltage is supplied to a load by interconnection with an external three-phase AC power system.

* * * * *